United States Patent [19]
Bollyky et al.

[11] 4,313,843
[45] Feb. 2, 1982

[54] SUPERIOR OXALATE ESTER CHEMICAL LIGHTING SYSTEM

[75] Inventors: Laszlo J. Bollyky, Stamford; Michael M. Rauhut, Norwalk, both of Conn.

[73] Assignee: American Cyanamid Company, Stamford, Conn.

[21] Appl. No.: 721,920

[22] Filed: Sep. 9, 1976

Related U.S. Application Data

[60] Division of Ser. No. 464,285, Apr. 26, 1974, abandoned, which is a continuation-in-part of Ser. No. 205,747, Dec. 7, 1971, abandoned, which is a continuation-in-part of Ser. No. 813,973, Apr. 7, 1969, abandoned.

[51] Int. Cl.$^3$ .................. C09K 11/06; C09K 11/08
[52] U.S. Cl. .................. 252/188.3 CL; 252/186
[58] Field of Search .................. 252/188.3 CL, 186; 204/2, 25

[56] References Cited

U.S. PATENT DOCUMENTS

| | | | |
|---|---|---|---|
| 2,169,368 | 8/1939 | Murray et al. | 252/186 |
| 3,144,297 | 8/1964 | Kinder | 252/104 X |
| 3,329,621 | 7/1967 | Rauhut et al. | 252/188.3 |
| 3,539,794 | 11/1970 | Rauhut et al. | 252/188.3 X |
| 3,704,231 | 11/1972 | Bollyky | 252/188.3 |
| 3,749,679 | 7/1973 | Rauhut | 252/188.3 |

FOREIGN PATENT DOCUMENTS 1067607  5/1967  United Kingdom ............. 252/188.3

OTHER PUBLICATIONS

Rauhut et al., J. Am. Chem. Soc., vol. 89, 1967, pp. 6515–6522.

*Primary Examiner*—Herbert B. Guynn
*Attorney, Agent, or Firm*—Gordon L. Hart

[57] ABSTRACT

This invention relates to a chemiluminescent lighting system of practical value and superior properties, having good storage stability.

6 Claims, 3 Drawing Figures

SUPERIOR OXALATE ESTER CHEMICAL LIGHTING SYSTEM

This is a division of application Ser. No. 464,285 filed Apr. 26, 1974 and now abandoned, which was a continuation-in-part of application Ser. No. 205,747 filed Dec. 7, 1971 and now abandoned, which was a continuation-in-part of application Ser. No. 813,973 filed Apr. 7, 1969 and now abandoned.

A practical chemical lighting system should be an efficient producer of chemiluminescent light, storage stable, simple to operate, and safe to use. Additionally, for broad use a practical system should be capable of formulation to meet a variety of brightness and lifetime requirements for a variety of applications. The oxalic ester-hydrogen peroxide-fluorescer chemiluminescent reaction has the inherent capability of meeting these requirements, as disclosed in co-pending application Ser. No. 619,140, filed Feb. 28, 1967. This oxalic ester reaction provides substantial light emission when an oxalic ester, preferably an electronegatively substituted aromatic oxalate, is reacted with hydrogen peroxide, a fluorescer, and optionally a catalyst in a solvent. Formulation of a practical chemical lighting system based on this reaction requires the selection of oxalates, fluorescers, catalysts and solvents which optimize brightness and lifetime. Moreover, the constituents must optimumly be selected to accommodate their formulation into two reactive components which separately have extended storage stabilities and which generate useful light when combined. The distribution of the constituents between the two components is also critical in terms of storage stability and performance. The constituents should also be selected to accommodate low toxicity, low freezing point, and high flash point to provide for safe operation over a range of temperature. These latter properties are determined to a large extent by the solvent or solvents selected for the two reactive components, since the solvent may constitute substantially more than 90% of the combined system. Thus the selection of solvents for each component is critical in terms of safety as well as in terms of performance and storage stability.

For most applications a maximum light output per unit volume is required during some specified time period. The light output is measured in terms of light capacity (L.C.=lumen hours $1^{-1}$). The light capacity is proportional to the concentration of oxalic ester (M) and the quantum yield (QY) according to Equation 1. The constant $4.07 \times 10^4$ lumen hours einstein$^{-1}$ defines the sensitivity of the human eye to the yellow (555 m$\mu$) light and P is the photoptic factor which compares the ability of the eye to see a given wavelength of light with the ability to see yellow light. In principle, the light capacity of the chemiluminescent reaction, with a given constant quantum yield, can be increased by increasing the oxalic ester concentration and by selecting a fluorescer which has a high photoptic factor.

$$LC = 4.07 \times 10^4 \times M \times QY \times P \quad (1)$$

Increasing the light capacity by increasing the oxalic ester concentration is limited by the solubility of strongly chemiluminescent oxalic esters and by the tendency of the quantum yield to decrease at high oxalic ester concentrations. The latter problem can be moderated by the addition of tetrabutyl ammonium salt additives, as disclosed in copending, commonly assigned application Ser. No. 675,141, filed Oct. 13, 1967. Therefore attention should be given first to the solubility problem.

A two-component, liquid phase oxalate ester chemical light system must comprise an "oxalate component" comprising an oxalate ester and a solvent, and a "peroxide component" comprising hydrogen peroxide and a solvent. In addition an efficient fluorescer must be contained in one of the components; and any catalyst, necessary for intensity and lifetime control, must be contained in one of the components. The oxalate component must provide an oxalate ester-solvent combination which permits suitable ester solubility and which permits storage stability. The peroxide component must provide a hydrogen peroxide-solvent combination which permits suitable hydrogen peroxide solubility and permits storage stability. The solvents for the two components may be different but should be miscible. At least one solvent must solubilize the efficient fluorescer and at least one solvent should solubilize an efficient catalyst. The fluorescer and catalyst must be placed so as to permit both solubility and storage stability in the final components.

We have discovered a superior oxalic ester chemical lighting system satisfying all requirements which comprises two liquid phase components wherein one component (the oxalate component) is selected from the group comprising (1) at least 0.01 M (preferably at least 0.03 M) bis(2,4,6-trichlorophenyl) oxalate and at least 0.001 M (preferably at least 0.002 M) fluorescer selected from the group comprising 9,10-bis(phenylethynyl)anthracene and 5,12-bis(phenylethynyl)tetracene, 9,10-diphenylanthracene, perylene and an aromatic solvent such as benzene, chlorobenzene, ethylbenzene, dimethyl phthalate and preferably o-dichlorobenzene, ethyl benzoate, butyl benzoate and 1,3-butylene glycol dibenzoate; and (2) the component of the first group containing additionally at least 0.01 M (preferably at least 0.05 M) tetraalkyl ammonium perchlorate (such as tetrabutylammonium perchlorate); and wherein the second component (the peroxide component) is selected from the group comprising (1) at least 0.01 M hydrogen peroxide (preferably at least 0.10 M hydrogen peroxide) in a tertiary alcohol such as t-butyl alcohol, 3-methyl-3-pentanol, 3,6-dimethyloctanol-3 or an ester such as dimethyl phthalate; (2) at least 0.01 M hydrogen peroxide (preferably at least 0.10 M hydrogen peroxide) and a catalyst in the concentration range $1 \times 10^{-4}$ M to $2 \times 10^{-2}$ M comprising the anion of a carboxylic acid or phenol having an aqueous dissociation constant between about $1 \times 10^{-6}$ and $1 \times 10^{-1}$ (preferably between about $5 \times 10^{-4}$ and about $5 \times 10^{-2}$) (examples are sodium salicylate, tetrabutylammonium salicylate, tetrabutylammonium 2,3,5-trichlorobenzoate, potassium pentachlorophenolate, tetraethylammonium benzoate) in a tertiary alcohol solvent and (3) at least 0.01 M hydrogen peroxide (preferably at least 0.07 M hydrogen peroxide) and at least 0.01 M (preferably at least 0.05 M) tetraalkylammonium perchlorate (such as tetrabutylammonium perchlorate), and a solvent selected from the group comprising a tertiary alcohol and an ester such as dimethyl phthalate, ethyl benzoate, butyl benzoate, ethyl acetate, butyl acetate, triacetin.

Other oxalic esters which could be used satisfactorily in the place of bis(2,4,6-trichlorophenyl) oxalate include (a) bis(trichlorophenyl) oxalates, bis(tetrachlorophenyl) oxalates, bis(pentachlorophenyl)oxalates; (b) trichlorophenyl oxalates and tetrachlorophenyl oxalates where the phenyl group is substituted further by groups such as alkyl group (e.g., -n-octyl, -t-butyl, -methyl), haloalkyl group (e.g. -trifluoromethyl, -trichloromethyl), bromo substituents and cyano groups; (c) haloalkylphenyl oxalates (e.g., bis(ditrifluoromethylphenyl) oxalate).

Other tetraalkylammonium salt catalysts which could be used satisfactorily in the place of tetrabutylammonium perchlorate include tetrabutylammonium tetrafluoroborate, tetrabutylammonium hexafluorophosphate, tetraoctylammonium perchlorate benzyltrimethylammonium perchlorate and tetraethylammonium perchlorate.

Other alcohols which could be used satisfactorily in the place of 3-methyl-3-pentanol include 2-ethyl-2-hexanol, 1-methyl-1-chclohexanol, 2-methyl-2-butanol, 2-ethyl-2-butanol, 2-methyl-2-pentanol, 2-methyl-2-hexanol, 2-methyl-2-heptanol, 2-ethyl-2-octanol and any mixture of them.

The drawings consist of three figures described briefly as follows:

FIG. 1 represents a typical system at the start of this program.

FIG. 2 represents two ideal functions for all light emitted at constant intensity.

FIG. 3 represents intensity-time function for a system with improvements described herein.

I. SELECTION OF SOLVENTS

Figure 1:
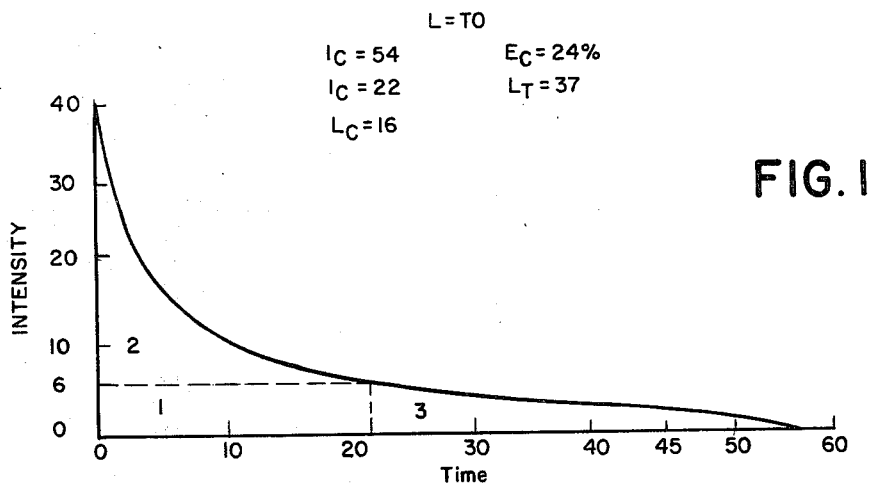
FIGS. 1-3 are graphic representations of intensity-time functions for three different systems all having the same light capacity.

The solvents of the two chemiluminescent components need not be the same provided they are miscible. Although the demands made on them in principle are similar, the different chemical reactivity of the two-component ingredients normally requires two different solvents. A good solvent should provide for high solubility of the chemiluminescent reactants, should be inert to them, have low vapor pressure at room temperature, low freezing point and minimum toxicity and should provide a good medium for the chemiluminescent reaction. The latter requirement will be considered in detail in Section IV following.

A. Selection of Solvent for the Oxalic Ester Component

The solubility of known strongly chemiluminescent oxalic esters is poor in most solvents. Solubilities of five oxalic esters and of bis(1-[1H]-2-pyridonyl)glyoxal (PG) in twenty-give solvents are summarized in Table I. Bis(2,4,6-trichlorophenyl)oxalate, TCPO, was most soluble in a mixture of o-dichlorobenzene and Freon 214 ® (89-11% vol.). Aside from halocarbons, the highest solubilities of TCPO are obtained in hydrocarbons such as benzene and in ester solvents such as ethyl benzoate. Although bis(3-trifluoromethyl-4-nitrophenyl)oxalate (TFMNPO) was soluble up to $40 \times 10^{-2}$ M (over five-fold more than TCPO) the solutions of TFMNPO are not sufficiently stable (as will be explained in Section III subsequently). The other oxalic esters showed substantially lower solubilities than TCPO.

To obtain low freezing solvents a mixture of halocarbons can be used. Solvent Mixture A (o-dichlorobenzene-Freon-214 ® 89-11% vol.) freezes below $-40°$ C and Mixture B (o-dichlorobenzene-m-dichlorobenzene 75-25% vol.) freezes below $-35°$ C. The solubility of TCPO in these solvents is $7.2 \times 10^{-2}$ M and $6.8 \times 10^{-2}$ M, respectively.

Solvents for the oxalate component must be substantially free of water, nucleophiles, bases and acids to assure storage stability of the oxalic ester (See Section III). Acid or base impurities present or formed during storage could change the performance of the chemiluminescent system significantly.

B. Selection of Solvent for the Hydrogen Peroxide Component

Hydrogen peroxide is a strong oxidizing agent and is soluble in polar hydrogen bonding solvents. The critical requirements for a hydrogen peroxide solvent are as follows: (1) be inert to hydrogen peroxide; (2) provide sufficient $H_2O_2$ solubility; (3) be miscible with the halocarbon and ester solvents of the oxalic ester component; and (4) provide a satisfactory medium for the chemiluminescent reaction.

Alcohols, especially tertiary alcohols, are sufficiently inert (See Section III) and satisfy all other requirements. The tertiary alcohol, 3-methyl-3-pentanol, and the secondary alcohol, 2-octanol, have satisfactory physical properties (freezing point and vapor pressure). The alcohol solvents of the peroxide component improve the performance of the chemiluminescent reaction (as explained in Section IV subsequently). However, the reaction with TCPO produces little or no light in 100% alcohol.

Unreactive esters such as dibutyl phthalate in the absence of base catalysts are satisfactory substitutes for alcohols. Perfluoro ethers such as Freon-E-2 ® and fluoro carbons such as Freon-214 ® are either not miscible with the oxalic ester solvents or do not dissolve hydrogen peroxide. E-ethers such as bis(2-methoxyethyl) ether (diglyme) react with hydrogen peroxide. Another potentially good hydrogen peroxide solvent, water, is not miscible with the oxalic ester solvents.

The following specific examples are given to illustrate the invention and are not intended to be limitative.

EXAMPLE I

Solubility data of five strongly chemiluminescent oxalic esters and bis(1-[1H]-2-pyridonyl) glyoxal (PG) are collected in Table I. Bis(3-trifluoromethyl-4-nitrophenyl)oxalate has the highest 0.4 M solubility n 1,2-dimethoxyethane among the oxalic esters tested.

Bis(2,4,6,-trichlorophenyl) oxalate (TCPO) in general shows a higher solubility than bis(pentachlorophenyl) oxalate (PCPO) or bis(2,4-dinitrophenyl) oxalate or bis(2,4-dinitro-6-methylphenyl) oxalate (DNMPO) and PG. The best solubility of TCPO ($7.2 \times 10^{-2}$ M) was obtained in Solvent Mixture A (o-dichlorobenzene-Freon-214 ®89-11% vol.).

TABLE I

| | Solubility of Selected Oxalic Esters in Selected Solvents[a] | | | | | |
|---|---|---|---|---|---|---|
| | Solubility ($10^2$ M) | | | | | |
| Solvents | TCPO | PCPO | DNPO | DNMPO | TFMNPO | PG |
| (1) Hydrocarbons | | | | | | |
| benzene | +6 | −1 | +2 | 2.1 | P | 3.6 |

TABLE I-continued

Solubility of Selected Oxalic Esters in Selected Solvents[a]

| Solvents | Solubility ($10^2$ M) | | | | | |
|---|---|---|---|---|---|---|
| | TCPO | PCPO | DNPO | DNMPO | TFMNPO | PG |
| t-butylbenzene | 1 | | | | | |
| tetralin | +2 | | P | | | −1 |
| (2) Halocarbons | | | | | | |
| chlorobenzene | +3 | | | | | |
| o-dichlorobenzene | 6.5 | +2 | −1 | | | +2 |
| Arochlor-1232 ® i | 6.8 | 0.8 | | | | 1 |
| 1,1,2,2-tetrachloro-ethane | 2 | +1 | P | | | +2 |
| a,a,a-trifluoro-toluene | 1 | −1 | P | | | −1 |
| cyclohexylchloride | | | | | | |
| hexachloropropanone-2 | +2 | −1 | P | | | P |
| Freon-E 3 ® | P | | P | | | P |
| Freon-E 2 | | | | | | |
| (3) Esters | | | | | | |
| ethyl benzoate | 4.2 | +1 | | | | |
| ethyl carbonate | 1 | −1 | P | | | −1 |
| ethyl oxalate | | −1 | 1.0 | 1.7 | 15.0 | 2 |
| dimethyl phthalate | 1.4 | 0.4 | 2.8 | 3.5 | 5.0 | 3 |
| dibutyl phthalate | P | −1 | P | | | 1 |
| diethyl malonate | | | | | | |
| butyl butyrate | −1 | | | | | |
| triacetin | −1 | | | | | |
| tributyl borate | | | | | | |
| tetraethyl ortho-silicate | | | | | | |
| triethyl phosphate | 1.2 | P | −2 | | 10.0 | 4.4 |
| tritolyl phosphate | +3 | | | | | |
| (4) Ethers | | | | | | |
| 1,2-dimethoxyethane | 4.5 | 1.5 | 4.0 | 2.8 | 40.0 | 3.3 |
| β-chloroethyl ether | 1.0 | 0.4 | P | | | +2 |
| m-dimethoxybenzene | | | | | | 1.5 |
| (5) Silicones | | | | | | |
| Silicon Fluid SF-97(10) | −1 | −1 | −1 | | | |
| Silicon Fluid SF-85(50) | −1 | −1 | −1 | | | |
| Silicon Fluid SF-1038(50) | −1 | −1 | −1 | | | |
| (6) Solvent mixtures | | | | | | |
| Mixture A (o-dichlorobenzene-Freon-214 89–11%) | 7.2 | 2.4 | | | | |
| Mixture B (o-dichlorobenzene-m-dichlorobenzene 75–25%) | 6.8 | 3.3 | | | | |

Footnote:
[a]The solubilities were determined by one of the three methods:
(1) A sample of oxalic ester was weighed and added to a sufficient amount of solvent to make a 1 × $10^{-2}$ M solution. After ten hours stirring at 25° C. the solubility was classified as P (poor) if most of the ester remained undissolved or −1 if almost all dissolved and 1 if all dissolved and +1 if dissolved readily but solubility was substantially less than 2 × $10^{-2}$ M as determined by Test 2.
(2) A sample of oxalic ester was weighed and added to a sufficient amount of solvent to make a 2 × $10^{-2}$ M solution. After ten hours stirring at 25° C. the solubility was classified as −2 if the oxalic ester passed Test 1 but not all the ester dissolved in Test 2, or 2 if all ester dissolved, and +2 if all ester dissolved readily.
(3) Approximate solubilities were determined by the periodic addition in 15-minute intervals of small portions (0.2–0.3 ml.) of solvent to a test tube containing a known amount (100 mg.) of the compound being stirred by a magnetic stirrer, until all the compound dissolved. Reagent grade solvents were used without further purification with the exception of propylene carbonate and 1,2-dimethoxyethane which were dried and distilled.

II. SELECTION OF FLUORESCER

The fluorescer is the light emitting species of the chemical lighting system. The oxalic ester-hydrogen peroxide-fluorescer reaction generates the first singlet excited state of the fluorescer which then emits the light. To obtain a high light capacity the reaction should produce a high quantum yield of chemiluminescent light and the wavelength of the light should be close to 555 mµ to which the human eye is most sensitive. Thus, the fluorescer should have a high photoptic value ($P \geq 0.70$). A superior fluorescer must be soluble in one of the solvent components and in the combined component and should also remain sufficiently stable during the shelf-life of the chemiluminescent system as well as during the course of the reaction.

Two fluorescers that satisfy all requirements are 9,10-bis(phenylethynyl) anthracene and 5,12-bis(phenylethynyl)tetracene. Rubrene, an otherwise excellent fluorescer, does not have good stability. The color of the chemiluminescent light may be varied by the appropriate selection of fluorescers. Thus, 9,10-diphenylanthracene (CPA) and perylene may be employed to produce blue and green light emissions respectively.

These and other fluorescers find important use in signalling and color coding.

EXAMPLE II

The stabilities of rubrene and BPEA (9,10-bis(-phenylethynyl) anthracene fluorescers during the course of the bis (1-[1H]-2-pyridonyl) glyoxal reaction are compared in Table II in four solvents. The results indicate that rubrene is destroyed completely during the course of the reaction in o-dichlorobenzene and bis(2-chloroethyl) ether solvents. Thus, rubrene is substantially less stable than BPEA.

TABLE II

Stability of Fluorescers During the Bis(1-[1H]-2-pyridonyl) glyoxal (PG) Chemiluminescent Reaction[a]

| Fluorescer | Solvent | Relative Intensities at Reaction Times (min.) | | | | $I_{max}$[b] |
|---|---|---|---|---|---|---|
| | | 2.5 | 5 | 10 | 15 | |
| Rubrene | dibutylphthalate | 7 | 7 | 5.5 | 4.5 | 7 |
| BPEA[c] | dibutylphthalate | 15 | 10 | 4 | 1.5 | 17 |
| Rubrene | diethyloxalate | 10 | 8 | 5 | 3 | 15 |
| BPEA | diethyloxalate | 12 | 7 | 1.5 | 0.5 | 22 |
| Rubrene | bis(2-chloroethyl) ether | 10 | 3 | 0 | 0(fluorescer destroyed) | 12 |
| BPEA | bis(2-chloroethyl) ether | 3 | 2 | 0.4 | 0.1 | 5 |
| Rubrene | o-dichlorobenzene | 16 | 10 | 0 | 0(fluorescer destroyed) | 24 |
| BPEA | o-dichlorobenzene | 9 | 8 | 5.5 | 4 | 9 |

[a]Concentrations of the chemiluminescent reaction were: $6.5 \times 10^{-3}$ M PG, $1.6 \times 10^{-2}$ M $H_2O_2$ and $4.3 \times 10^{-4}$ M rubrene and $2.2 \times 10^{-2}$ M trichloroacetic acid or $1 \times 10^{-4}$ M BPEA and $4.3 \times 10^{-2}$ M trichloroacetic acid
[b]Relative Maximum Intensity.
[c]9,10-bis(phenylethynyl) anthracene.

EXAMPLE III

Identical chemiluminescent reactions with bis(2,4,6-trichlorophenyl) oxalate, tetrabutyl ammonium perchlorate, hydrogen peroxide and rubrene were carried out in 1,1,2,2-tetrachloroethane, hexachloroacetone, o-dichlorobenzene solution. Qualitative visual observation indicated that the characteristic reddish-yellow color of rubrene disappeared during the course of the reaction indicating the destruction of rubrene. Rubrene was more rapidly destroyed in the 1,1,2,2-tetrachloroethane and hexafluoroacetone than in o-dichlorobenzene.

III STORAGE STABILITY

Component solutions for practical chemical lighting systems must be capable of extended storage without serious loss of light capacity. The oxalate ester system involves two chemical reactants, the ester and hydrogen peroxide, and thus requires storage of two separate component solutions which produce light on mixing. A fluorescer is also required for chemiluminescence and must be present in one of the two-component solutions. Moreover, at least one of the component solutions must also contain any additional ingredients (e.g., catalyst) required for lifetime control, light capacity improvement, or light intensity decay adjustment.

Satisfactory storage stability of a system component solution clearly requires that the active ingredients in that component be unreactive with each other, and with the solvent, and the container, and that reactive impurities be absent. This places obvious limitations on the formulation of components. High chemiluminescence efficiency in oxalate esters requires that the ester be highly reactive toward nucleophiles. Thus the ester-containing component must be stored in a non-nucleophilic solvent, which is free of nucleophilic additives or impurities. The purity requirement is substantial, since useful ester storage concentrations are as low as 0.02 molar; as little as 0.01% water, alkali or other nucleophilic impurity would be sufficient to decrease light capacities by as much as 25% in a 0.02 M ester solution.

Similarly, the hydrogen peroxide component solution must be free of trace metals or other impurities which decompose hydrogen peroxide. Since hydrogen peroxide will oxidize certain organic fluorescers, it is clear that such fluorescers must be stored in the ester component. (Non-oxidizable fluorescers and certain additives, however, might in principle, be combined with the hydrogen peroxide component.)

Basic and nucleophilic catalyst on the other hand would best be stored in the hydrogen peroxide solution. (Neutral salts or non-nucleophilic organic catalyst might in principle be combined with the ester component.)

The satisfactory storage stability of the two components also requires a careful choice of container materials. The first component consisting of the oxalic ester and fluorescer solution must be stored in a container which does not decompose the ester or fluorescer by surface catalysis or by the release of nucleophiles through leaching by the solvent. On these grounds soft glass is a poor material. Plastics, such as Teflon or polyethylene, which are non-permeable to moisture, are satisfactory. Similarly, the second component must be stored in a container which does not decompose hydrogen peroxide by surface catalysis, or by releasing metal ions into the solution.

To evaluate the shelf life of various chemiluminescent compounds accelerated storage stability tests were carried out. In these tests, thirty days storage at 75° C. was considered to approximate two years storage at room temperature. Thus solutions which suffer relatively small losses of chemiluminescent quantum yield and light intensity or relatively small changes in lifetime during 30 days at 75° C. are considered sufficiently storage stable. In some tests the reactants were also assayed by other methods; the oxalic ester by infrared spectroscopy and the hydrogen peroxide iodometrically.

A. OXALATE COMPONENT STABILITY

The first component of the chemiluminescent mixture consists of the oxalic ester solution and preferably also contains the fluorescer. The stability of the ester component is dependent on the activity of a given oxalic ester in nucleophilic reactions and toward thermal decomposition and will depend on the solvent, the fluorescer and the container material as well as on the oxalic ester structure.

All four oxalic ester and bis(1-[1H]-2-pyridonyl) glyoxal (PG) are sufficiently stable in the solid state. However, TCPO (bis(2,4,6-trichlorophenyl)oxalate) and PCPO (bis(pentachlorophenyl)oxalate) and DNMPO (bis(2,4-dinitro-6-methylphenyl)oxalate) showed significantly better stability than DNPO (bis(2,4-dinitrophenyl)oxalate) and PG.

In solution, the less active TCPO and PCPO more than satisfy the 30-day stability requirement as 75° C. and are in general substantially more stable than the more active DNPO and TFMNPO (bis(3-trifluoromethyl-4-nitrophenyl)oxalate) or PG. Infrared analysis of the TFMNPO solution in triethyl phosphate established that the quantum yield loss on storage is caused by the decomposition of the ester rather than by the formation of an inhibitor byproduct.

The less active oxalic esters such as TCPO or PCPO are stable in benzene, chlorinated benzene or ester solutions. TCPO remained essentially unchanged for 30 days or longer at 75° C. in solutions such as benzene, t-butylbenzene, o-dichlorobenzene, $\alpha,\alpha,\alpha$-trichlorotoluene, Arochlor-1242 ®, ethylbenzoate and diethyl carbonate. However, these two and all other oxalic esters were unstable in auto-oxidizable ether solvents such as dibutyl Cellosolve and bis(2-chloroethyl)ether and also in triethyl phosphate.

Solutions of less active esters together with the fluorescer BPEA showed good storage stability in solvents in which the ester alone is stable. TCPO and BPEA remained stable for 60 days in ethyl benzoate and for 35 days in o-dichlorobenzene-Freon 214 ® (89-11) at 75° C. Similarly good storage stability was obtained in ethyl benzoate solution where the solution contained tetrabutyl ammonium perchlorate in addition to TCPO and BPEA. The storage stability of TCPO and DHV proved also to be satisfactory in both the presence and absence of tetrabutylammonium perchlorate in o-dichlorobenzene solution.

The container material strongly influenced the storage stability of the ester solution. Although DNPO showed only fair stability even under the best conditions in dimethyl phthalate solution, its stability was clearly better in Teflon and to a lesser extent in polypropylene than in pyrex containers. Similar results were obtained with TFMNPO in dimethyl phthalate.

EXAMPLE IV

Solutions of 0.02 M DNPO [bis(2,4-dinitrophenyl)oxalate] in DMP [dimethyl phthalate] TEP [triethyl phosphate] or DME [1,2-dimethoxyethane] were stored in Pyrex, polypropylene, or Teflon containers at 25° C., and the chemiluminescence quantum yields and lifetimes were determined as a function of storage time under standard reaction conditions. The results summarized in Table III indicate that unsatisfactory storage stability was found for solutions in the ester solvents DMP and TEP but that solutions in the ether solvent DME appeared relatively stable when stored in Pyrex, although the light yield was low. It is evident that DNPO solutions in both DMP and DME are more stable than solutions in TEP, and that DNPO solutions in DMP are more stable when stored in polypropylene or Teflon than when stored in Pyrex. Solutions in DME, however, were more stable than degassed solutions stored under argon. It was found that oxalic acid reacts rapidly with DNPO and that storage of a component solution containing both is not feasible. However, a substantial loss of quantum yield was observed after four weeks storage under all test conditions.

TABLE III

Storage Stability Experiments with Bis(2,4-dinitrophenyl)oxalate (DNPO)[a]

| Solvent[b] | Container | Stored Additive (Concentration, M) | | Storage Time in Weeks | | | | | |
|---|---|---|---|---|---|---|---|---|---|
| | | | | 0 | 1 | 2 | 3 | 4 | 8 |
| DMP | Pyrex | None | Q | 18.6 | 12.7 | 9.9 | 8.3 | 5.3 | 0.2 |
| | | | T¾L | 3.3 | 2.8 | 3.3 | 3.9 | 3.8 | 3.7 |
| DMP | Pyrex | CO$_2$ | Q | 18.6 | 13.6 | 11.7 | 10.5 | 10.0 | 8.8 |
| | | (Sat.) | T¾L | 3.5 | 3.1 | 2.6 | 2.4 | 2.7 | 3.1 |
| DMP | Pyrex | Oxalic Acid | Q | 13.9[c] | 8.8 | 7.5 | 4.8 | 3.7 | — |
| | | (0.00268) | T¾L | 3.0[c] | 3.0 | 2.7 | 3.4 | 2.9 | — |
| DMP | Polypropylene | None | Q | 18.6 | 15.3 | 14.2 | 14.4 | 12.8 | 8.4 |
| | | | T¾L | 3.3 | 2.8 | 3.4 | 3.4 | 3.5 | 4.2 |
| DMP | Teflon | None | Q | 15.6[d] | — | — | 12.5 | 11.2 | — |
| | | | T¾L | 4.3[d] | — | — | 11.7 | 6.5 | — |
| TEP | Pyrex | None | Q | 5.9 | 2.3 | 0.8 | 0 | — | — |
| | | | T¾L | 21.8 | 31.0 | 22.6 | 0 | — | — |
| TEP | Polypropylene | None | Q | 5.9 | 0.2 | 0 | — | — | — |
| | | | T¾L | 21.8 | 39.1 | 0 | — | — | — |
| TEP | Polypropylene | Oxalic Acid | Q | 4.4[c] | 0 | — | — | — | — |
| | | (0.00268) | T¾L | 21.3[c] | 0 | — | — | — | — |
| TEP | Polypropylene | CO$_2$ | Q | 4.3 | 0 | — | — | — | — |
| | | (Sat.) | T¾L | 21.7 | 0 | — | — | — | — |
| DME | Polypropylene | None | Q | 4.1 | 0 | — | — | — | — |
| | | | T¾L | 37.3 | 0 | — | — | — | — |
| DME | Pyrex | Oxalic Acid | Q | 5.0 | 4.5 | 4.2 | 3.4 | 3.3 | |
| | | (0.00268) | T¾L | 31.3 | 16.5 | 23.0 | 14.6 | 21.1 | |
| DME | Pyrex | None | Q | 4.1 | 5.2 | 4.7 | 4.3 | 3.9 | — |

TABLE III-continued

Storage Stability Experiments with Bis(2,4-dinitrophenyl)oxalate (DNPO)[a]

| Solvent[b] | Container | Stored Additive (Concentration, M) | | Storage Time in Weeks | | | | | |
|---|---|---|---|---|---|---|---|---|---|
| | | | | 0 | 1 | 2 | 3 | 4 | 8 |
| | | | T¾L | 37.3 | 21.1 | 46.9 | 44.6 | 50.8 | — |

Q = Quantum Yield × $10^2$ based on oxalate concentration.
T¾L = Time in minutes required for three-quarters of the total light to have been emitted.
[a]Solutions of 0.02 M DNPO in the indicated solvent stored at 25° C. Containers were washed well and shaken 48 hours with the reaction solvent prior to use. Chemiluminescence assay reaction was carried out with 0.01 M DNPO, 0.025 M $H_2O_2$ and 6 × $10^{-4}$ M rubrene in the indicated solvent by diluting an aliquot of the stored DNPO solution with freshly prepared reagent solutions. The quantum yield is given in units of einsteins mole$^{-1}$ × $10^2$, and the lifetime, T¾L, is in minutes.
[b]DMP is dimethyl phthalate; TEP is triethyl phosphate; DME is 1,2-dimethoxymethane
[c]Measured 30 minutes after preparation of the DNPO-oxalic acid solution.
[d]This sample of DNPO, while purified in the usual way, gave initial quantum yields substantially below the norm, and the instability observed may be caused by impurities.

EXAMPLE V

Solutions of 0.02 M bis(3-trifluoromethyl-4-nitrophenyl)oxalate (TFMNPO) in triethyl phosphate (TEP) were stored in Pyrex, polypropylene, or Teflon containers and chemiluminescence quantum yields and lifetimes were determined under standard reaction conditions, as a function of storage time. The results are summarized in Table IV. Storage stability of TFMNPO solutions in TEP was poor although much better stability was obtained in Teflon than in Pyrex or polypropylene containers. It is evident that carbon dioxide substantially increases the stability of TFMNPO in TEP-polypropylene in agreement with the increase in stability that carbon dioxide produces in the DNPO-DMP-pyrex system. A significant loss of quantum yield was observed after four weeks of storage.

TABLE IV

Storage Stability Experiments with Bis(3-trifluoromethyl-4-nitrophenyl)oxalate (TFMNPO)[a]

| Solvent[b] | Container | Additive Concentration (M) | | Storage Time in Weeks | | | | | |
|---|---|---|---|---|---|---|---|---|---|
| | | | | 0 | 1 | 2 | 3 | 4 | 8 |
| TEP | Pyrex | None | Q.Y. | 18.1 | 13.1 | 7.8 | 5.6 | — | — |
| | | | T3/4L | 5.8 | 3.3 | 2.3 | 3.7 | — | — |
| TEP | Polypropylene | None | Q.Y. | 18.1 | 10.2 | 4.7 | — | — | 0.03 |
| | | | T3/4L | 5.8 | 3.0 | 1.3 | — | — | 7.4 |
| TEP | Polypropylene | $Bu_4N^+ClO_4^-$ (0.02) | Q.Y. | 16.1 | 7.3 | 4.7 | — | — | — |
| | | | T3/4L | 3.1 | 2.0 | 3.2 | — | — | — |
| TEP | Polypropylene | $CO_2$ (Sat) | Q.Y. | 17.8 | 16.5 | 15.8 | 14.0 | 13.5 | — |
| | | | T3/4L | 4.1 | 6.7 | 12.9 | 12.6 | 25.1 | — |
| TEP | Teflon | None | Q.Y. | 18.7 | 16.6 | 16.0 | 15.1 | 14.2 | 11.4 |
| | | | T3/4L | 16.1 | 95.2 | 36.7 | 87.1 | 64.6 | 70.3 |

[a]Solutions of 0.02 M TFMNPO in the indicated solvent stored 25° C. Containers were washed well and shaken 48 hours with the reaction solvent prior to use. Chemiluminescence reactions were carried out with 0.01 M TFMNPO, 0.025 M $H_2O_2$ and 6 × $10^{-4}$ M rubrene in the indicated solvent by diluting an aliquot of the stored TFMNPO with freshly prepared reagent solutions. Q.Y. = quantum yield in units of einstein mole$^{-1}$ × $10^2$ and T3/4L, the lifetime, is in minutes.
[b]TEP is triethyl phosphate

EXAMPLE VI

The concentration of TFMNPO in stored TEP solutions was monitored by infrared spectral analysis. The results summarized in Table V show that the decrease in quantum yield approximately parallels the destruction of TFMNPO. Thus the loss in quantum yield results from loss of active ester rather than from the appearance of quenchers.

TABLE V

Infrared Spectroscopic Analyses of Stored TFMNPO Solutions in TEP

| Absorbance at 1803 cm$^{-1}$ in a 0.5 mm Cell | [TFMNPO][a] (Moles Liter$^{-1}$) | Quantum Yield × $10^{2b}$ (Einsteins Mole$^{-1}$) |
|---|---|---|
| 0.36[c] | 2 × $10^{-2c}$ | 18.1 |
| 0.22 | 1.2 × $10^{-2}$ | 14.2 |
| 0.07 | 0.39 × $10^{-2}$ | 4.9 |
| 0.00 | 0 | 0 |

[a]Concentration based on IR absorbance and Beer's Law.
[b]Chemiluminescence quantum yield measured with 0.01 M TFMNPO, 0.025 M $H_2O_2$ and 6 × $10^{-4}$ M rubrene in TEP at 25° C. Representative experiments from Table V, stored under various conditions.
[c]Stock solution of TFMNPO made up to be 2 × $10^{-2}$ M in triethyl phosphate (TEP).

EXAMPLE VII

Solutions of 2 × $10^{-2}$ M PG (bis(1-[1H]-2-pyridonyl)-glyoxal were stored in Teflon bottles. Storage stability was evaluated by periodic measurements of chemiluminescent light emmission as shown in Table VI. The results indicate that PG was stable in three solutions, diethyl oxlate, o-dichlorobenzene and dibutyl phthalate for 13 days at room temperature but deteriorated rapidly at 50° C. Similarly PG was unstable in four other solvents, dimethyl phthalate, chlorobenzene, benzene and triethyl phosphate, at 50° C.

TABLE VI

Storage Stability of Bis(1-[1H]-2-pyridonyl)glyoxal Solutions)

| Solutions | | 25° C.) 6 days | Storage[a] 25° C.) 13 days | 50° C. 7 days | 50° C. 20 days | 50° C. 27 days |
|---|---|---|---|---|---|---|
| (1) diethyloxalate | Q.Y. | 3.46 | 4.76 | | 0.006 | |
| ($2 \times 10^{-2}$ M)[b] | t¾ | 3.83 | 6.3 | | 6.8 | |
| (2) o-dichlorobenzene Q.Y. | | 4.83 | 5.4 | 2.6 | 0.3 | |
| ($2 \times 10^{-2}$ M)[c] | t¾ | 5.3 | 6.3 | | 10.4 | 18.4 |
| (3) dibutyl phthalate | Q.Y. | 7.4 | 8.1 | | 2.3 | 0.5 |
| ($1 \times 10^{-2}$ M)[d] | t¾ | 4.1 | 5.2 | | 4.5 | 4.7 |
| (4) dimethyl phthalate | Q.Y. | 13.1 | — | 3.6 | — | — |
| ($2 \times 10^{-2}$)[e] | t¾ | 7.1 | — | 11.1 | — | — |
| (5) benzene | Q.Y. | 13.0 | — | 4.3 | — | — |
| ($1 \times 10^{-2}$)[f] | t¾ | 5.8 | — | 7.8 | — | — |
| (6) chlorobenzene | Q.Y. | 12.3 | — | 10.1 | 2.3 | — |
| ($1 \times 10^{-2}$)[f] | t¾ | 8.3 | — | 8.1 | 7.7 | — |
| (7) triethyl phosphate | Q.Y. | 7.1 | — | light | — | — |
| ($2 \times 10^{-2}$)[e] | t¾ | 36.7 | — | is too weak | — | — |

[a] Aliquots of the stored solutions were taken periodically as indicated and were subjected to a chemiluminescent measurement. The results are tabulated quantum yield (Q.Y.) (in units of $10^2 \times$ einstein mole$^{-1}$) and lifetime (t ¾), time in minutes required for the emission of ¾% the total light.
[b] Concentrations of the chemiluminescent reaction were: 0.0147 M PG, $6.0 \times 10^{-4}$ M BPEA (9,10-bis(phenylethynyl)anthracene), $5 \times 10^{-2}$ M CCl$_3$CO$_2$H and $5 \times 10^{-2}$ M H$_2$O$_2$.
[c] Concentrations of the chemiluminescent reaction were: $1.5 \times 10^{-2}$ M PG, $6 \times 10^{-4}$ M BPEA, $3.33 \times 10^{-2}$ M CCl$_3$CO$_2$H and $5 \times 10^{-2}$ H$_2$O$_2$.
[d] Concentrations of the chemiluminescent reaction were: $0.72 \times 10^{-2}$ PG, $6 \times 10^{-4}$ M BPEA, $6.67 \times 10^{-2}$ M CCl$_3$CO$_2$H and $5 \times 10^{-2}$ M H$_2$O$_2$.
[e] Concentrations of the chemiluminescent reaction were: $1 \times 10^{-2}$ M PG, $5 \times 10^{-2}$ M H$_2$O$_2$, $5.7 \times 10^{-4}$ M rubrene and $1 \times 10^{-1}$ M trichloroacetic acid
[f] Concentrations of the chemiluminescent reacting were: $0.67 \times 10^{-2}$ M PG, $2.5 \times 10^{-2}$ M H$_2$O$_2$, $4.5 \times 10^{-4}$ M rubrene and $3.3 \times 10^{-2}$ M trichloroacetic acid.

EXAMPLE VIII

The storage stability of solid PG, bis(1-[1H]-2-pyridonyl)glyoxal is shown in Table VII. The solid PG is storage stable for 58 days at 75° C. Thus the conclusion is that PG is not inherently stable at 75° C.

TABLE VIII

Storage Stability of Solid PG (bis(1-[1H]-2-pyridonyl)glyoxal) at 75° C.[a]

| Days of Storage | Quantum Yield[b] (einstein mole$^{-1}$ $\times 10^2$) | t¾ (min.) |
|---|---|---|
| 0 | 13.1 | 7.1 |
| 21 | 10.9 | 6.0 |
| 35 | 11.7 | 5.1 |
| 58 | 10.7 | 17.4 |

[a] The solid sample was stored in a Teflon FEP® bottle at 75° C.
[b] To assay for PG a chemiluminescent reaction was carried out under conditions as: $1 \times 10^{-2}$ M PG, $5 \times 10^{-2}$ M H$_2$O$_2$, $5.7 \times 10^{-4}$ M Rubrene, 0.1 M trichloroacetic acid at 25° C.

EXAMPLE IX

Storage stabilities of four esters in solid state are shown in Table VIII. Three esters remained unaffected by storage at 75° C. TCPO and DMNPO for 180 days and PCPO for 120 days, the duration of the test. DNPO lost approximately 25% efficiency after 180 days.

TABLE VIII

Storage Stabilities of Solid Esters at 75° C.

| Ester | Days at 75° C. | T¾[a] (min.) | Q.Y.[b] (einstein mole$^{-1}$ $\times 10^2$) |
|---|---|---|---|
| TCPO[c,d] | 0 | 23.76 | 17.2 |
| | 21 | 27.9 | 18.8 |
| | 35 | 16.1 | 11.3 |
| | 58 | 18.4 | 14.0 |
| | 120 | 29.5 | 14.7 |
| | 183 | 30.2 | 16.9 |
| PCPO[c,e] | 0 | 4.25 | 20.8 |
| | 14 | 4.25 | 20.8 |
| | 28 | 5.19 | 20.3 |
| | 101 | 7.3 | 19.2 |
| | 120 | 7.8 | 18.9 |
| DNPO[c] | 0 | 2.2 | 14.0 |
| | 21 | 1.8 | 11.7 |
| | 35 | 2.0 | 9.8 |
| | 58 | 1.8 | 13.7 |
| | 120 | 1.6 | 11.4 |
| | 183 | 2.0 | 9.9 |
| DNMPO[c,f] | 0 | 52.6 | 10.02 |
| | 21 | 8.89 | 9.29 |
| | 35 | 5.63 | 6.58 |
| | 58 | 5.17 | 6.39 |
| | 120 | 10.44 | 9.87 |
| | 183 | 42.6 | 10.87 |

[a] The emission time of 75% of all light.
[b] Based on ester.
[c] Concentrations of the chemiluminescent assay reaction: $1 \times 10^{-2}$ M oxalic ester, $2.5 \times 10^{-2}$ M H$_2$O$_2$, $6 \times 10^{-4}$ M rubrene in dimethyl phthalate at 25° C.
[d] $3.3 \times 10^{-3}$ M triethylamine catalyst used.
[e] $2.5 \times 10^{-5}$ M benzyltrimethylammonium hydroxide catalyst used.
[f] The concentration of H$_2$O$_2$ was $5.0 \times 10^{-2}$ M.

EXAMPLE X

The storage stability of bis(2,4,6-trichlorophenyl)oxalate [TCPO] tested in several solvents at 75° C. The results in Table III show that TCPO is stable in benzene, chlorinated benzene and ester solutions for at least 30–70 days. The successful tests involved solvents such as benzene, t-butyl-benzene, α,α, α-trichlorotoluene, o-dichlorobenzene, Arochlor® 1242, ethyl benzoate and diethyl carbonate. A poor storage stability was obtained in two ether solvents, dibutyl Cellosolve, bis(2-chloroethyl)ether, and in triethyl phosphate.

TABLE IX

TCPO Stability at 75° C. in Solution[a]

| Solvent | Days Storage | Quantum Yield(%) | Lifetime (T¾ in min.)[b] |
|---|---|---|---|
| Benzene[c,e] | 0 | 11.8 | 14.6 |
| | 30 | 10.5 | 20.8 |
| t-butyl-benzene[d,f] | 0 | 2.2 | 10.7 |
| | 21 | 1.8 | 15.1 |
| | 35 | 1.1 | 14.6 |
| α,α,α-trichlorotoluene[d,g] | 0 | 5.1 | 11.5 |
| | 27 | 5.1 | 23.7 |
| | 42 | 7.1 | 18.2 |
| o-dichlorobenzene[c,h] | 0 | 4.2 | 17.7 |
| | 27 | 3.3 | 18.9 |
| | 42 | 3.9 | 17.6 |
| | 55 | 3.3 | 18.9 |
| | 70 | 3.9 | 17.6 |
| Arochlor 1242[c,i] | 0 | 10.7 | 6.5 |
| | 30 | 14.0 | 18.2 |
| ethylbenzoate[c,j] | 0 | 5.1 | 12.6 |
| | 35 | 6.1 | 22.3 |
| | 60 | 4.9 | 12.6 |
| diethyl-carbonate[d,g] | 0 | 2.8 | 6.9 |
| | 27 | 2.6 | 19.9 |
| | 42 | 3.1 | 24.1 |
| | 55 | 2.6 | 19.9 |
| | 70 | 3.1 | 24.1 |
| triethyl phosphate[d,k] | 0 | 7.8 | 7.8 |
| | 7 | 1.5 | 5.2 |
| dibutyl cellosolve[d,l] | 0 | 1.4 | 5.1 |
| | 7 | 0 | — |
| bis(2-chloroethyl) | 0 | 2.3 | 16.2 |

TABLE IX-continued

TCPO Stability at 75° C. in Solution[a]

| Solvent | Days Storage | Quantum Yield(%) | Lifetime (T ¾ in min.)[b] |
|---|---|---|---|
| ethyl[d,m] | 7 | 0 | — |

[a]Samples were contained in Teflon FEP bottles. Reaction conditions vary according to solvent; the assay reactions are in 75% storage solvent and 25% dimethyl phthalate.
[b]Time required for ¾% total light emission.
[c]0.02 M ester.
[d]0.01 M ester.
[e]Concentrations of the assay reaction were: $1 \times 10^{-2}$ M TCPO, $2.5 \times 10^{-2}$ M $H_2O_2$, $6 \times 10^{-4}$ M rubrene and $3.3 \times 10^{-3}$ M triethylamine in 75% benzene and 25% dimethyl phthalate.
[f]Concentration of the assay reaction were: $0.6 \times 10^{-2}$ TCPO, $7.9 \times 10^{-4}$ M 9,10-bis(phenylethynyl)anthracene, $5.0 \times 10^{-2}$ tetrabutylammonium perchlorate, $5 \times 10^{-2}$ M $H_2O_2$ and $2 \times 10^{-4}$ M benzyltrimethylammonium hydroxide.
[g]Assay reaction is same as f, with the exception of 9,10-bis(phenylethynyl)anthracene concentration which was $10.7 \times 10^{-4}$ M.
[h]Concentrations of the assay reaction were: $1.2 \times 10^{-2}$ M TCPO, $10.0 \times 10^{-4}$ M 9,10-bis(phenylethynyl)anthracene, $5 \times 10^{-2}$ M $H_2O_2$ and $4 \times 10^{-4}$ M benzyltrimethylammonium hydroxide.
[i]Concentrations of the assay reaction were: $1 \times 10^{-2}$ M TCPO, $2.5 \times 10^2$ M $H_2O_2$, $6 \times 10^4$ M rubrene, and $3.3 \times 10^{-3}$ M triethylamine.
[j]Concentrations of the assay reaction were: $1.2 \times 10^{-2}$ M TCPO, $7.9 \times 10^{-4}$ M 9,10-bis(phenylethynyl)anthracene, $5 \times 10^{-2}$ M tetrabutyl ammonium perchlorate, $5 \times 10^{-2}$ M $H_2O_2$ and $2 \times 10^{-4}$ M benzyltrimethyl ammonium hydroxide.
[k]Concentrations of the assay reaction were: 0.667 $\times 10^{-2}$ M TCPO, $1.75 \times 10^{-2}$ M $H_2O_2$, $4.5 \times 10^{-4}$ M rubrene and $1 \times 10^{-3}$ M triethylamine.
[l]Same as k, except $3.3 \times 10^{-3}$ M triethylamine was used.
[m]Concentrations of the assay reaction were: $0.6 \times 10^{-2}$ M TCPO, $9.3 \times 10^{-3}$ M 9,10-bis(phenylethynyl)anthracene, $5 \times 10^{-2}$ M tetrabutylammonium perchlorate, $5 \times 10^{-4}$ M benzyltrimethylammonium hydroxide and $5 \times 10^{-2}$ M $H_2O_2$.

EXAMPLE XI

The stability of PCPO (bis(pentachlorophenyl)oxalate) is tested in three solvents at 75° C. The results shown in Table X indicate that PCPO is stable in o-dichlorobenzene for at least 120 days. Somewhat less but still satisfactory stability was obtained in ethyl benzoate and o-dichlorobenzene-Freon 214 (89-11%) solutions.

TABLE X

PCPO Stability at 75° C. in Solution[a]

| Solvent | Days Storage | Quantum Yield (einstein mole$^{-1}$ × 10$^2$) | Lifetime[b] (t¾ in min.) |
|---|---|---|---|
| o-dichlorobenzene[c,e] | 0 | 20.8 | 4.3 |
|  | 7 | 24.4 | 3.0 |
|  | 14 | 22.0 | 3.6 |
|  | 20 | 23.6 | 4.1 |
|  | 28 | 22.4 | 4.6 |
|  | 60 | 19.9 | 4.7 |
|  | 90 | 22.0 | 6.7 |
|  | 120 | 21.3 | 7.8 |
| ethyl benzoate[d,f] | 0 | 6.7 | 3.5 |
|  | 7 | 7.6 | 5.2 |
|  | 21 | 7.0 | 5.9 |
|  | 35 | 3.1 | 2.4 |
| o-dichlorobenzene-Freon-214 (89-11%)[c,g] | 21 | 12.2 | 10.8 |
|  | 35 | 9.5 | 6.4 |
|  | 49 | 8.7 | 5.1 |
|  | 70 | 7.8 | 4.8 |

[a]The PCPO (bis(pentachlorophenyl)oxalate) solutions were stored in a Teflon FEP® container at 75° C. The assay experiments were carried out in 75% storage solutions 25% dimethylphthalate at 25° C.
[b]Emmission time of 75% of the total light.
[c]Stored solution contained $2 \times 10^{-2}$ M PCPO.
[d]Stored solution contained $1 \times 10^{-2}$ M PCPO.
[e]Concentrations of the assay reaction were: $1 \times 10^{-2}$ M PCPO, $2.5 \times 10^{-2}$ M $H_2O_2$, $0.57 \times 10^{-3}$ M rubrene and $2.5 \times 10^{-5}$ M benzyltrimethylammonium hydroxide.
[f]Concentrations of the assay reaction were: $0.67 \times 10^{-2}$ M PCPO, $8.9 \times 10^{-4}$ M 9,10-bis(phenylethynyl)anthracene, $2.5 \times 10^{-2}$ M $H_2O_2$ and $0.33 \times 10^{-4}$ M benzyltrimethylammonium hydroxide.
[g]Concentrations of the assay reaction were: $1.2 \times 10^{-2}$ M PCPO, $8.4 \times 10^{-4}$ M 9,10-bis(phenylethynyl)anthracene, $5 \times 10^{-2}$ M tetrabutylammonium perchlorate, $6 \times 10^{-2}$ M $H_2O_2$ and $3.3 \times 10^{-5}$ M benzyltrimethylammonium hydroxide.

EXAMPLE XII

The storage stability of 0.02 M TCPO (bis(2,4,6-trichlorophenyl)oxalate) and 0.003 M 9,10-bis(phenylethynyl)anthracene (BPEA) in ethyl benzoate solution was tested at 75° C. The results are collected in Table XI. The TCPO-BPEA solution was stored for 60 days at 75° C. with a small loss of quantum yield (15%). The chemiluminescent light intensity changed little during 60 days storage. However, the quantum yield as well as intensity deteriorated more rapidly on further storage. Similarly good storage stability was obtained when the solution contained tetrabutylammonium perchlorate in addition to TCPO and BPEA.

TABLE XI

STORAGE STABILITY OF A SOLUTION OF BIS (2,4,6-TRICHLOROPHENYL OXALATE (TCPO) AND 9,10-BIS(PHENYLETHYNYL)ANTHRACENE (BPEA) IN ETHYL BENZOATE STORED IN TEFLON ® FEP ® AT 75° C. (167° F.)

| Stored Solution | Storage Time Days | Quantum Yield (10$^2$ Einstein Mole$^{-1}$) | Light Capacity (Lumen Hours Liter$^{-1}$) | Intensity (Foot Lamberts/cm$^2$) As A Function of Operating Time | | | |
|---|---|---|---|---|---|---|---|
| | | | | Time: 1 min. | 5min. | 10min. | 30min. |
| (1) 0.02 M TCPO + 0.003 M BPEA | 0 | 5.84 | 15.7 | 8.3 | 6.7 | 4.3 | 0.3 |
| | 60 | 4.93 | 13.3 | 5.3 | 4.7 | 3.5 | 1.0 |
| | 92 | 2.44 | 6.6 | .013 | .036 | 0.13 | 1.6 |
| (2) 0.04 M TCPO + 0.0027 M BPEA | 0 | 4.7 | 43.0 | 13.8 | 8.7 | — | 4.8 |
| | 30 | 3.8 | 34.6 | 13.0 | 9.1 | — | 2.2 |
| | 60 | 3.3 | 30.1 | 9.8 | 6.4 | — | 3.6 |
| (3) 0.0375 M TCPO + 0.0025 M BPEA + 0.0625 M TBAP | 0 | 3.4 | 31.0 | 8.4 | 6.7 | — | 2.2 |
| | 30 | 3.2 | 30.0 | 6.4 | 5.2 | — | 2.9 |
| | 60 | 2.3 | 9.0 | 2.9 | 3.6 | — | 0.4 |

(1) Chemiluminescent assay reactions were carried out with 1.5 ml. of stored oxalate component and an equal total volume of other reactant solutions. The chemiluminescent reaction mixture contained 0.01 M TCPO; 0.0015 M BPEA; 0.025 M $H_2O_2$ and 0.0002 M Triton B in a solvent mixture of 95% ethyl benzoate and 5% dimethyl phthalate.
(2) Chemiluminescent assay reactions were carried out with three volumes of stored oxalate compound and one volume of 0.006 M sodium salicylate and 0.30 M $H_2O_2$ in 3-methyl-3-pentanol. The concentrations of the assay reaction were: $3 \times 10^{-2}$ M TCPO, $2.0 \times 10^{-3}$ M BPEA, $7.5 \times 10^{-2}$ M $H_2O_2$ and $1.5 \times 10^{-3}$ M sodium salicylate in 75% ethyl benzoate and 25% 3-methyl-3-pentanol at 25° C.
(3) Chemiluminescent assay reactions were carried out with three volumes of stored ester solution and one volume of $6 \times 10^{-3}$ M sodium salicylate and $3 \times 10^{-1}$ M $H_2O_2$ in 3-methyl-3-pentanol. The concentrations of the assay reaction were: $2.8 \times 10^{-2}$ M TCPO, $1.9 \times 10^{-3}$ M BPEA, $4.7 \times 10^{-2}$ M TBAP (tetrabutyl ammonium perchlorate), $7.5 \times 10^{-2}$ M $H_2O_2$ and $1.5 \times 10^{-3}$ M sodium salicylate in 75% ethyl benzoate and 25% 3-methyl-3-pentanol at 25° C.

EXAMPLE XIV

The storage stability of 0.02 M TCPO (bis(2,4,6-trichlorophenyl)oxalate) and $3 \times 10^{-3}$ M BPEA (9,10-bis(phenylethynyl)anthracene) in o-dichlorobenzene-Freon-214 were tested at 75° C. The results are summarized in Table XIII. The TCPO-BPEA solution is stable for 30 days in a Teflon container at 75° C. After that time moderate loss of quantum yield and lifetime occurs.

TABLE XIII

Storage Stability of $2 \times 10^{-2}$ M TCPO (bis(2,4,6-trichlorophenyl)oxalate) and $3 \times 10^{-3}$ M BPEA (9,10-bis(phenylethynyl)anthracene) in o-dichlorobenzene-Freon-214 (89-11%) at 75° C.[a]

| Days Storage | Quantum Yield (einstein mole$^{-1} \times 10^2$) | Lifetime[b] (t ¾ in minutes) |
|---|---|---|
| 0 | 4.0 | 15.8 |
| 7 | 5.2 | 26.1 |
| 21 | 4.1 | 21.8 |
| 35 | 5.0 | 22.0 |
| 60 | 1.5 | 9.0 |

[a]The solution was stored in a Teflon FEP container at 75° C. Concentrations of the assay reaction were $1 \times 10^{-2}$ M TCPO, $1.5 \times 10^{-3}$ M BPEA, $2.5 \times 10^{-2}$ M H$_2$O$_2$ and $6 \times 10^{-4}$ M benzyltrimethyl ammonium hydroxide in 50% o-dichlorobenzene-Freon-214 mixture and 50% dimethyl phthalate.
[b]The emission time of 75% of the total light.

B. PEROXIDE STABILITY

The second component of the oxalic ester-hydrogen peroxide-fluorescer-catalyst system normally contains the hydrogen peroxide and possibly a catalyst as well. Basic catalysts are invariably stored in this component since bases decompose oxalic esters. The selection of an inert solvent is critical to assure the stability of hydrogen peroxide. The solvent must be stable to hydrogen peroxide even in the presence of basic catalysts when such catalysts are used.

Neutral hydrogen peroxide is sufficiently stable in tertiary alcohols and to a lesser extent in secondary alcohols. The required 30 days stability at 75° C. was substantially exceeded in t-butanol and in 3-methyl-3-pentanol. Primary alcohols such as 2-ethylhexanol-1 or 1,2-propanediol decomposed the hydrogen peroxide relatively rapidly. Dimethyl phthalate is also a satisfactory solvent in the absence of basic catalysts. Other esters such as ethyl benzoate, diethyl carbonate and triethyl phosphate provided poor stability. Dibutyl Cellosolve, an ether solvent, decomposed the peroxide relatively rapidly.

The stability of the hydrogen peroxide-catalyst component in a tertiary alcohol solution is strongly dependent on the choice of catalyst. The solutions containing sodium salicylate catalyst have sufficient stability after 60 hours at 75° C., but those containing benzyltrimethylammonium hydroxide, or tetrabutyl ammonium hydroxide were significantly less stable. The latter solution is stabilized by the addition of dimagnesium ethylenediamine-tetraacetate or polyvinylpyrrolidinone. The peroxide solution is also sufficiently stable in the presence of tetrabutyl ammonium salicylate or tetrabutyl ammonium perchlorate and phosphoric acid.

EXAMPLE XV

The storage stability of hydrogen peroxide in several solvents is shown in Table XIV. The indometric assay indicates that hydrogen peroxide is sufficiently stable in tertiary alcohols such as 3-methyl-3-pentanol. However it is less stable in secondary alcohols and decomposes rapidly in primary alcohols such as 2-ethylhexanol-1. Poor stability was obtained in ethyl benzoate. The assay by a standard chemiluminescent reaction indicates that hydrogen peroxide is sufficiently stable in t-butanol, a tertiary alcohol, and in dimethyl phthalate. Poor stability was obtained, however, in diethyl carbonate and in triethyl phosphate. Hydrogen peroxide decomposed relatively rapidly in dibutyl Cellosolve, an ether solvent.

TABLE XIV

HYDROGEN PEROXIDE STABILITIES[a]

| Solvent | H$_2$O$_2$ (mole l$^{-1}$) | Days at 75° | H$_2$O$_2$ Loss[b] (%) | Quantum Yield[c] (einstein mole$^{-1} \times 10^2$) | t ¾[c] (min.) |
|---|---|---|---|---|---|
| t-Butanol | 0.25 | 0 | | 6.8 | 34.6 |
| | | 7 | | 8.7 | 87.2 |
| | | 21 | | 7.5 | 47.6 |
| | | 35 | | 6.8 | 51.7 |
| | | 60 | | 5.1 | 48.9 |
| | | 107 | | light is too weak to measure | |
| 3-Methyl-3-Pentanol | 0.10 | 4 | 2 | | |
| | | 38 | 8 | | |
| | | 42 | 38 | | |
| | | 77 | 91 | | |
| 2-Octanol | 0.10 | 7 | 17 | | |
| | | 21 | 82 | | |
| | | 42 | 94 | | |
| 2-Ethylhexanol-1 | 0.10 | 7 | 52 | | |
| 1,2-Propanediol | 0.10 | 7 | 96 | | |
| Dimethyl Phthalate | 0.25 | 0 | | 13.5 | 16.4 |
| | | 14 | | 12.8 | 18.4 |
| | | 21 | | 13.6 | 11.7 |
| | | 28 | | 13.3 | 10.1 |
| | | 58 | | 11.3 | 11.7 |
| Ethyl Benzoate | 0.10 | 7 | 47 | | |
| Diethyl Carbonate | 0.25 | 0 | | 4.0[d] | 16.0[d] |
| | | 7 | | 4.6[d] | 25.5[d] |
| | | 21 | | 3.0[d] | 13.6[d] |
| | | 35 | | 0.9[d] | 6.1[d] |
| Triethyl Phosphate | 0.25 | 0 | | 10.1[d] | 4.8[d] |
| | | 14 | | 14.7[d] | 17.6[d] |
| | | 21 | | 14.7[d] | 32.6[d] |
| | | 28 | | 6.9[e] | 8.8[e] |
| | | 58 | | light is too weak to measure | |
| Dibutyl Cellosolve | 0.25 | 0 | | 11.6 | 11.5 |

TABLE XIV-continued

| Solvent | HYDROGEN PEROXIDE STABILITIES[a] | | | | |
|---|---|---|---|---|---|
| | $H_2O_2$ (mole $l^{-1}$) | Days at 75° | $H_2O_2$ Loss[b] (%) | Quantum Yield[c] (einstein mole$^{-1}$ × 10$^2$) | $t_{\frac{3}{4}}$[c] (min.) |
| | | 7 | | light is too weak to measure | |

[a]The solutions were stored in Teflon FEP ® container at 75°.
[b]The $H_2O_2$ content was assayed by iodometric analysis.
[c]The $H_2O_2$ content was assayed by the chemiluminescent reaction of 1 × 10$^2$ M bis(2,4,6-trichlorophenyl)oxalate, 2.5 × 10$^2$ M $H_2O_2$ (of the test solution), 1 × 10$^3$ M 9,10-bis(phenylethynyl)anthracene and 6.6 × 10$^4$ benzyltrimethylammoniumhydroxide in solution at 25°.
[d]The $H_2O_2$ content was assayed as in [c], but the fluorescer was 5.7 × 10$^{-4}$ M Rubrene and the catalyst was 3 × 10$^{-3}$ M triethylamine.
[e]The $H_2O_2$ content was assayed as in [d], but the catalyst was 6 × 10$^{-3}$ M triethylamine.

EXAMPLE XVI

The storage stabilities of solutions of hydrogen peroxide containing several catalysts in t-butyl alcohol are summarized in Table XV. It is evident that solutions containing the catalyst sodium salicylate (NaSal) or dimagnesium ethylenediamine-tetraacetate (Mg$_2$EDTA) have better stabilities than those containing benzyltrimethylammonium hydroxide (BzMAH) or tetrabutylammonium pentachlorophenoxide (BuAPCP). The latter solution however, is stabilized to a degree by the additives Mg$_2$EDTA and polyvinylpyrrolidinone (PVP). It is clear that buffer catalyst systems with phosphoric acid or tartaric acid are relatively unstable. The addition of (C$_6$H$_5$)$_3$ SnOH accelerates the decomposition of the BuAPCP containing solution.

Although components containing the catalysts BzMAH or BuPCP may be sufficiently stable for use, they do not appear to offer any advantage over the more stable sodium salicylate components, for brighter, relatively short-lived systems. Mg$_2$EDTA appears to be satisfactory for longer-lived systems.

TABLE XV

HYDROGEN PEROXIDE DECOMPOSITION IN t-BUTYL ALCOHOL CATALYST SOLUTIONS STORED IN TEFLON FEP AT 75° C. (167° F.)

| Days at 75° C. | $H_2O_2$ LOSS (%) IN STORED SYSTEMS[a] | | | | | | |
|---|---|---|---|---|---|---|---|
| | B2MAH[b] (0.0026 M) Mg$_2$EDT[c] (excess) $H_2O_2$ (1.0 M) | B2MAH[b] (0.006 M) DACTA[d] (excess) $H_2O_2$ (1.0 M) | B2MAH[b] (0.025 M) H$_3$PO$_4$ (0.028 M) $H_2O_2$ (1.0 M) | B2MAH[b] (0.025 M) H$_3$PO$_4$(0.028 M) + TEAP[i] (0.5 M) + $H_2O_2$ (1.5 M) | BuAPCP[e] (0.0026 M) $H_2O_2$ (1.0 M) | BuAPCP[e] (0.0026 M) Mg$_2$EDTA[c] (excess) $H_2O_2$ (1.0 M) | BuAPCP[e] (0.0050 M) PVP[f] (2%) $H_2O_2$ (0.34 M) |
| 7 | 1 | — | 6 | 30 | — | — | — |
| 14 | 10 | 13 | 18 | 79 | 10 | 8 | 12 |
| 21 | 16 | 21 | — | | 26 | 14 | — |
| 28 | | 26 | 44 | | 54 | 16 | 20 |
| 35 | | 36 | 58 | | | 23 | |
| 42 | | 45 | 70 | | | 29 | |
| 50 | | | | | | 40 | |
| 80 | | | | | | | |
| 90 | | | | | | | |

| Days at 75° C. | $H_2O_2$ LOSS (%) IN STORED SYSTEMS[a] | | | | | |
|---|---|---|---|---|---|---|
| | BuAPCP[e] (0.0112 M) $H_2O_2$ (1.0 M) | (C$_6$H$_5$)$_3$SnOH (0.00167 M) + $H_2O_2$ (1.0 M) | BuAH[g] (0.0017 M) Tartaric Acid (0.15 M) $H_2O_2$ (1.0 M) | Na SAL[h] (0.015 M) $H_2O_2$ (0.75 M) | Na SAL (0.075 M) $H_2O_2$ (0.395 M) | Mg$_2$EDTA[c] (excess) $H_2O_2$ (1.0 M) |
| 7 | 0 | | 30 | 3 | 0 | — |
| 14 | 73 | | 34 | 6 | | |
| 21 | | | | 6 | | — |
| 28 | | | | | 9 | |
| 35 | | | | 13 | | 4 |
| 42 | | | | | | 13 |
| 50 | | | | 20 | 27 | |
| 80 | | | | 30 | | |
| 90 | | | | | 34 | |

[a]Iodometric titration in acetic acid
[b]Benzyltrimethylammonium hydroxide
[c]Dimagnesium ethylenediaminetetraacetate
[d]1,2-Diaminocyclohexanetetraacetic acid
[e]Tetrabutylammonium pentachlorophenoxide
[f]Polyvinylpyrrolidinone
[g]Tetrabutylammonium hydroxide
[h]Sodium salicylate
[i]Tetrabutylammonium perchlorate

EXAMPLE XVII

Storage stability data for hydrogen peroxide solutions containing salicylate catalysts are summarized in Table XVI. The solutions are being stored at 75° C. (167° F.) in TEFLON ®FEP containers and are assayed periodically for hydrogen peroxide content by iodometric titration and for chemiluminescence performance in a standard TCPO reaction system.

Sodium salicylate and hydrogen peroxide in t-butyl alcohol was found to lose only 30% of the initial hydrogen peroxide during 80 days at 75° C. and to essentially maintain the original light capacity. Although the initial intensities decreased, somewhat, the emission lifetime increased, suggesting that the bacisity decreases with storage time. It is clear, however, that this component remains useful beyond 80 days at 75° C. Appreciably better chemiluminescence performance was obtained from a similar solution containing dimagnesium ethylenediaminetetraacetate, although the hydrogen peroxide loss was somewhat higher. Considerably larger hydrogen peroxide and light capacity losses were found for a hydrogen peroxide and sodium salicylate solution in 3-methyl-3-pentanol, indicating that 80 days at 75° C. approaches the useful stability limit. Thus, while 10-minute intensities were essentially unchanged after 55 days storage, after 80 days storage the 10-minute intensity was halved to 7.8 foot lamberts cm$^{-1}$ and only 30% of the original hydrogen peroxide remained.

The addition of 10% methanol or ethanol (to lower the freezing point) to tertiary alcohol hydrogen peroxide-sodium salicylate components considerably reduces the component stability, although a methanol-3,6-dimethyloctanol system remained useful after 42 days storage.

Satisfactory stability has been obtained from solutions of hydrogen peroxide and tetrabutylammonium salicylate in 3-methyl-3-pentanol during 33 days at 75° C.

EXAMPLE XVIII

The storage stabilities of hydrogen peroxide and various catalysts in solution at 75° C. are shown in Table XVII. The solution of hydrogen peroxide, TBAP (tetrabutyl ammonium perchlorate) and phosphonic acid in 3-methyl-3-pentanol showed a moderate loss of peroxide which did not change the chemiluminescence quantum yield or intensity significantly. In the absence of phosphoric acid in dimethyl phthalate, the hydrogen peroxide and TBAP solution was unstable. The chemiluminescence assay reaction indicated that the hydrogen peroxide—acetanilide solution suffered a moderate loss of light capacity and intensity after 30 days in 3-methyl-3-pentanol. However, the iodometric assay indicated that only a small fraction of the peroxide decomposed during that time. Therefore, the decomposition of acetanilide and the quenching effect of decomposition products are probably responsible for the loss.

TABLE XVI
CHEMILUMINESCENCE PERFORMANCE OF HYDROGEN PEROXIDE - SALICYLATE COMPONENTS STORED AT 75° C. (167° F.) IN TEFLON FEP CONTAINERS[a]

| Peroxide Component Solvent (additive) | Storage Time (days) | % H$_2$O$_2$[b] Loss | Q. Y.[e] (10$^2$ ein. mole$^{-1}$) | Lt. Cap.[d] (lm. hrs. liter$^{-1}$) | t ¾[e] (min.) | Intensity (ft. lbt. cm$^{-2}$) vs. Reaction Time (min.) | | | | |
|---|---|---|---|---|---|---|---|---|---|---|
| | | | | | Time: | 1 | 5 | 10 | 30 | 60 |
| t-butyl alcohol | 0 | — | 7.2 | 68 | 19 | 23 | 15 | 14 | 3.1 | — |
| | 55 | 20 | 7.3 | 69 | 26 | 19 | 12 | 10 | 6.6 | — |
| | 80 | 30 | 6.8 | 63 | 25 | 13 | 8.8 | 8.2 | 4.7 | — |
| t-butyl alcohol (Mg EDTA) | 55 | 23 | 7.4 | 70 | 23 | 18.1 | 12.3 | 11.8 | 5.6 | — |
| | 80 | 38 | 9.4 | 87 | 41 | 18 | 10 | 9.2 | 7.7 | — |
| 3-methyl-3-pentanol | 0 | — | 6.6 | 58 | 15 | 26 | 16 | 16 | 0.6 | — |
| | 55 | 53 | 6.7 | 59 | 18 | 17 | 16 | 15 | 2.5 | — |
| | 80 | 70 | 5.2 | 48 | 20 | 12 | 8.4 | 7.8 | 1.8 | — |
| 3-methyl-3-pentanol (DACTA). | 55 | 56 | 8.5 | 74 | 55 | 14 | 6.9 | 6.2 | 6.2 | 3.3 |
| | 80 | 66 | 8.6 | 80 | 91 | 6.8 | 3.7 | 3.8 | 8.4 | — |
| 3-methyl-3-pentanol + ethanol (9:1) | 0 | — | 6.6 | 58 | 15 | 26 | 16 | 16 | 0.6 | — |
| | 34 | 22 | 2.6 | 24 | 10 | 22 | 8.7 | 5.6 | — | — |
| 3-methyl-3-pentanol (tetrabutylammonium salicylate [0.006 M])[f] | 0 | — | 3.2 | 30 | 10 | 17 | 11 | 7.8 | — | — |
| | 33 | 40 | 3.4 | 31 | 8 | 20 | 15 | 7.7 | — | — |
| 3-methyl-3-pentanol (tetrabutylammonium salicylate [0.0025 M])[f,g] | 0 | — | | 82.7 | 64.4 | 16 | 11 | 9 | 6 | 2.5 |
| | 31 | 21 | | 45.4 | 45.4 | 13 | 9 | 9 | 8 | 1.7 |
| 2-ethylhexanol-1 | 0 | — | 7.3 | 64 | 23 | 13 | 11 | 11 | 5.7 | — |
| | 30 | 71 | 6.7 | 58 | 30 | 17 | 6.7 | 5.5 | 3.2 | — |
| | 55 | 97 | — | — | — | — | — | — | — | — |
| 5,6-dimethyloctane-3-ol + methanol (9:1) | 0 | — | 6.4 | 59 | 25 | 18 | 11 | 8.7 | 4.8 | — |
| | 17 | 11 | 6.2 | 57 | 35 | 18 | 8.8 | 7.0 | 4.7 | 1.2 |
| | 42 | 53 | 2.6 | 24 | 26 | 11 | 5.0 | 3.8 | 2.1 | — |

[a]Peroxide components comprised 0.75M H$_2$O$_2$ and 0.015 M sodium salicylate (except where noted) in the indicated solvent. Additives, when used, were added to the extent of 0.5 mg./ml. and were largely insoluble even at 75° C. Mg$_2$EDTA is dimagnesium ethylenediaminetetraacetate; DACTA is 1,2-diaminocyclohexanetetraacetic acid. For chemiluminescence assays, 0.30 ml. of peroxide component was combined with 2.7 ml. of a solution of 0.033 M bis(2,4,6-trichlorophenyl)oxalate (TCPO) and 0.0033 M 9,10-bis(phenylethynyl)anthracene is ethyl benzoate.
[b]Iodometric titration.
[c]Quantum yield.
[d]Light Capacity (total light output per liter).
[e]Time for ¾ of total light emission.
[f]Replaced sodium salicylate.
[g]The H$_2$O$_2$ concentration was 0.39 M. For the chemiluminescence assay, 0.60 ml. peroxide solution was combined with 2.4 ml. 0.0375 M bis(2,4,6-trichlorophenyl)oxalate (TCPO) and 0.00375 M 9,10-bis(phenylethynyl)anthracene in ethyl benzoate.

TABLE XVII
THE STORAGE STABILITY OF HYDROGEN PEROXIDE AND VARIOUS CATALYSTS IN SOLUTION AT 75° C.[a]

| Solution | Days Storage | H$_2$O$_2$ Loss (%) | Quantum Yield (einstein mole$^{-1}$ × 10$^2$) | Light Capacity (lumen hr. 1$^{-1}$) | Life Time t ¾ (min.) | Intensity (ft. lbt. cm$^{-1}$) vs. Reaction Time (min.) | | | | |
|---|---|---|---|---|---|---|---|---|---|---|
| | | | | | | 1 | 5 | 10 | 20 | 30 |
| 1. 0.995 M H$_2$O$_2$ 0.01 M TBAP[b] 0.01 M H$_3$PO$_4$ | 0 | 0 | 3.9 | 35 | — | 19.6 | 10.4 | 6.9 | 3.8 | 2.2 |
| | 30 | 27 | — | — | — | 23.1 | 15.2 | 11.8 | 8.0 | 5.9 |
| | 60 | 58 | 5.1 | 47 | — | 14.7 | 9.5 | 7.2 | 5.0 | 3.8 |

TABLE XVII-continued

THE STORAGE STABILITY OF HYDROGEN PEROXIDE AND
VARIOUS CATALYSTS IN SOLUTION AT 75° C.[a]

| Solution | Days Storage | $H_2O_2$ Loss (%) | Quantum Yield (einstein mole$^{-1}$ × 10$^2$) | Light Capacity (lumen hr. l$^{-1}$) | Life Time $t_{\frac{3}{4}}$ (min.) | Intensity (ft. lbt. cm$^{-1}$) vs. Reaction Time (min.) | | | | |
|---|---|---|---|---|---|---|---|---|---|---|
| | | | | | | 1 | 5 | 10 | 20 | 30 |
| in 3-methyl-3 pentanol | | | | | | | | | | |
| 2. 0.4 M $H_2O_2$ | 0 | 0 | 3.9 | 74.1 | 82 | 7.5 | 6.6 | 5.8 | 4.6 | 3.9 |
| 0.025 M acetanilide | 31 | 17 | — | 39 | | 1.0 | 3.1 | 3.9 | 3.4 | |
| in 3-methyl-3 pentanol | 60 | 19 | — | 11.8 | 219 | 0.1 | 1.0 | 3.5 | 4.1 | 3.9 |
| 3. 0.39 M $H_2O_2$ | 0 | — | — | 10.4 | — | 5.0 | 5.9 | 5.8 | 5.1 | 5.4 |
| 0.25 M TBAP[b] | 30 | — | — | 58 | — | 0.01 | 0.1 | 0.1 | 0.1 | 0.3 |
| in dimethyl phthalate | | | | | | | | | | |

[a]The solutions were stored in a Teflon FEP ® container at 75° C. and were assayed periodically by a chemiluminescent reaction of one volume stored solution and three volumes of 0.0375 M TCPO (bis(2,4,6-trichlorophenyl)oxalate) and 0.0025 M BPEA (9,10-bis(phenyl ethynyl)anthracene) in ethyl benzoate. Concentrations of assay reactions were:
Solution 1 - 2.81 × 10$^2$ M TCPO, 1.9 × 10$^3$ M BPEA, 0.25 M $H_2O_2$, 0.25 × 10$^2$ M TBAP (tetrabutyl ammonium perchlorate) and 0.25 × 10$^2$ M $H_3PO_4$ in 75% ethyl benzoate - 25% 3-methyl-3-pentanol at 25° C.
Solution 2 - 2.81 × 10$^2$ M TCPO, 1.9 × 10$^3$ M BPEA, 0.1 M $H_2O_2$ and 6 × 10$^3$ M acetanilide in 75% ethyl benzoate - 25% 3-methyl-3-pentanol at 25° C.
Solution 3 - 2.81 × 10$^2$ M TCPO, 1.9 × 10$^3$ M BPEA, 0.1 M $H_2O_2$ and 6 × 10$^3$ M TBAP in 75% ethyl benzoate - 25% dimethyl phthalate at 25° C.
[b]Tetrabutyl ammonium perchlorate.

IV. THE EFFECTS OF CATALYSTS ON THE CHEMILUMINESCENCE FROM OXALIC ESTERS, 9,10-BIS(PHENYLETHYNYL)ANTHRACENE (BPEA) AND HYDROGEN PEROXIDE.

The two-component TCPO-BPEA-hydrogen peroxide system produces a high quantum yield of long-lived chemiluminescent light. However, a catalyst is needed to accelerate the reaction sufficiently for short and medium lifetime applications as well as to achieve an optimum intensity-lifetime performance for all applications. Therefore, the effect of selected catalysts was determined on the system which contained TCPO and BPEA component in ethyl benzoate and the hydrogen peroxide catalyst component in 3-methyl-3-pentanol solvent. Our analysis of the intensity-lifetime performance is greatly assisted by the calculation of "characteristic performance values" defined and described in the following section.

In practical terms the light output performance of a chemiluminescent system is determined by the absolute values of its intensity-time distribution. Thus, many practical applications will require a specific minimum intensity delivered over a specific minimum lifetime; usually a superior chemiluminescent system could be defined as one that provides either the highest intensity over a required lifetime or as one that provides a required intensity over the longest lifetime. The practical intensity-lifetime performance of a reaction is determined by both the total integrated light capacity and the shape of the intensity-decay curve. This can be seen conveniently by comparing FIGS. 1, 2, and 3.

The figures represent intensity time functions for three different systems all having a light capacity of 70 lumen hours liter$^{-1}$. Although the areas under the three curves are equal (the area is proportional to the light capacity) it is clear that the practical performance of the three systems varies markedly. FIG. 1 represents a typical system available at the start of this program; it is clear that for many applications, much of the light is wasted. If, for example a six lumen brightness is required, the useful lifetime of the system is only 22 minutes, and only the light capacity represented by the rectangular area (1) (16 lumen hours liter$^{-1}$) is actually pertinent; the excess intensity light (area 2) and the low intensity light (area 3) falls outside of the performance specifications. Thus, 54 lumen hours liter$^{-1}$ of light out of the available 70 lumen hours liter$^{-1}$ is wasted.

Figure 2:
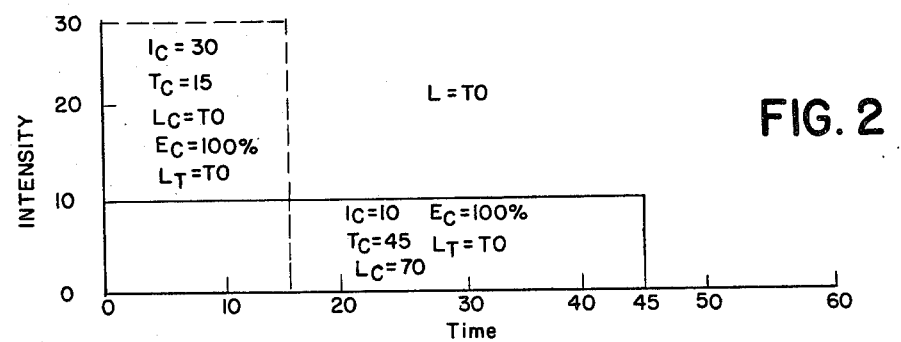
Figure 3:
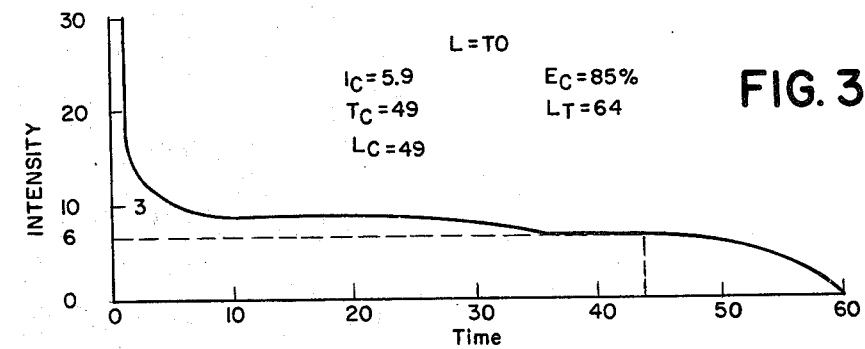

FIG. 2, in contrast is an extreme case, all of the available light is emitted at a desired intensity, 30 foot-lamberts for 15 minutes, (dashed line area) or 10 foot-lamberts for 45 minutes (solid line area) and the entire 70 lumen hour liter$^{-1}$ light capacity is pertinent to an application based on need for constant output. While it is unreasonable to expect the kinetics of a chemical reaction to provide the decay curve of FIG. 2, curve shapes which most closely approach it are desired. An intensity time distribution which approaches this goal is shown in FIG. 3. The superiority of curve 3 to curve 1 is clear; even though both reactions produce the same total amount of light, curve 3 provides an intensity of 6 foot lamberts over a lifetime twice as long as curve 1, and 63% of the available light (49 lumen hours liter$^{-1}$) is within the pertinent rectangle.

It appears from a comparison of curves 1–3 that the ratio of the maximum rectangular area to the total decay area is a useful criterion for efficient curve shape. Moreover, the values of intensity and time that maximize this ratio for a given reaction should be indicative of (although not strictly equivalent to) the most useful intensity and lifetime ranges for many practical applications. A computer program has therefore been written for the automatic determination of these "characteristic performance values": $I_c$, the intensity for which the ratio of the rectangular intensity-time area (area 1 in FIG. 3) to the total intensity-time area is maximized; $T_c$, the time during which the intensity is above $I_c$; and $E_c$, the ratio of the maximum rectangular intensity time area to the total area. Since the absolute value of the light capacity is also a critical performance factor, the computer program also provides: $L_c$, the absolute light capacity (in lumen hours liter$^{-1}$) represented by the maximum rectangular intensity-time area; and $L_t$, the absolute light capacity of the reaction up to time $T_c$ (area 1 and area 2 in FIG. 3).

For some early experiments characteristic performance values were not calculated. However, it is possible to obtain an estimate of $E_c$ by comparing $t_{\frac{1}{4}}$ and $t_{\frac{3}{4}}$ lifetimes computed for these experiments. The $t_{\frac{1}{4}}$ lifetime represents the light intensity decay time from the maximum to one quarter intensity and the $t_{\frac{3}{4}}$ lifetime represents the time required for the emission of 75% of the available light. In general, the larger is the $t_{\frac{1}{4}}:t_{\frac{3}{4}}$ ratio, the larger the $E_c$ value would be. A $t_{\frac{1}{4}}:t_{\frac{3}{4}}$ ratio of 0.8–1.0 represents an exceptionally efficient system ($E_c \simeq 0.5$–0.6).

It should be emphasized that a given formulation may be useful well outside its characteristic intensity and time values and that the selection of a formulation for a specific application is best done by matching the performance requirements of the application with the actual intensity-time plot. The characteristic performance values, are primarily helpful in determining the effects of reaction condition variations on the practical performance criteria and thus serve as a guide for system improvement. It should also be apparent that not all applications regard constant light output as the most efficient use of light capacity. It is well known that a higher intensity may be required to attract an observer's attention than will be required to retain his attention. If the ability to attract attention at time zero and then hold attention is the prime requirement, then an initial high intensity peak is desired and Area 2 in FIG. 1 is not wasted but may be required. Still other curves can also be visualized.

A. The Effect of Catalysts on the TCPO Reaction

The effect of selected catalysts on the model TCPO reaction is summarized below. The results indicate that weak bases such as sodium salicylate are the most suitable catalysts for a short-lived 10–30 minute system, tetrabutyl ammonium perchlorate (TBAP) is superior for a 30–120 minute system.

1. Basic Catalysts

In general, bases with conjugate acids having pKa values between about 2 and 5 appear most satisfactory. Stronger bases give inefficient intensity-time distributions and weaker bases are only weakly active at best. For bases within the optimum basicity range, an optimum concentration range is found; at base concentrations below the optimum, decay curve shapes are inefficient and at higher concentrations light capacities decrease excessively. Thus, for TCPO, BPEA systems in ethyl benzoate-alcohol solvent mixtures, the optimum concentrations for sodium salicylate, tetrabutylammonium salicylate, and tetraethylammonium benzoate were found respectively to be in the ranges: 0.0005–0.0015 M, 0.0001–0.0008 M and 0.0005–0.001 M. Within these optimum concentration ranges, increasing base increased intensities and decreased lifetimes permitting the selection of practical operating lifetimes between about 10 minutes and two hours.

Tetrabutylammonium and sodium salicylates provide approximately equivalent results in 75% ethylbenzoate-alcohol. Sodium salicylate, however, is appreciably less effective in 75% dichlorobenzene-alcohol, perhaps reflecting more ion pairing in the less polar dichlorobenzene solvent.

Salicylic acid added to sodium or tetrabutylammonium salicylate reactions to give buffering action tends to counteract the effect of the base as expected, providing decreased intensity and increased lifetimes. Salicylic acid tends to decrease the curve shape efficiencies of tetrabutylammonium salicylate systems. It appears that combinations of salicylate salt and salicylic acid in suitable concentrations can almost duplicate the effect of a lower salicylate concentration alone. Although such buffering action does not provide superior operating performance, buffers may be useful in further improving storage stability by reducing the importance of adventitious acidic or basic impurities or those formed in decomposition reactions.

Tetrabutylammonium perchlorate (TBAP) added to a system catalyzed by low concentration of sodium salicylate increases the intensity but not the quantum yield. In systems catalyzed by high concentration of sodium salicylate TBAP still increased the intensity but decreases light capacity and curve shape efficiency. This is in direct contrast to its effect when used alone (see below). Triphenylphosphine oxide has little effect on salicylate-catalyzed systems.

The hydrogen peroxide concentration has a very minor effect on lifetimes and light capacities in the 0.03 M–0.45 M concentration range with sodium salicylate-catalyzed 0.03 M TCPO systems. The curve shape efficiency, however, decreases with increasing hydrogen peroxide above about 0.075 M. The absence of an appreciable hydrogen peroxide concentration effect on the reaction rate suggests that hydrogen peroxide is not involved in a rate determining step of the reaction. This is also true for related oxalyl chloride and bis(2,4-dinitrophenyl)oxalate chemiluminescent reactions but was not expected for the less reactive TCPO system.

2. Tetrabutylammonium Perchlorate (TBAP) Catalyzed Systems

The addition of TBAP substantially increases the quantum yield and light capacity of the TCPO system. This effect of TBAP becomes the more pronounced the higher the TCPO concentration is. At $3 \times 10^{-2}$ M TCPO concentration TBAP increases the quantum yield and thus the light capacity by 36% and at $3.6 \times 10^{-2}$ M concentration by 50%. The intensities and curve shape efficiencies are similarly increased. The use of high TCPO concentration is desirable since the light capacity is proportional to the quantum yield as well as the TCPO concentration. TBAP is a superior catalyst for 30–120 minute lifetime systems.

3. Other Selected Catalysts

Increasing alcohol concentration in uncatalyzed TCPO-ethyl benzoate systems produces no substantial effect on light capacity. Unexpectedly, the reaction is slower with 25% 3-methyl-3-pentanol than with 10% 3-methyl-3-pentanol. Although the curve shape is relatively inefficient, the uncatalyzed 25% alcohol system appears useful for long lived systems. In the absence of added basic catalysts, increased hydrogen peroxide concentration in the 75% ethyl benzoate-25% 3-methyl-3-pentanol system increases the intensity and shortens the lifetime. A hydrogen peroxide concentration near 0.033 M gives the higher light capacity. Acetanilide, salicylic acid, and triphenylphosphine oxide decrease the lifetime of the uncatalyzed alcohol system but do not appear to give substantially superior performance to the alcohol system alone. Cesium and rubidium chlorides, although essentially insoluble in 70% ethyl benzoate-25% 3-methyl-3-pentanol, are effective catalysts in stored systems.

4. Solvent Effects

The sodium salicylate catalyzed TCPO reaction in ethyl benzoate produces equally good chemiluminescence in the presence of the following alcohol cosolvents: 3-methyl-3-pentanol, t-butanol, 2-ethylhexanol-2, 3,6-dimethyloctanol-3 and 2-octanol. Lower light capacities are obtained in the presence of 1,2-propanediol cosolvent.

The effect of several catalysts on the TCPO reaction was examined in ethyl benzoate-2-octanol solution. Salicylic acid-tetrabutylammonium hydroxide buffers alone and with TBAP cocatalyst produced high light capacities and good curve shape efficiencies. The strongly basic salt, rubidium acetate also produced high light capacities but poor curve shape efficiencies. Several poorly soluble salts suspended in the chemuluminescent solution by vigorous stirring produced surprisingly high light capacities and good curve shape efficiencies. Such salts are potassium formate, rubidium chloride, and sodium tetrahydroxysuccinate when used together with cocatalyst mannose. Sodium tetrahydroxysuccinate alone, as well as rubidium salicylate, produced high light capacities but led to poor shape efficiencies.

Several catalysts were also tested in ethyl benzoate-t-butanol solution. The addition of potassium and benzyltrimethylammonium salts of 2,3,6-trichlorobenzoic acid led to high light capacity but to only moderately good curve shape efficiency. Two buffers 2,3,6-trichlorobenzoic acid-benzyltrimethylammonium hydroxide and tartaric acid-tetrabutylammonium hydroxide produced moderately high light capacities and moderately good curve shape efficiencies. The third buffer, phosphoric acid-benzyltrimethylammonium hydroxide, produced significantly higher light capacities and better curve shape efficiencies than the other two buffers but offered no advantage over the sodium salicylate catalyst. In a o-dichlorobenzene-t-butanol solution the sodium salicylate catalyst as well as the strong base benzyltrimethylammonium hydroxide leads to low light capacities and generally poor curve shape efficiencies.

B. The Effect of Catalysts on the PCPO Reaction

The effect of several catalysts was also examined on the bis(pentachlorophenyl)oxalate (PCPO) reaction in an ethyl benzoate-o-dichlorobenzene solution. The solubility of PCPO is substantially lower than that of TCPO in most solvents, limiting the light capacity of a PCPO system. The catalyst study experiments were carried out at $1 \times 10^{-2}$ M PCPO concentration, one third of that normally used for TCPO experiments. The catalytic effects were very similar to those observed in connection with the TCPO reaction. Strong bases produced moderately high quantum yields and short lifetimes. The addition of tetrabutylammonium perchlorate (TBAP) resulted in very high quantum yields, good curve shape efficiencies and moderately long (90 minutes) lifetimes. Triphenylphosphine oxide produced an effect similar to that of TBAP, but it led to a long lifetime. Poorly soluble alkali metal salts suspended in the chemiluminescent solution produced high quantum yields and short or medium lifetime depending on the salt. Another poorly soluble salt, sodium tetrahydroxysuccinate, alone or with dulcitol cocatalyst, gave moderate quantum yields and short lifetimes.

EXAMPLE XIX

Absolute quantum yields, light capacities, lifetimes and characteristic performance values of the bis(2,4,6-trichlorophenyl) oxalate (TCPO)-hydrogen peroxide-9,10-bis(phenylethynyl)anthracene (BPEA) chemiluminescent reaction were measured by using instrumentation and experimental technique described below.* The effect of varying concentration of sodium salicylate catalyst was examined and the results are collected to Table XVIII. Sodium salicylate increases the brightness and improves the curve shape efficiency of the uncatalyzed reaction substantially. The optimum catalyst concentration lies near $1 \times 10^{-3}$ M sodium salicylate, which produces at least 5.5–6.0 foot lamber intensity for 43 minutes. The intensity can be increased further by the use of higher catalyst concentration. However, at those concentrations substantially lower light capacities and lifetimes are obtained.

*B. G. Roberts and R. C. Hirt, *Applied Spect.*, 21, 250(1967).

EXAMPLE XX

The effect of hydrogen peroxide concentration on the sodium salicylate catalyzed reaction is examined by the experimental methods described in Example XIX. The results are summarized in Table XIX. The hydrogen peroxide concentration produces no change in the light capacity in the range of $3.3–45.0 \times 10^{-2}$ M $H_2O_2$. However, the best curve efficiencies are obtained in the low $3.3–7.5 \times 10^{-2}$ M $H_2O_2$ range. Further increase of peroxide concentration increases the light intensity and decreases lifetime but also deteriorates the curve efficiency.

TABLE XVIII

The Effect of Sodium Salicylate Concentration on 0.03 M TCPO Chemiluminescence in Ethyl Benzoate-3-Methyl-3-Pentanol[a]

| Sodium Salicylate ($10^3 \times$ M) | $I_{max}$[b] (ft. lbt. cm$^{-1}$) | $t\,\frac{1}{4}$[c] (min.) | $t\,\frac{3}{4}$[d] (min.) | Q. Y.[e] ($10^2$ ein. mole$^{-1}$) | Lt. Cap. (lm. hr. l$^{-1}$) | Characteristic Performance Values[f] | | | | | |
|---|---|---|---|---|---|---|---|---|---|---|---|
| | | | | | | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
| None | 6 | 99 | 198 | 8.8 | 81 | 0.7 | a19 | 0.4 | 30 | 24 | 63 |
| 0.10 | 9 | 71 | 117 | 8.8 | 80 | 2.0 | 80 | 0 | 31 | 25 | 51 |
| 0.50 | 15 | 49 | 48 | 8.3 | 75 | 3.9 | 56 | 0 | 45 | 34 | 61 |
| 1.00 | 28 | 16 | 37 | 7.6 | 69 | 5.5 | 43 | 0 | 54 | 37 | 57 |
| 1.25[g] | 42 | 4.0 | 40 | 8.3 | 77 | 6.2 | 50 | 0 | 64 | 49 | 68 |
| 3.00 | 45 | 4.4 | 16 | 4.9 | 44 | 8.3 | 18 | 0 | 51 | 22 | 34 |

[a] Reactions of 0.03M TCPO, 0.075 M $H_2O_2$ and 0.002 M BPEA in 80 vol. % ethyl benzoate-20 vol. % 3-methyl-3-pentanol at 25° C.
[b] Maximum intensity.
[c] Light decay time from maximum to ¼ of maximum intensity.
[d] Time required for the emission of 75% of the total light.
[e] Quantum yield based on TCPO.
[f] See text.
[g] 75 vol. % ethyl benzoate-25 vol. % 3-methyl-3-pentanol.

TABLE XIX

The Effect of Hydrogen Peroxide Concentration on Sodium Salicylate Catalyzed 0.03 M TCPO Chemiluminescence in Ethyl Benzoate-3-Methyl-3-Pentanol[a]

| $H_2O_2$ ($10^2$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | $I_c$ (ft lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| 3.3 | 33 | 27 | 37 | 7.0 | 65 | 7.1 | 33 | 0 | 54 | 35 | 45 |
| 7.5 | 44 | 4.5 | 39 | 7.8 | 72 | 5.9 | 49 | 0 | 63 | 45 | 64 |
| 24.0 | 55 | 11 | 24 | 8.2 | 76 | 8.3 | 22 | 0 | 37 | 28 | 54 |
| 45.0 | 55 | 7.9 | 25 | 7.3 | 68 | 6.8 | 22 | 0 | 34 | 23 | 47 |

[a]Reactions of .03 M TCPO, .003 M BPEA and .00125 M sodium salicylate in 75 vol. % ethyl benzoate-25 vol. % 3-methyl-3-pentanol at 25° C.
[b]Maximum intensity.
[c]Light decay time from maximum to ¼ of maximum intensity.
[d]Time required for the emission of 75% of the total light.
[e]Quantum yield based on TCPO.

EXAMPLE XXI

The effect of sodium salicylate-salicylic acid buffers on the uncatalyzed reaction is examined at various buffer concentrations by the experimental method described in Example XIX. The results are shown in Table XX. The addition of buffer increased the intensity, improved curve shape efficiency and decreased the lifetime substantially. (Expts. 1 vs 5,6) However, the light capacity remains uneffected. Increasing ratio of salicylic acid to sodium salicylate in the buffer decreases the intensity and curve shape efficiency and increases the lifetime. The low salicylic acid containing buffer system approaches, as it should, the performance of the system catalyzed by sodium salicylate alone.

solvent mixtures (75% ethylbenzoate-25% 3-methyl-3-pentanol and 75% o-dichlorobenzene-3-methyl-3-pentanol) by the experimental method described in Example XIX. The results are collected in Table XXI. In ethylbenzoate-3-methyl-3-pentanol solvent a very small $1 \times 10^{-4}$ M concentration of TBAS produced a large (65%) increase in light capacity but no substantial improvement of curve efficiency or lifetime. However, increasing TBAS concentration substantially increased the intensity, curve shape efficiency, decreased the lifetime and brought down the light capacity to the level of the uncatalyzed reaction. There is an optimum TBAS concentration range ($0.5 \times 10^{-3}$–$1.0 \times 10^{-3}$ M). At TBAS concentrations higher than this range the light capacity decreases substantially to below the level of the uncatalyzed reaction.

TABLE XX

The Effect of Sodium Salicylate-Salicylic Acid Buffers on the 0.03 M TCPO Chemiluminescence in Ethyl Benzoate-3-Methyl-3-Pentanol[a]

| Experiment No. | Sodium Salicylate ($10^3$ M) | Salicylic Acid ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|---|---|
| 1 | None | None | 6.0 | 99 | 198 | 8.8 | 81 | 0.7 | 219 | 0.4 | 30 | 24 | 63 |
| 2 | 0.5[f] | None | 15 | 49 | 48 | 8.3 | 75 | 3.9 | 56 | 0 | 45 | 34 | 61 |
| 3 | 0.5[f] | 5.0 | 14 | 43 | 78 | 9.6 | 87 | 2.7 | 71 | 0 | 34 | 29 | |
| 4 | 1.25 | None | 42 | 4.0 | 40 | 8.3 | 77 | 6.2 | 50 | 0 | 64 | 49 | 68 |
| 5 | 1.25 | 1.0 | 42 | 4.7 | 42 | 8.4 | 78 | 5.6 | 51 | 0 | 56 | 43 | 66 |
| 6 | 1.25 | 5.0 | 40 | 5.6 | 47 | 8.4 | 78 | 4.0 | 57 | 0 | 47 | 36 | 64 |
| 7 | 1.25 | 10.0 | 34 | 9.5 | 46 | 8.8 | 82 | 3.9 | 55 | 0 | 41 | 34 | 67 |
| 8 | 1.25 | 50.0 | 7.4 | 110 | 88 | 9.5 | 88 | 2.9 | 83 | 0 | 42 | 37 | 63 |
| 9 | 3.0[f] | None | 45 | 4.4 | 16 | 4.9 | 44 | 8.3 | 18 | 0 | 51 | 22 | 34 |
| 10 | 3.0[f] | 30.0 | 45 | 8.4 | 12 | 6.0 | 54 | 9.5 | 12 | 0 | 32 | 17 | 40 |

[a]Reactions of 0.03 M TCPO, 0.075 M $H_2O_2$ and 0.003 M BPEA in 75 vol. % ethyl benzoate-25 vol. % 3-methyl-3-pentanol at 25° C.
[b]Maximum intensity.
[c]Light decay time from maximum to ¼ of maximum intensity.
[d]Time required for the emission of 75% of the total light.
[e]Quantum yield based on TCPO.
[f]Reactions with 0.002 M BPEA and 20% (vol.) 3-methyl-3-pentanol.

EXAMPLE XXII

The effect of tetrabutylammonium salicylate (TBAS) on the uncatalyzed reaction is measured in two different

TABLE XXI

The Effect of Tetrabutylammonium Salicylate on the 0.03 M TCPO Chemiluminescence in Ethyl Benzoate[a] and Dichlorobenzene

| Bu4N Salicylate ($10^4$ M) | $I_{max}$[b] (ft. lbt. cm$^{-1}$) | $t\frac{1}{4}$[c] (min.) | $6\frac{3}{4}$[d] (min.) | Q.Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| A. In Ethyl Benzoate-3-Methyl-3-Pentanol (75–25% vol.) Solvent. | | | | | | | | | | | |
| None | 6.0 | 99 | 198 | 8.8 | 81 | 0.7 | 219 | 0.4 | 30 | 24 | 63 |
| 1.0 | 25 | 32 | 106 | 14.4 | 134 | 2.8 | 96 | 0 | 29 | 39 | 90 |
| 5.0 | 55 | 14 | 25 | 9.9 | 84 | 9.9 | 26 | 0 | 47 | 39 | 63 |
| 7.5 | 53 | 7.8 | 24 | 7.5 | 69 | 8.1 | 27 | 0 | 50 | 35 | 56 |
| 10.0 | 51 | 12 | 16 | 6.0 | 56 | 11.0 | 15 | 0 | 46 | 26 | 41 |
| 10.0 | 44 | 16 | 17 | 5.3 | 50 | 10.2 | 17 | 0 | 56 | 28 | 37 |
| B. In o-Dichlorobenzene-3-Methyl-3-Pentanol (75–25% vol.) Solvent. | | | | | | | | | | | |

TABLE XXI-continued

The Effect of Tetrabutylammonium Salicylate on the 0.03 M TCPO Chemiluminescence in Ethyl Benzoate[a] and Dichlorobenzene

| Bu$_4$N Salicylate ($10^4$ M) | I$_{max}$[b] (ft. lbt. cm$^{-1}$) | t¼[c] (min.) | 6¾[d] (min.) | Q.Y.[e] ($10^2$ ein. mole$^{-1}$) | Lt. Cap. (lm. hr. l$^{-1}$) | Characteristic Performance Values ||||||
|---|---|---|---|---|---|---|---|---|---|---|---|
| | | | | | | I$_c$ (ft. lbt. cm$^{-1}$) | T$_c$ (min.) | T$_i$ (min.) | E (%) | LC$_c$ (lm. hr. l$^{-1}$) | LC$_t$ (lm. hr. l$^{-1}$) |
| None | | | | | too dim to measure | | | | | | |
| 10.0 | 44 | 6.9 | 37 | 7.6 | 69 | 3.4 | 44 | 0 | 34 | 24 | 53 |
| 10.0 | 44 | 6.4 | 37 | 7.3 | 66 | 3.3 | 43 | 0 | 33 | 22 | 50 |
| 25.0 | 51 | 3.3 | 17 | 4.0 | 37 | 4.7 | 19 | 0 | 37 | 14 | 29 |
| 50.0 | 28 | 2.5 | 9.7 | 1.6 | 14 | Not Submitted | | | | | |
| 75.0 | 24 | 1.3 | 3.4 | 0.6 | 5.3 | Not Submitted | | | | | |

[a]Reactions of .03 M TCPO, .003 M BPEA and .075 M hydrogen peroxide at 25° C.
[b]Maximum intensity.
[c]Light decay time from maximum to ¼ of maximum intensity.
[d]Time required for the emission of 75% of the total light.
[e]Quantum yield based on TCPO.

In o-dichlorobenzene-3-methyl-3-pentanol solvent TBAS produces a strong catalytic effect similar to that in ethyl benzoate-3-methyl-3-pentanol. The optimum catalyst concentration is approximately $1 \times 10^{-3}$ M TBAS.

EXAMPLE XXIII

The effect of tetrabutylammonium salicylate-salicylic acid buffers on the uncatalyzed reaction is examined by the experimental methods described in Example XIX. The results are collected in Table XXII. The buffer substantially increases the intensity curve shape efficiency and decreases the lifetime substantially and decreases the light capacity moderately. The increasing salicylic acid to TBAS ratio of the buffer increases light capacity and lifetime and decreases brightness which leaves curve shape efficiency unchanged.

EXAMPLE XXIV

The effect of tetrabutylammonium perchlorate (TBAP) on the sodium salicylate catalyzed reaction is shown by the data collected in Table XXIII. TBAP alone substantially improves the light capacity, intensity and curve shape efficiency of the uncatalyzed reaction (see Example XXVIII. However, TBAP increases moderately the intensity and curve efficiency of the reaction catalyzed by low concentration of sodium salicylate but leaves the light capacity uneffected. When the otherwise optimum concentration of sodium salicylate is used added TBAP increases intensity but decreases light capacity, curve efficiency and lifetime.

EXAMPLE XXV

The effect of tetrabutylammonium perchlorate (TBAP) on the tetrabutylammonium salicylate catalyzed reaction is shown in Table XXIV. TBAP increases intensity, and decreases lifetime and light capacity moderately which leaves curve shape efficiency essentially unchanged.

EXAMPLE XXVI

The effect of triphenylphosphine oxide (TPPO) on the tetrabutylammonium salicylate catalyzed reaction is shown in Table XXV. The results indicate that TPPO moderately decreases light capacity but otherwise produce no substantial effect. In contrast to this behavior TPPO increases the light capacity of the uncatalyzed reaction substantially.

EXAMPLE XXVII

The effect of tetraethylammonium benzoate (TEAB) on the uncatalyzed reaction is examined by the experimental method described in Example XIX. The results, collected in Table XXVI indicate that TEAB substantially increases the intensity and curve shape efficiency of the uncatalyzed reaction. There is an optimum range of catalyst concentration $0.5 \times 10^{-3}$–$1 \times 10^{-3}$ M TEAB. At concentrations higher than that the light capacity decreases rapidly.

EXAMPLE XXVIII

The effect of tetrabutylammonium perchlorate (TBAF) on the uncatalyzed reaction is examined at three levels of bis(2,4,6-trichlorophenyl)oxalate (TCPO) concentrations by the method described in Example I. The results are collected in Table XXVII. TBAP increases the quantum yield and thereby the light capacity at all tested TCPO concentrations. The more pronounced this effect becomes the higher in the TCPO concentration. At $3.6 \times 10^{-2}$ M TCPO concentration TBAP increases the light capacity by 50%.

TABLE XXII

The Effect of Tetrabutylammonium Salicylate-Salicylic Acid Buffers on 0.03 M TCPO Chemiluminescence in Ethyl Benzoate-3-Methyl-3-Pentanol[a]

| Bu$_4$N Salicylate ($10^3$ M) | Salicylic Acid ($10^3$ M) | I$_{max}$[b] (ft. lbt. cm$^{-1}$) | t¼[c] (min.) | t¾[d] (min.) | Q.Y.[e] ($10^2$ ein. mole$^{-1}$) | Lt. Cap. (lm. hr. l$^{-1}$) | Characteristic Performance Values ||||||
|---|---|---|---|---|---|---|---|---|---|---|---|---|
| | | | | | | | L$_c$ (ft. lbt. cm$^{-1}$) | T$_c$ (min.) | T$_i$ (min.) | E (%) | LC$_c$ (lm. hr. l$^{-1}$) | LC$_t$ (lm. hr. l$^{-1}$) |
| None | None | 6.0 | 99 | 198 | 8.8 | 81 | 0.7 | 219 | 0.4 | 30 | 24 | 63 |
| 1.0 | None | 51 | 12 | 16 | 6.0 | 56 | 11.0 | 15 | 0 | 46 | 26 | 1 |
| 1.0 | 10 | 23 | 23 | 21 | 5.3 | 49 | 7.2 | 19 | 0 | 44 | 22 | 35 |
| 1.0 | 25 | 13 | 46 | 37 | 6.0 | 56 | 4.7 | 35 | 0 | 45 | 25 | 40 |
| 1.0 | 50 | 9.6 | 59 | 44 | 6.6 | 61 | 4.3 | 39 | 0 | 44 | 26 | 41 |

[a]Reaction of .03 M TCPO, .075M H$_2$O$_2$ and .003 M BPEA in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.

TABLE XXIII

The Effects of Sodium Salicylates and Tetrabutylammonium Perchlorate (TBAP), and Their Combinations on TCPO—BPEA-Ethyl Benzoate-3-Methyl-3-Pentanol Chemiluminescence[a]

| Salicylate ($10^3$ M) | Additive (M) | Q.Y.[b] ($10^2$ ein. mole$^{-1}$) | Lt Cap.[c] (lm. hr. $1^{-1}$) | $I_c$ (ft. lbt. cm$^{-1}$) | $T_c$ (min.) | $T_i$ (min) | E (%) | $LC_c$ (lm. hr. $1^{-1}$) | $LC_t$ (lm. hr. $1^{-1}$) |
|---|---|---|---|---|---|---|---|---|---|
| None — | None — | 8.8 | 81 | 0.7 | 219 | 0.4 | 30 | 24 | 63 |
| None — | TBAP 0.05 | 12.1 | 112 | 7.4 | 48 | 1.3 | 49 | 56 | 82 |
| Na 0.1 | None — | 8.8 | 80 | 2.0 | 80 | 0 | 31 | 25 | 51 |
| Na 0.1 | TBAP 0.05 | 9.1 | 83 | 4.2 | 68 | 0.6 | 53 | 44 | 66 |
| Na 1.25 | None — | 6.9 | 64 | 6.7 | 33 | 0 | 54 | 35 | 53 |
| Na 1.25 | TBAP 0.01 | 6.3 | 58 | 9.7 | 18 | 0 | 48 | 28 | 44 |
| Na 1.25 | TBAP 0.05 | 5.3 | 49 | 10.7 | 13 | 0 | 45 | 22 | 36 |

[a]Reactions of 0.03 M bis(2,4,6-trichlorophenyl)oxalate (TCPO), 0.003 M 9,10-bis(phenylethynyl)anthracene (BPEA) and 0.075 M $H_2O_2$ in 75 vol. % ethyl benzoate-25 vol. % 3-methyl-3-pentanol at 25° C.
[b]Quantum Yield based on TCPO
[c]Light capacity.

TABLE XXIV

The Effects of Tetrabutylammonium Salicylates, Tetrabutylammonium Perchlorate (TBAP), and Their Combinations on TCPO-BPEA-Ethyl Benzoate-3-Methyl-3-Pentanol Chemiluminescence[a]

| Salicylate $10^3$ M | Additive (M) | Q.Y.[b] ($10^2$ ein. mole$^{-1}$) | Lt Cap.[c] (lm. hr. $1^{-1}$) | $I_c$ (ft. lot. cm$^{-1}$) | $T_c$ (min.) | $T_i$ (min.) | E (%) | LC (lm. hr. $1^{-1}$) | $LC_t$ (lm. hr. $1^{-1}$) |
|---|---|---|---|---|---|---|---|---|---|
| None — | None — | 8.8 | 81 | 0.7 | 219 | 0.4 | 30 | 24 | 65 |
| None — | TBAP 0.05 | 12.1 | 112 | 7.4 | 48 | 1.3 | 49 | 56 | 82 |
| Bu$_4$N 0.75 | None — | 7.5 | 69 | 8.1 | 27 | 0 | 50 | 35 | 56 |
| Bu$_4$N 0.75 | TBAP 0.05 | 5.7 | 53 | 11.5 | 14 | 0 | 47 | 25 | 40 |
| None — | TPPO 0.05 | 10.9 | 101 | 1.2 | 153 | 0 | 27 | 27 | 70 |
| Bu$_4$N 0.75 | TPPO 0.05 | 6.8 | 63 | 8.5 | 23 | 0 | 48 | 30 | 50 |

[a]Reactions of 0.03 M bis(2,4,6-trichlorophenyl)oxalate (TCPO), 0.003 M 9,10-bis(phenylethynyl)anthracene (BPEA) and 0.075 M $H_2O_2$ in 75 vol. % ethyl benzoate-25 vol. % 3-methyl-3-pentanol at 25° C.
[b]Quantum Yield based on TCPO.
[c]Light capacity.

TABLE XXV

The Effects of Tetrabutylammonium Salicylates, Triphenylphosphine Oxide (TPPO), and Their Combinations on TCPO-BPEA-Ethyl Benzoate-3-Methyl-3-Pentanol Chemiluminescence[a]

| Salicylate ($10^3$ M) | Additive (M) | Q.Y.[b] ($10^2$ ein. mole$^{-1}$) | Lt Cap.[c] (lm. hr. $1^{-1}$) | $I_c$ (ft. lbt. cm$^{-1}$) | $T_c$ (min.) | $T_i$ (min.) | E (%) | $LC_c$ (lm. hr. $1^{-1}$) | $LC_t$ (lm. hr. $1^{-1}$) |
|---|---|---|---|---|---|---|---|---|---|
| None — | None — | 8.8 | 81 | 0.7 | 219 | 0.4 | 30 | 24 | 63 |
| None — | TPPO 0.05 | 10.9 | 101 | 1.2 | 153 | 0 | 27 | 27 | 70 |
| Bu$_4$N 0.75 | TPPO 0.05 | 6.8 | 63 | 8.5 | 23 | 0 | 48 | 30 | 50 |

[a]Reactions of 0.03 M bis(2,4,6-trichlorophenyl)oxalate (TCPO), 0.003 M 9,10-bis(phenylethynyl)anthracene (BPEA) and 0.075 M $H_2O_2$ in 75 vol. % ethyl benzoate-25 vol. % 3-methyl-3-pentanol at 25° C.
[b]Quantum Yield based on TCPO.
[c]Light capacity.

TABLE XXVI

The Effect of Tetraethylammonium Benzoate on 0.03 M TCPO Chemiluminescence in Ethyl Benzoate-3-Methyl-3-Pentanol[a]

| (Et)$_4$N Benzoate ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. $1^{-1}$) | $I_c$ (ft. lbt. cm$^{-1}$) | $T_c$ (min.) | $T_i$ (min.) | E (%) | $LC_c$ (lm. hr. $1^{-1}$) | $LC_t$ (lm. hr. $1^{-1}$) |
|---|---|---|---|---|---|---|---|---|---|---|---|
| None | 6.0 | 99 | 198 | 8.8 | 81 | 0.7 | 219 | 0.4 | 30 | 24 | 63 |
| 0.5 | 44 | 11 | 41 | 10.0 | 93 | 5.5 | 52 | 0 | 48 | 44 | 78 |
| 0.75 | 51 | 10 | 30 | 9.0 | 84 | 7.1 | 38 | 0 | 50 | 42 | 71 |
| 1.0 | 51 | 17 | 19 | 7.7 | 72 | 10.9 | 21 | 0 | 50 | 36 | 57 |
| 2.5 | 36 | 11 | 9 | 4.0 | 35 | Not determined. | | | | | |

[a]Reactions of .03 M TCPO, .003 M BPEA, and .075 M $H_2O_2$ in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.

TABLE XXVII

The Effect of Tetrabutylammonium Perchlorate (TBAP) on bis(2,4,6-trichlorophenyl)oxalate (TCPO) Chemiluminescence

| TCPO ($M \times 10^2$) | TBAP ($M \times 10^2$) | $T_{\frac{3}{4}}{}^b$ (min.) | Q. Y. ($10^2$ ein. mole$^{-1}$) | Lt. Cap. (lum. hrs. l$^{-1}$) | $I_c$ (ft. lbt. cm$^{-1}$) | $T_c$ (min.) | E (%) |
|---|---|---|---|---|---|---|---|
| 1.0 | — | 147.8 | 13.0 | 40.3 | 1.1 | 76 | 32 |
| 1.0 | 5.0 | 49.5 | 14.0 | 43.3 | 3.0 | 42 | 45 |
| 3.0 | — | 145.0 | 8.9 | 82.9 | 2.4 | 61 | 26 |
| 3.0 | 5.0 | 50.0 | 12.1 | 112.0 | 7.4 | 48 | 49 |
| 3.6 | — | 106.4 | 7.5 | 83.8 | 2.4 | 63 | 28 |
| 3.6 | 5.0 | 46.5 | 11.2 | 125.2 | 9.6 | 46 | 56 |

[a]Reactions of bis(2,4,6-trichlorophenyl)oxalate (TCPO) with $7.5 \times 10^{-2}$ M hydrogen peroxide and $3 \times 10^{-3}$ M BPEA in ethyl benzoate-3-methyl-3-pentanol (90-10% vol.) at 25°.
[b]Time required for three quarters of total light emission.

This is a very important effect since light capacity is directly proportional to both quantum yield and TCPO concentration. TBAP also increases the intensity and curve shape efficiency substantially.

EXAMPLE XXIX

The effect of varying tetrabutylammonium perchlorate (TBAP) concentration on the uncatalyzed reaction is shown in Table XXVIII. The results indicate that increasing TBAP concentration substantially increases intensity, curve shape efficiency and decreases lifetime. Although TBAP increases light capacity at all tested concentrations, the highest light capacity is obtained at $1 \times 10^{-2}$ M TBAP.

EXAMPLE XXX

The effect of acetanilide on the uncatalyzed TCPO reaction is shown in Table XXIX. The results indicate that the addition of acetanilide increases the intensity $I_c$ substantially, increases light capacity slightly and decreases the lifetime $T_c$ slightly but leaves curve shape efficiency unchanged.

EXAMPLE XXXI

The effect of triphenylphosphine oxide on the uncatalyzed TCPO reaction is shown in Table XXX. The addition of triphenylphosphine oxide significantly increases the light capacity and slightly increases intensity and decreases lifetime.

EXAMPLE XXXII

The effect of alkali metal halides such as cesium chloride and rubidium chloride on the uncatalyzed TCPO reaction is examined by the method described in Example XIX. These poorly soluble salts are suspended in the chemiluminescent solution which is stirred rapidly. The results are collected in Table XXXI. Both alkali metal salts cesium and rubidium chloride substantially increased the light intensity, and the curve shape efficiency and decreased the lifetime.

TABLE XXVIII

The Effect of Tetrabutylammonium Perchlorate (TBAP) on the 0.03 M TCPO Chemiluminescence in Ethyl Benzoate-3-Methyl-3-Pentanol[a]

| TBAP ($10^2$ M) | $I_{max}{}^b$ (ft. lbt. cm$^{-1}$) | $t\frac{1}{4}{}^c$ (min.) | $t\frac{3}{4}{}^d$ (min.) | Q. Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| None | 6.0 | 99 | 198 | 8.8 | 81 | 0.7 | 219 | 0.4 | 30 | 24 | 63 |
| 0.3 | 15 | 61 | 85 | 12.0 | 111 | 2.9 | 78 | 0 | 31 | 35 | 78 |
| 0.8 | 12 | 104 | 96 | 12.5 | 116 | 2.5 | 123 | 0 | 41 | 48 | 98 |
| 1.0 | 15 | 72 | 94 | 13.2 | 122 | 2.4 | 126 | 0 | 39 | 47 | 105 |
| 5.0 | 15 | 71 | 50 | 12.1 | 112 | 7.4 | 48 | 1.3 | 49 | 56 | 82 |
| 5.0[f] | 9.2 | 109 | 75 | 12.5 | 116 | 6.2 | 73 | 4.3 | 61 | 71 | 86 |
| 5.0[g] | 8.1 | 117 | 81 | 11.8 | 110 | 5.3 | 79 | 4.7 | 59 | 65 | 81 |
| 10.0 | 11 | 79 | 53 | 11.1 | 103 | 7.5 | 50 | 3.8 | 57 | 58 | 76 |

[a]Reactions of 0.030 M TCPO, 0.003 M BPEA, 0.075 M $H_2O_2$ in ethyl benzoate-3-methyl-3-pentanol (75–25% vol.) at 25° C.
[b]Maximum intensity.
[c]Light decay time from maximum to $\frac{1}{4}$ of maximum intensity.
[d]Time required for the emission of 75% of the total light.
[e]Quantum yield based on TCPO.
[f]Acetanilide (0.005 M) was added.
[g]Acetanilide (0.01 M) was added.

TABLE XXIX

The Effect of Acetanilide Catalyst on 0.03 M TCPO Chemiluminescence in Ethyl Benzoate-3-Methyl-3-Pentanol[a]

| Catalyst ($10^3$ M) | $I_{max}{}^b$ (ft. lbt. cm$^{-1}$) | $t\frac{1}{4}{}^c$ (min.) | $t\frac{3}{4}{}^d$ (min.) | Q.Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| None | 6.0 | 99 | 198 | 8.8 | 81 | 0.7 | 219 | 0.4 | 30 | 24 | 63 |
| 1.0 Acetanilide | 6.3 | 104 | 177 | 9.7 | 90 | 1.9 | 90 | 0 | 27 | 25 | 48 |
| 5.0 Acetanilide | 3.7 | 194 | 183 | 9.1 | 84 | 1.7 | 116 | 7.0 | 37 | 31 | 49 |
| 10.0 | 5.1 | 109 | 214 | 9.2 | 85 | 0.9 | 162 | 0 | 26 | 22 | 55 |

TABLE XXIX-continued

The Effect of Acetanilide Catalyst on 0.03 M TCPO Chemiluminescence in Ethyl Benzoate-3-Methyl-3-Pentanol[a]

| Catalyst ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | Characteristic Performance Values | | | | | |
|---|---|---|---|---|---|---|---|---|---|---|---|
| | | | | | | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
| Acetanilide | | | | | | | | | | | |

[a]Reactions of 0.03 M TCPO, 0.003 M BPEA and 0.075 M H$_2$O$_2$ in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.

TABLE XXX

The Effect of Triphenylphosphine Oxide Catalyst on 0.03 M TCPO Chemiluminescence in Ethyl Benzoate-3-Methyl-3-Pentanol[a]

| Catalyst ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | Characteristic Performance Values | | | | | |
|---|---|---|---|---|---|---|---|---|---|---|---|
| | | | | | | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
| None | 6.0 | 99 | 198 | 8.8 | 81 | 0.7 | 219 | 0.4 | 30 | 24 | 63 |
| 50.0 (C$_6$H$_5$)$_3$PO | 9.1 | 74 | 163 | 10.9 | 101 | 1.2 | 153 | 0 | 27 | 27 | 70 |

[a]Reactions of 0.03 M TCPO, 0.003 M BPEA and 0.075 M H$_2$O$_2$ in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.

TABLE XXXI

The Effect of CsCl and RbCl Catalysts on 0.03 M TCPO Chemiluminescence in Ethyl Benzoate-3-Methyl-3-Pentanol[a]

| Catalyst ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | Characteristic Performance Values | | | | | |
|---|---|---|---|---|---|---|---|---|---|---|---|
| | | | | | | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
| None | 6.0 | 99 | 198 | 8.8 | 81 | 0.7 | 219 | 0.4 | 30 | 24 | 63 |
| 25.3 mg. CsCl[f] | 13 | 72 | 72 | 10.5 | 97 | 2.7 | 112 | 0.4 | 49 | 48 | 92 |
| 18.1 mg. RbCl[f] | 14 | 53 | 76 | 10.5 | 98 | 2.0 | 121 | 0 | 39 | 38 | 89 |

[a]Reactions of 0.03 M TPCO, 0.003 M BPEA and 0.075 M H$_2$O$_2$ in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.
[f]These catalysts were poorly soluble and did not dissolve prior to or during the reaction.

A moderate increase of light capacity is also obtained.

EXAMPLE XXXIII

The effect of sodium 2,4-dinitrosalicylate salt on the uncatalyzed TCPO reaction is examined by the method described in Example XXXII. The results shown in Table XXXII indicate that the poorly soluble sodium 2,4-dinitrosalicylate, when suspended in the chemiluminescent solution by good stirring, increases light intensity and light capacity and decreases lifetime. A moderate improvement of curve shape efficiency is also observed.

EXAMPLE XXXIV

The effect of weakly basic carboxylic acid amides on the uncatalyzed TCPO reaction is examined by the method described in Example XIX. The results in Table XXXIII indicate that dimethyl formamide increased the light capacity slightly. Urea and acetanilide produced no significant effect in the presence of the large excess of hydrogen peroxide used for these experiments.

EXAMPLE XXXV

The effect of 2,4,6-trichlorophenol on the uncatalyzed TCPO reaction is shown in Table XXXIV. The addition of 2,4,6-trichlorophenol decreased the light capacity moderately and increased the t¾ lifetime.

EXAMPLE XXXVI

The effect of various additives on the uncatalyzed TCPO reaction is shown in Table XXXV. The following additives produced no substantial effect: Polyvinylpyrrolidone Tetradecyl Sodium Sulfate, Cabosil M-5 (Cabot Co.), Amberlite CG 400 ion exchange resin. Other additives decreased the light capacity moderately such as: Alumina, and Surfactants, HDN ®, Avitex ® NA (DuPont Co.).

TABLE XXXII

The Effect of Sodium 2,4-dinitrosalicylate Catalysts on 0.03 M TCPO Chemiluminescence in Ethyl Benzoate-3-Methyl-3-Pentanol[a]

| Catalyst ($10^3$ M) | $I_{max}$[b] (ft. lbt. cm$^{-1}$) | $t\frac{1}{4}$[c] (min.) | $t\frac{3}{4}$[d] (min.) | Q.Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| None | 6.0 | 99 | 198 | 8.8 | 81 | 0.7 | 219 | 0.4 | 30 | 24 | 63 |
| 4.0 mg. Sodium-2,4-dinitro salicylate | 6.3 | 134 | 246 | 13.0 | 121 | 2.1 | 101 | 0 | 28 | 34 | 62 |

[a] Reactions of 0.03 M TCPO, 0.003 M BPEA and 0.075 M H$_2$O$_2$ in ethyl benzoate-3-methyl-3-pentanol (75-25% vol.) at 25° C.
[b] Maximum intensity.
[c] Light decay time from maximum to $\frac{1}{4}$ of maximum intensity.
[d] Time required for the emission of 75% of the total light.
[e] Quantum yield based on TCPO.

TABLE XXXIII

The Effect of Various Carboxylic Acid Amides on 0.03 M TCPO Chemiluminescence in Ethyl Benzoate -3-Methyl-3-Pentanol[a]

| Additive (M) | $t\frac{3}{4}$[b] (min.) | Q.Y. ($10^2$ eins. mole$^{-1}$) | L.C. (lum. hr. l$^{-1}$) | $I_c$ (ft. lamb. cm$^{-1}$) | $T_c$ (min.) | $T_{ind}$ (min.) | E (%) | $LC_c$ (lum. hr. l$^{-1}$) | $LC_T$ (lum. hr. l$^{-1}$) |
|---|---|---|---|---|---|---|---|---|---|
| None | 68.0 | 5.0 | 45.9 | 2.2 | 44.0 | 0.8 | 32 | 14.6 | 28.1 |
| None | 76.3 | 4.8 | 43.5 | 2.1 | 42.6 | 0.6 | 31 | 13.5 | 25.0 |
| DMF ($5 \times 10^{-3}$) | 67.4 | 5.8 | 53.1 | 1.9 | 67.8 | 0.5 | 37 | 19.7 | 39.9 |
| Acetanilide ($5 \times 10^{-3}$) | 77.4 | 5.2 | 47.8 | 2.5 | 37.2 | 1.0 | 31 | 14.7 | 25.5 |
| Urea ($5 \times 10^{-3}$) | 57.6 | 4.9 | 45.1 | 2.5 | 37.1 | 0.6 | 32 | 14.6 | 27.6 |

[a] Reactions of 0.030 M TCPO with 0.75 M H$_2$O$_2$ (large excess) and $3 \times 10^{-2}$ M BPEA (9,10-bis(phenylethynyl)anthracene in ethyl benzoate -3-methyl-3-pentanol (75-25% vol.) at 25°.
[b] Time required for three-quarters of total light emission.

TABLE XXXIV

The Effect of 2,4,6-trichlorophenol on the TCPO Chemiluminescence in Ethyl Benzoate-3-Methyl-3-Pentanol[a]

| Additive (M) | $t\frac{3}{4}$[b] (min.) | Q.Y. ($10^2$ eins. mole$^{-1}$) | L.C. (lum. hr. l$^{-1}$) | $I_c$ (ft. lamb. cm$^{-1}$) | $T_c$ (min.) | $T_i$ (min.) | E (%) | $LC_c$ (lum. hr. l$^{-1}$) | $LC_T$ (lum. hr. l$^{-1}$) |
|---|---|---|---|---|---|---|---|---|---|
| None | 197.9 | 8.8 | 80.6 | 0.7 | 219.3 | 0.4 | 30 | 23.9 | 62.5 |
| 2,4,6-trichlorophenol ($4 \times 10^{-2}$) | 281.4 | 7.4 | 68.1 | 0.9 | 164.2 | 14.9 | 33 | 22.3 | 39.8 |
| 2,4,6-trichlorophenol ($10 \times 10^2$) | 602.3 | 6.5 | 59.0 | 0.6 | 236.1 | 132.1 | 42 | 24.5 | 33.3 |

[a] Reactions of 0.030 M TCPO with 0.075 M H$_2$O$_2$ and $3 \times 10^{-3}$ M BPEA is ethyl benzoate - 3-methyl-3-pentanol (75-25% vol) at 25°.
[b] Time required for three-quarters of total light emission.

TABLE XXXV

ADDITIVE EFFECTS ON THE TCPO REACTION[a]

| Experiment No. | Additive (M) | $T\frac{3}{4}$[b] (min.) | Q.Y.[c] ($10^2$ eins. mole$^{-1}$) | L.C.[c] (lum. hr. l$^{-1}$) | $I_c$ (ft. lamb. cm$^{-1}$) | $T_c$ (min.) | $T_i$ (min.) | E (%) | $LC_c$ (lum. hr. l$^{-1}$) | $LC_t$ (lum. hr. l$^{-1}$) |
|---|---|---|---|---|---|---|---|---|---|---|
| 1 | None | 197.9 | 8.8 | 80.6 | 0.7 | 219.3 | 0.4 | 30 | 23.9 | 62.5 |
| 2 | Polyvinylpyrrolidone (50 mg/3 ml)[d] | 156.2 | 8.6 | 79.0 | 1.3 | 108.2 | 0.3 | 26 | 20.9 | 51.3 |
| 3 | Tetradecyl sodium sulfate (50 mg/3 ml)[d] | 244.4 | 8.2 | 74.9 | 0.8 | 193.3 | 2.0 | 33 | 24.4 | 50.6 |
| 4 | Amberlite CG 400 (50 mg/3 ml)[d] | 280.0 | 7.7 | 70.4 | 0.5 | 258.8 | 0 | 27 | 18.9 | 51.3 |
| 5 | Cabosil (50 mg/3 ml)[d] | 353.0 | 8.1 | 74.5 | 1.0 | 144.2 | 11.3 | 30 | 22.6 | 37.1 |
| 6 | Alumina (Al$_2$O$_3$) (50 mg/3 ml)[d] | 70.1 | 3.3 | 30.0 | 2.8 | 23.8 | 5.8 | 34 | 10.3 | 13.7 |
| 7 | Surfactant HDN ® (58 mg/3 ml)[d] | 15.2 | 3.8 | 34.5 | 7.9 | 12.5 | 1.5 | 44 | 15.1 | 23.5 |
| 8 | Surfactant Avitex ® NA (48 mg/3 ml)[d] | 153.1 | 5.8 | 53.3 | 1.2 | 86.2 | 0 | 30 | 15.8 | 53.3 |

[a] Reactions of 0.030 M TPCO with 0.075 M H$_2$O$_2$ and $3 \times 10^{-3}$ M BPEA is ethyl benzoate-3-methyl-3-pentanol (75-25% vol.) at 25°.
[b] Time required for three-quarters of total light emission.
[c] Q.Y.: Quantium yield based on TCPO; L.C.: Light Capacity.
[d] Insoluble or partially soluble.
® - DuPont Trademark

EXAMPLE XXXVII

The effect of Dacta 1,2-diaminocyclohexanetetra acetic acid on the sodium salicylate catalyzed TCPO reaction in ethyl benzoate-3-methyl-3-pentanol (90-10%) solution is shown in Table XXXVI. The addition of Dacta alone produced no significant effect. Sodium salicylate alone decreased the light capacity slightly and increased intensity and curve shape efficiency substantially. Dacta decreased the light capacity of the sodium salicylate catalyzed reaction slightly and increased the intensity but left the curve shape efficiency essentially unchanged. Dacta changed its effect substantially on storage.

EXAMPLE XXXVIII

The effect of alkali metal salts on the uncatalyzed TCPO reaction in ethyl benzoate-2-octanol (92-8% vol.) solution is shown in Table XXXVII. The poorly soluble rubidium salicylate, potassium formate suspended in the chemiluminescent solution catalyzed the reaction more and produced higher light capacities than the soluble lithium perchlorate. Rubidium salicylate produced a moderately lower light capacity in ethyl benzoate-3-methyl-3-pentanol solvent (70-30%) in which it was soluble.

EXAMPLE XXXIX

The effect of sodium tetrahydroxysuccinate and mannose on the uncatalyzed TCPO reaction on ethyl benzoate-2-octanol solution is shown in Table XXXVIII. The poorly soluble additives suspended in the chemiluminescent solution catalyze the reaction and produce a high light capacity (80-88 lum. hr $1^{-1}$). Sodium tetrahydroxysuccinate is soluble in the solvent mixture of ethyl benzoate-2-octanol-1,2-propanediol (84-8-8%) and catalyzes the reaction and produces a moderately high 50 lum. hr $1^{-1}$ light capacity.

TABLE XXXVI

The Effect of DACTA on Sodium Salicylate Catalyzed TCPO Chemiluminescence in Ethyl Benzoate-3-Methyl-3-Pentanol[a]

| DACTA[b] (M) | Na SAL[c] (M) | Intensity (ft. lbt. cm$^{-1}$) | | | | t $\frac{1}{4}$[d] (min.) | t $\frac{3}{4}$[e] (min.) | Q. Y.[f] ($10^2$ ein. mole$^{-1}$) | LT CAP. (lm. hr $1^{-1}$) | Characteristic Performance Values[g] | | | | | |
|---|---|---|---|---|---|---|---|---|---|---|---|---|---|---|---|
| | | 1 min. | 10 min. | 30 min. | 60 min. | | | | | $I_c$ (ft. lbt. cm$^{-1}$) | $T_c$ (min.) | $T_i$ (min.) | E (%) | $LC_c$ (lm. hr $1^{-1}$) | LC[i] (lm. hr. $1^{-1}$) |
| 0 | 0 | 3.5 | 6.7 | 4.1 | 2.4 | 70 | 146 | 8.9 | 83 | 2.4 | 61 | 0 | 26 | 21 | 41 |
| Sat. | 0 | — | 5.4 | 3.6 | 2.3 | 93 | 152 | 8.0 | 74 | 1.9 | 72 | 0 | 28 | 20 | 38 |
| 0 | 0.0015 | 29 | 17 | 0.7 | — | 1.5 | 15 | 6.6 | 61 | 13.8 | 15 | 0 | 52 | 32 | 46 |
| Sat. | 0.0015 | 29 | 19 | — | — | 10 | 10 | 5.9 | 54 | 19.3 | 10 | 0 | 55 | 30 | 41 |
| Sat.[h] | 0.0015 | 14 | 6.2 | 6.2 | 3.3 | 47 | 54 | 8.4 | 78 | 5.2 | 48 | 0 | 50 | 39 | 53 |

[a]Reactions of 0.030 M TCPO, 0.003 M BPEA and 0.075 M H$_2$O$_2$ in 90 vol. % ethyl benzoate-10 vol. % 3-methyl-3-pentanol 25° C.
[b]1,2-Diaminocyclohexanetetraacetic acid.
[c]Sodium salicylate.
[d]Light decay time from maximum to ¼ of maximum intensity.
[e]Time required for the emission of 75% of the total light.
[f]Quantum yield based on TCPO.
[g]See text.
[h]Aged 55 days at 75° C. in Teflon FEP.

TABLE XXXVII

The Effect of Alkali Metal Salts on TCPO Chemiluminescence in Ethyl Benzoate-2-octanol (92-8%) Solvent[a],

| Additive | Conc. ($10^2 \times$ M) | mg./3 ml. reaction mixture if partially soluble | I max[b] (Foot Lamberts) | t ¼[c] (min.) | t ¾[d] (min.) | Quantum Yield ($10^2 \times$ Einsteins Mole$^{-1}$) | Light Capacity (Lumen Hours Liter$^{-1}$) |
|---|---|---|---|---|---|---|---|
| None | | | 1.4 | 175 | 347 | 5.1 | 46.5 |
| Rb Salicylate[e] | 0.51 | | 44.1 | 2.6 | 68.9 | 7.1 | 58.0 |
| LiClO$_4$ | 1.0 | | 0.2 | 1115.6 | 974.0 | 2.3 | 20.0 |
| RbCl[f] | 1.0 | | 4.59 | 77.5 | 73.1 | 4.1 | 36.0 |
| Rb Salicylate | | 0.8 | 68.31 | 1.7 | 154.8 | 11.3 | 99.3 |
| KO$_2$CH | | 2.0 | 5.93 | 250.5 | 208.8 | 11.7 | 102.8 |
| KO$_2$CH | | 17.3 | 7.84 | 150.2 | 128.9 | 10.7 | 93.79 |

[a]Reaction concentrations were: 3 × 10$^{-2}$ M TCPO, 3 × 10$^{-3}$ M BPEA and 7.5 × 10$^{-2}$ M H$_2$O$_2$ in ethylbenzoate-2-octanol (92-8% by volume) 1.0 25° C.
[b]Maximum intensity at 1,0 cm. thickness.
[c]Light decay time from maximum to ¼ of maximum intensity.
[d]Time required for the emission of 75% of the total light.
[e]Solvent was ethylbenzoate-3-Me-3-pentanol (70-30% by volume).
[f]Solvent was ethylbenzoate-2-octanol-1,2-propanediol (84-8-8% by volume).

TABLE XXXVIII

THE EFFECT OF SODIUM TETRAHYDROXYSUCCINATE AND MANNOSE ON THE TCPO CHEMILUMINESCENCE IN ETHYL BENZOATE-2-OCTANOL[a]

| Additive | Conc. ($10^2 \times$ M) | mg./3 ml. reaction mixture if partially soluble | I max[b] (Foot Lamberts) | t ¼[c] (min.) | t ¾[d] (min.) | Quantum Yield ($10^2 \times$ Einsteins Mole$^{-1}$) | Light Capacity (Lumen Hours Liters$^{-1}$) |
|---|---|---|---|---|---|---|---|
| None | | | 1.4 | 175. | 347. | 5.1 | 46.5 |
| (C(OH)$_2$CO$_2$Na . H$_2$O)$_2$[e] | 0.01 | | 16.27 | 6.9 | 101.8 | 5.5 | 48.3 |
| (C(OH)$_2$CO$_2$Na . H$_2$O)$_2$[e] | 0.02 | | 47.04 | 2.8 | 67.7 | 5.9 | 51.9 |
| Rb salicylate | | 0.8 | 68.31 | 1.7 | 154.8 | 11.3 | 99.3 |
| (C(OH)$_2$CO$_2$Na . H$_2$O)$_2$ | | 39.3 | 27.3 | 35.5 | 26.4 | 9.0 | 79.1 |
| Mannose | | 10.8 | | | | | |
| (C(OH)$_2$CO$_2$Na . H$_2$O)$_2$ | | 7.86 | 7.1 | 81.5 | 219.4 | 10.1[h] | 88.8 |

TABLE XXXVIII-continued

THE EFFECT OF SODIUM TETRAHYDROXYSUCCINATE
AND MANNOSE ON THE TCPO CHEMILUMINESCENCE
IN ETHYL BENZOATE-2-OCTANOL[a]

| Additive | Conc. ($10^2 \times$ M) | mg./3 ml. reaction mixture if partially soluble | I max[b] (Foot Lamberts) | t ½[c] (min.) | t ¾[d] (min.) | Quantum Yield ($10^2 \times$ Einsteins Mole$^{-1}$) | Light Capacity (Lumen Hours Liters$^{-1}$) |
|---|---|---|---|---|---|---|---|
| Mannose | | 5.4 | | | | | |

[a] Reaction concentrations were: $3 \times 10^{-2}$ M TCPO, $3 \times 10^{-3}$ M BPEA and $7.5 \times 10^{-2}$ M H$_2$O$_2$ in ethylbenzoate-2-octanol (92–8% by volume) at 25° C.
[b] Maximum intensity at 1.0 cm. thickness.
[c] Light decay time from maximum to ¼ of maximum intensity.
[d] Time required for the emission of 75% of the total light.
[e] Solvent was ethylbenzoate-2-octanol-1,2-propanediol (84–8–8% by volume).

EXAMPLE XL

The effect of salicylic acid-tetrabutylammonium hydroxide buffer on the uncatalyzed TCPO reaction in ethyl benzoate-2-octanol 92–8% solution is shown in Table XXXIX. The buffer catalyzes the reaction and produces high light capacities. The increasing buffer concentration (at constant acid-base ratio) decreases the light capacity and decreases the lifetime. Increasing the ratio of acid to base leads to higher light capacity but shorter lifetime.

TCPO reaction in the presence of tetrabutylammonium perchlorate in ethyl benzoate-2-octanol (92–8%) solution is shown in Table XLI. Increasing the hydrogen peroxide concentration increases the light capacity and lifetime moderately.

EXAMPLE XLIII

The effect of selected additives on the salicylic acid-tetrabutylammonium hydroxide buffered TCPO reaction in ethyl benzoate-2-octanol solution is shown in Table XLII. The addition of mannose, sorbitol and

TABLE XXXIX

THE EFFECT OF SALICYLIC ACID-TETRABUTYLAMMONIUM
HYDROXIDE BUFFER ON THE TCPO CHEMILUMINESCENCE
IN ETHYL BENZOATE-2-OCTANOL (92–8%)

| Salicylic Acid ($10^3 \times$ M) | Bu$_4$N$^+$ $^-$OH ($10^4 \times$ M) | Acid/Base | I max[b] (Foot Lamberts) | t½[c] (min.) | T¾[d] (min.) | Quantum Yield (Einsteins Mole$^{-1}$ $\times 10^2$) | Light Capacity (Lumen Hours Liter$^{-1}$) |
|---|---|---|---|---|---|---|---|
| None | None | | 1.4 | 175.0 | 347.0 | 5.1 | 46.5 |
| 4.0 | 2.8[e] | 14.7 | 19.9 | 10.4 | 155.3 | 9.6 | 84.4 |
| 4.0 | 2.8 | 14.7 | 29.8 | 7.9 | 41.6 | 5.8 | 51.0 |
| 8.1 | 5.5 | 14.7 | 17.5 | 19.7 | 29.9 | 4.8 | 42.2 |
| 25.0 | 10.0 | 25.0 | 11.7 | 18.9 | 24.6 | 3.0 | 26.4 |
| 25.0 | 17.0 | 14.7 | 10.6 | 12.5 | 11.1 | 1.6 | 14.0 |
| 50.0 | 33.0 | 15.1 | 11.8 | 10.5 | 12.5 | 1.7 | 14.9 |

[a] Reaction of $3 \times 10^{-2}$ M TCPO [bis(2,4,6-trichlorophenyl)oxalate], $3 \times 10^{-3}$ M BPEA [9,10-bis(phenylethynyl)anthracene] and $7.5 \times 10^{-2}$ M H$_2$O$_2$ in ethylbenzoate-2-octanol solvent mixture (92–8% by volume) at 25° C.
[b] Maximum intensity at 1.0 cm. thickness.
[c] Light decay time from maximum to ¼ of maximum intensity.
[d] Time required for the emission of ¾ of total light.
[e] Potassium pentachlorophenolate was used in the place of Bu$_4$NOH.

EXAMPLE XLI

The effect of tetraalkylammonium salts on the salicylic acid-tetrabutylammonium hydroxide buffered TCPO reaction in ethyl benzoate-2-octanol (92–8%) is shown in Table XL. The addition of tetrabutylammonium perchlorate (TBAP) slightly decreased the light capacity and the lifetime of the buffered reaction. Essentially similar effects are obtained when TBAP is added together with another salt such as tetramethylammonium tetrafluoroborate or tetramethylammonium tetrafluorophosphate.

EXAMPLE XLII

The effect of hydrogen peroxide concentration on the salicyclic acid-tetrabutylammonium hydroxide buffered triphenylphosphine oxide similarly to tetrabutylammonium perchlorate slightly decreased the light capacity and lifetime.

EXAMPLE XLIV

The effect of rubidium acetate and mannose on the uncatalyzed TCPO reaction in ethyl benzoate-2-octanol (92–8%) solution which contains small amounts of 1,2-propanediol is shown in Table XLIII. The addition of rubidium acetate alone or together with mannose produced moderately high light capacities and short lifetimes. High concentration of rubidium acetate ($5 \times 10^{-2}$ M or higher) produced a short flash of light only.

TABLE XL

THE EFFECT OF TETRAALKYLAMMONIUM SALTS ON TCPO CHEMILUMINESCENCE SALICYLIC ACID-TETRABUTYLAMMONIUM HYDROXIDE BUFFERED IN ETHYL BENZOATE-2-OCTANOL[a]

| Additive Ammonium Salt | ($10^2$ M) | Buffer [Acid] ($10^4$ M) | Buffer [Base] ($10^5$ M) | I max[b] (Foot Lamberts) | t ¼ I[c] (min.) | t ¾ A[d] (min.) | Quantum Yield (Einsteins Mole$^{-1}$ × $10^2$) | Light Capacity (Lumen hours liter$^{-1}$) |
|---|---|---|---|---|---|---|---|---|
| TBAP[e] | 1.0 | 8.0 | 10.0 | 53.7 | 3.8 | 70.1 | 11.6 | 93.7 |
| TBAP | 5.0 | 8.0 | 5.0 | 17.5 | 49.2 | 72.3 | 10.4 | 83.8 |
| TBAP[f] | 5.0 | 8.0 | 10.0 | 27.9 | 7.9 | 94.2 | 11.7 | 94.4 |
| TBAP[f] | 8.0 | 8.0 | 20.0 | 17.6 | 13.6 | 78.6 | 7.7 | 62.1 |
| TBAP[f] | 9.0 | 4.0 | 10.0 | 21.6 | 13.9 | 87.8 | 10.6 | 85.2 |
| TBAP[f] | 9.0 | 8.0 | 10.0 | 17.6 | 48.0 | 82.7 | 10.8 | 86.7 |
| TBAP | 9.0 | 80.0 | 100.0 | 13.4 | 17.9 | 20.0 | 3.0 | 24.5 |
| TBAP[f] | 10.0 | 8.0 | 5.0 | 8.8 | 131.2 | 129.7 | 13.9 | 112.0 |
| TBAP,Me$_4$NBF$_4$ | 9.0,4.0 | 8.0 | 10.0 | 6.3 | 114.0 | 89.2 | 9.1 | 80.1 |
| TBAP,Me$_4$NBF$_4$ | 5.0,4.0 | 8.0 | 10.0 | 23.0 | 12.1 | 73.7 | 9.7 | 85.2 |
| TBAP,Me$_4$NPF$_6$ | 5.0,4.0 | 8.0 | 10.0 | 16.7 | 42.4 | 73.5 | 10.2 | 89.4 |
| None[f] | — | 8.0 | 5.0 | 17.1 | 26.2 | 180.6 | 14.2 | 114.2 |
| None[f] | — | 8.0 | 10.0 | 52.2 | 3.8 | 133.6 | 14.3 | 115.2 |

[a]Reaction of 3 × $10^{-2}$ M Bis(2,4,6-trichlorophenyl)oxalate [TCPO], 3 × $10^{-3}$ M 9,10-bis(phenylethynyl) anthracene [BPEA], and 7.5 × $10^{-2}$ M hydrogen peroxide in ethylbenzoate-2-octanol (92%–8% by volume) solvent mixture at 25°.
[b]Maximum intensity at 1.0 cm. thickness.
[c]Time required for the decay of intensity to one-quarter of the maximum.
[d]Time required for the emission of three-quarters of the total light output.
[e]Tetrabutylammonium perchlorate.
[f]A fraction larger than 15% of the quantum yield is computed on the basis of extrapolation.

TABLE XLI

THE EFFECT OF HYDROGEN PEROXIDE CONCENTRATION ON TCPO REACTION IN THE PRESENCE OF TETRABUTYLAMMONIUM HYDROXIDE-SALICYLIC ACID-TETRABUTYLAMMONIUM PERCHLORATE IN ETHYL BENZOATE-2-OCTANOL[a]

| $H_2O_2$ ($10^2$ × M) | I max[b] (Foot Lamberts) | t ¼[c] (min.) | t ¾[d] (min.) | Quantum Yield ($10^2$ × Einsteins Mole$^{-1}$) | Light Capacity (Lumen Hours Liter$^{-1}$) |
|---|---|---|---|---|---|
| 3.7 | 10.8 | 47.9 | 64.7 | 7.2 | 62.9 |
| 7.5 | 18.6 | 41.4 | 67.4 | 10.2 | 89.9 |
| 10 | 15.7 | 67.2 | 102.1 | 11.0 | 96.7 |

[a]Concentrations were: 3 × $10^{-2}$ M TCPO (bis(2,4,6-trichlorophenyl)oxalate) 3 × $10^{-3}$ M BPEA (9,10-bis(phenylethynyl)anthracene), 8 × $10^{-4}$ M salicylic acid, 1 × $10^{-4}$ M (C$_4$H$_9$)$_4$NOH and 9 × $10^{-2}$ M TBAP ((C$_4$H$_9$)$_4$NClO$_4$).
[b]Maximum intensity at 1.0 cm. thickness.
[c]Light decay time from maximum to ¼ of maximum intensity.
[d]Time required for the emission of 75% of the total light.

TABLE XLII

THE EFFECT OF VARIOUS ADDITIVES ON THE SALICYLIC ACID-TETRABUTYLAMMONIUM HYDROXIDE BUFFERED TCPO REACTION IN ETHYL BENZOATE-2-OCTANOL[a]

| Additive | Additive Concentration ($10^2$ × M) | I max[b] (Foot Lamberts) | t ¼[c] (min.) | t ¾[d] (min.) | Quantum Yield ($10^2$ × Einsteins Mole$^{-1}$) | Light Capacity (Lumen Hours Liter$^{-1}$) |
|---|---|---|---|---|---|---|
| None | — | 25.7 | 11.7 | 130.6 | 11.6 | 102.0 |
| Mannose | 1.0 | 23.8 | 10.5 | 154.5 | 10.9[e] | 95.8 |
| Mannose[f] | 1.0 | 20.2 | 11.4 | 47.1 | 5.5 | 48.3 |
| Sorbitol | 1.0 | 43.6 | 4.3 | 107.7 | 10.3[e] | 90.5 |
| Sorbitol[g] | 1.0 | 1.8 | 206.1 | 261.4 | 2.9 | 25.5 |
| Bu$_4$NClO$_4$ | 5.0 | 17.5 | 49.2 | 72.3 | 10.4 | 91.4 |
| None[h] | — | 17.5 | 19.7 | 29.9 | 4.8 | 42.2 |
| (C$_6$H$_3$)$_3$PO[h] | 5.0 | 19.0 | 11.2 | 15.6 | 3.4 | 29.9 |

[a]Reaction of 3 × $10^{-2}$ M TCPO (bis(2,4,6-trichlorophenyl)oxalate) 3 × $10^{-3}$ M BPEA (9,10-bis-(phenylethynyl)anthracene and 7.5 × $10^{-2}$ M $H_2O_2$ in ethylbenzoate-2-octanol (92.8% by volume) solvent mixture at 25° C. The buffer was 8 × $10^{-4}$ M salicylic acid and 5 × $10^{-5}$ M Bu$_4$NOH. The mannose and sorbitol additives were only partially soluble.
[b]Maximum intensity at 1.0 cm. thickness.
[c]Light decay time from maximum to ¼ of maximum intensity.
[d]Time required for emission of 75% of total light.
[e]A fraction (~50%) of the quantum yield is computed on the basis of extrapolation.
[f]Buffer was 4 × $10^{-3}$ M salicyclic acid and 2.8 × $10^{-4}$ M potassium pentachlorophenolate.
[g]2.5 × $10^{-2}$ M salicylic acid was used in the place of buffer.
[h]Buffer was 8 × $10^{-3}$ M salicylic acid and 5.5 × $10^{-4}$ M Bu$_4$NOH.

TABLE XLIII

THE EFFECT OF RUBIDIUM ACETATE AND MANNOSE ON TCPO CHEMILUMINESCENCE IN ETHYL BENZOATE-2 OCTANOL-1,2-PROPANE-DIOL SOLUTION[a]

| $RbO_2CCH_3$ ($10^3 \times M$) | Mannose ($10^3 \times M$) | 1,2-Propanediol in solvent (% volume) | I max[b] (Foot Lamberts) | $t_{\frac{1}{4}}$[c] (min.) | $t_{\frac{3}{4}}$[d] (min.) | Quantum Yield[e] ($10^2 \times$ Einsteins Mole$^{-1}$) | Light Capacity (Lumen Hours Liter$^{-1}$) |
|---|---|---|---|---|---|---|---|
| None | None | None | 1.4 | 175.0 | 347.0 | 5.1 | 46.5 |
| 0.1 | — | 1 | 7.2 | 75.8 | 223.7 | 9.0 | 78.8 |
| 0.5 | — | 5 | 32.34 | 3.1 | 126.0 | 7.2 | 63.3 |
| 0.5 | 5.0 | 10 | 25.48 | 3.6 | 171.3 | 6.7 | 58.8 |
| 1.0 | — | 11 | 34.40 | 2.5 | 88.4 | 5.3 | 46.4 |
| 1.0[f] | — | 11 | 39.20 | 1.6 | 168.0 | 7.9 | 69.4 |
| 1.0[f] | 1.0 | 12 | 42.14 | 2.4 | 150.8 | 7.8 | 68.3 |
| 10.0 | — | 1 | 24.50 | 3.5 | 337.7 | 15.0 | 131.6 |
| 10.0[f,g] | — | 1 | 113.88 | 1.4 | 2.8 | 2.7 | 23.5 |
| 10.0[f,g] | 5.0 | 5 | 81.34 | 0.5 | 1.2 | 0.8 | 6.6 |
| 50.0 | — | 5 | No Light | | | | |
| 50.0[f] | — | 5 | Very short burst of light. | | | | |
| 50.0 | 1.0 | 6 | Very short burst of light. | | | | |
| 100.0 | — | 11 | No light. | | | | |

[a]Reaction concentrations were: $3 \times 10^{-2}$ M TCPO, $3 \times 10^{-3}$ M BPEA and $7.5 \times 10^{-2}$ M $H_2O_2$ in ethylbenzoate-2-octanol (92-8% by volume) at 25° C.
[b]Maximum intensity at 1.0 cm. thickness.
[c]Light decay time from maximum intensity.
[d]Time required for the emission of 75% of the total light.
[e]The quantum yield was computed on the basis of measuring 50-85% of the emitted light and calculating the remaining portion by extrapolation which assumed exponential light decay.
[f]$RBO_2CCH_3$ added last. Usually $H_2O_2$ is added last.
[g]Less than 15% of the quantum yield is based of extrapolation.

EXAMPLE XLV

The effect of selected catalysts on the uncatalyzed TCPO reaction in ethyl benzoate-2-octanol (92-8%) solution is compared in Table XLIII. The average intensity during the emission of 75% of the available light is computed and shown in Table XLIV. Sodium salicylate produced a high intensity high light capacity short lived (16 minutes) chemiluminescent emission. The other catalyst system tetrabutylammonium perchlorate TBAP in a salicylic acid-tetrabutylammonium hydroxide buffered system produced an excellent high light capacity, high intensity, 1 hour lifetime system.

EXAMPLE XLVI

The effect of 2,3,6-trichlorobenzoate salts on the TCPO reaction in ethyl benzoate-t-butanol (90-10%) solution is compared in Table XLV. The addition of benzyltrimethylammonium salt produces slightly lower light capacities and shorter lifetimes than obtained with the sodium salt. However, the curve shape efficiency of the reaction appears to be superior as indicated by the smaller difference in $t_{\frac{1}{4}}$ and $t_{\frac{3}{4}}$ lifetimes. Sodium trichlorobenzoate produces high light capacities which decrease with increasing catalyst concentration.

EXAMPLE XLVII

The effect of three buffers on the TCPO reactions is compared in ethyl benzoate-t-butanol solution. The results in Table XLVI indicate that all three buffers produced substantially better curve shape efficiency based on the ratio of $t_{\frac{1}{4}}:t_{\frac{3}{4}}$ lifetime than did a strong base such as benzyltrimethylammonium hydroxide. The phosphoric acid-benzyltrimethylammonium hydroxide buffer produced slightly higher light capacities, better curve shape efficiencies and longer lifetime under approximately the same conditions than the 2,3,6-trichlorobenzoic acid-benzyltrimethylammonium hydroxide buffer. Tartaric acid-tetrabutylammonium hydroxide led to results similar to those of the latter buffer.

TABLE XLIV

THE EFFECTS OF SELECTED CATALYSTS ON TCPO CHEMILUMINESCENCE IN ETHYL BENZOATE-2-OCTANOL SOLUTION[a]

| | ($10^3 \times M$) | I ec (Foot Lambert) | $t_{\frac{3}{4}}$[d] (Foot Lambert) | (min.) | Quantum Yield (Einsteins Mole$^{-1} \times 10^2$) | Light Capacity (Lumen Hours Liter$^{-1}$) |
|---|---|---|---|---|---|---|
| Na salicylate | 1.25 | 45.6 | 21.9 | 16.1 | 8.9 | 78.1 |
| $(C_4H_9)_4NClO_4$-Salicylic Acid-$(C_4H_9)_4NOH$ | 90-0.08-0.01 | 18.6 | 5.9 | 67.3 | 10.2 | 89.5 |

[a]Concentrations were $3 \times 10^{-2}$ M TCPO, $3 \times 10^{-3}$ M BPEA, $7.5 \times 10^{-2}$ M $H_2O_2$ in ethylbenzoate-2-octanol (90-10% by volume) at 25° C.
[b]Maximum intensity at 1.0 cm. thickness.
[c]Average intensity during $t_{\frac{3}{4}}$ lifetime at 1.0 cm. thickness.
[d]Time needed to emit 75% of the available light.

TABLE XLV

THE EFFECT OF 2,3,6-TRICHLOROBENZOATE SALTS ON TCPO CHEMILUMINESCENCE IN ETHYL BENZOATE-t-BUTANOL SOLUTION[a]

| | I max[b] (Foot Lamberts) | $t_{\frac{1}{4}}$[c] (min.) | $t_{\frac{3}{4}}$[d] (min.) | Quantum Yield ($10^2 \times$ Einsteins Mole$^{-1}$) | Light Capacity (Lumen Hours Liter$^{-1}$) |
|---|---|---|---|---|---|
| Benzyltrimethyl-ammonium salt | | | | | |

TABLE XLV-continued
THE EFFECT OF 2,3,6-TRICHLOROBENZOATE SALTS ON TCPO CHEMILUMINESCENCE IN ETHYL BENZOATE-t-BUTANOL SOLUTION[a]

| | I max[b] (Foot Lamberts) | t ¼[c] (min.) | t ¾[d] (min.) | Quantum Yield ($10^2$ × Einsteins Mole$^{-1}$) | Light Capacity (Lumen Hours Liter$^{-1}$) |
|---|---|---|---|---|---|
| $1.5 \times 10^{-3}$ M[e] | 33.0 | 14.5 | 32.0 | 7.8 | 68 |
| $1.5 \times 10^{-3}$ M[f] | 24.7 | 16.1 | 42.2 | 7.5 | 65 |
| Potassium Salt | | | | | |
| $1.5 \times 10^{-3}$ M | 24.7 | 10.2 | 124 | 10.4 | 90 |
| $3 \times 10^{-3}$ M | 33.0 | 3.0 | 78 | 7.4 | 64 |
| $4.5 \times 10^{-3}$ M | 27.5 | 6.8 | 45 | 5.1 | 44 |
| $1.5 \times 10^{-3}$ M[g] | 22.0 | 2.7 | 88.4 | 3.0 | 26 |
| $3.0 \times 10^{-3}$ M[g] | 26.4 | 3.9 | 84.3 | 3.5 | 30 |

[a]Reaction concentrations were: $3 \times 10^{-2}$ M TCPO, $3 \times 10^{-3}$ M BPEA and $7.5 \times 10^{-2}$ M $H_2O_2$ in ethylbenzoate-t-butanol (90–10% by volume) at 25° C.
[b]Maximum intensity at 1.0 cm. thickness.
[c]Light decay time from maximum to ¼ of maximum intensity.
[d]Time required for the emission of 75% of the total light.
[e]Solid only slightly soluble in t-butanol.
[f]0.28 M $H_2O$ added with the $H_2O_2$ sol.
[g]The solvent for these experiments was 90% o-dichlorobenzene and 10% t-butanol.

TABLE XLVI
THE EFFECT OF BUFFERS ON TCPO CHEMILUMINESCENCE IN ETHYL BENZOATE-t-BUTANOL SOLUTION

| Acid | | Base | | I max[b] (Ft. Lamb.) | t ¼ I[c] (min.) | t ¾ A[d] (min.) | Quantum Yield ($10^2$ Einsteins Mole$^{-1}$) | Capacity (Lumen Hour Liter$^{-1}$) |
|---|---|---|---|---|---|---|---|---|
| | Conc. ($10^3$ M) | | Conc. ($10^3$ M) | | | | | |
| None | — | Triton-B[e] | 2.50 | 31 | 3 | 5 | 1.4 | 12 |
| $H_3PO_4$ | 2.83 | Triton-B | 1.67 | 12 | 59 | 56 | 9.8 | 85 |
| $H_3PO_4$ | 2.83 | Triton-B | 2.50 | 20 | 23 | 22 | 6.6 | 57 |
| $H_3PO_4$ | 2.83 | Triton-B | 3.33 | 22 | 7 | 7 | 2.3 | 20 |
| { $H_3PO_4$ / TBAP } | { 2.83 / 50.0 } | Triton-B | 2.50 | 34 | 6 | 10 | 2.9 | 25 |
| 2,3,6-trichlorobenzoic | Nil | Triton-B | 0.73 | 42.4 | 9.4 | 36.6 | 8.4 | 73 |
| 2,3,6-trichlorobenzoic | Nil | Triton-B | 1.83 | 49.4 | 4.9 | 11.7 | 4.2 | 36 |
| 2,3,6-trichlorobenzoic | 2.0 | Triton-B | 1.83 | 30.2 | 8.6 | 14.2 | 3.9 | 34 |
| 2,3,6-trichlorobenzoic | 4.0 | Triton-B | 0.73 | 31.9 | 12.4 | 31.1 | 7.0 | 61 |
| 2,3,6-trichlorobenzoic | 4.0 | Triton-B | 1.83 | 38.5 | 7.3 | 12.4 | 4.3 | 37 |
| Tartaric Acid | 3.0 | TBAH[f] | 1.7 | 17 | 29 | 40 | 6.41 | 56 |
| Tartaric Acid | 3.0 | TBAH | 5.0 | 13 | 2 | 4 | 0.48 | 4 |
| Tartaric Acid | 10.0 | TBAH | 3.3 | 11 | 16 | 23 | 3.04 | 26 |
| Tartaric Acid | 15.0 | TBAH | 1.7 | 11 | 48 | 74 | 7.57 | 66 |

[a]Reaction: $3 \times 10^{-2}$ M TCPO, $2 \times 10^{-3}$ M BPEA, $1.5 \times 10^{-1}$ M $H_2O_2$ in 90% ethylbenzoate-10%-t-butanol at 25° C.
[b]Maximum intensity at 1.0 cm. thickness.
[c]Light decay time from maximum to ¼ of maximum intensity.
[d]Time required for the emission of 75% of the total light.
[e]Benzyltrimethylammonium hydroxide.
[f]Tetrabutylammonium hydroxide.

EXAMPLE XLVIII

The effect of sodium salicylate on the TCPO reaction in various solvent mixtures is shown by Table XLVII. The results indicate that sodium salicylate in an ethyl benzoate-alcohol solution produces a higher light capacity, higher light intensity and better curve shape efficiency (based on t¼:t¾ ratio) than in o-dichlorobenzene-t-butanol solution. Approximately similar results are obtaind in ethyl benzoate-2-octanol and ethyl benzoate-t-butanol solutions. However, substantially lower light capacities are obtained in ethyl benzoate-1,2-propanediol solution. The addition of water leaves the light capacity essentially unchanged in ethyl benzoate-t-butanol solution.

EXAMPLE XLIX

The effect of benzyltrimethylammonium hydroxide concentration on the TCPO reaction in o-dichlorobenzene-t-butanol (90–10%) solution is shown in Table XLVIII. The benzyltrimethylammonium hydroxide (Triton B) catalyzed reaction produces a moderately high light capacity and poor curve shape efficiency. Increasing the catalyst concentration decreases the lifetime but leaves light capacity and curve shape efficiency (based on t¼:t¾ ratio) essentially unchanged.

EXAMPLE L

The effect of cosolvents on the sodium salicylate and tetrabutylammonium salicylate catalyzed TCPO reaction in ethyl benzoate solution is shown in Table XLIX. In the absence of catalyst, the increasing concentration of 3-methyl-3-pentanol (10–25% range) decreases the intensity and increases the lifetime while it leaves the light capacity and curve shape efficiency essentially unchanged. The sodium salicylate catalyzed reaction produces equally good chemiluminescence in the presence of the following cosolvents: 3-methyl-3-pentanol-t-butanol, 2-ethylhexanol-2, 3,6-dimethyloctanol-3.

TABLE XLVII

EFFECT OF SODIUM SALICYLATE ON TCPO CHEMILUMINESCENCE IN VARIOUS SOLVENT MIXUTRES[a]

| Na Salicylate ($M \times 10^3$) | Solvent [t-Butanol] (% vol.) | [o-Dichlorobenzene] (% vol.) | [1,2-Propanediol] (% vol.) | I max[b] (Ft. Lasb.) | $t\frac{1}{4}$[c] (min.) | $t\frac{3}{4}$[d] (min.) | Quantum Yield (Einsteins Mole$^{-1}$ $\times 10^2$) | Light Capacity (Lumen Hours Liter$^{-1}$) |
|---|---|---|---|---|---|---|---|---|
| 1.0[e] | 10 | — | — | 24.7 | 9 | 179 | 11.62 | 101 |
| 1.25 | 10[f] | — | — | 45.6 | 21 | 16 | 8.9 | 76.1 |
| 1.5 | 10 | — | — | 21.9 | 31 | 28 | 6.54 | 37 |
| 3.0 | 10 | — | — | 38.5 | 9 | 18 | 5.49 | 48 |
| 4.0[e] | 3 | — | 7 | 34.1 | 13 | 19 | 5.37 | 47 |
| 1.5[g] | 10 | — | — | 27.5 | 14 | 31 | 6.32 | 55 |
| 1.5[h] | 10 | — | — | 22.0 | 3 | 108 | 5.59 | 49 |
| 1.5[i] | 10 | — | — | 33.0 | 12 | 33 | 7.57 | 66 |
| 1.0[e] | — | — | 10 | 35.7 | 5 | 88 | 7.09 | 61 |
| 1.0[e] | 8.3 | — | 1.7 | 22.0 | 16 | 125 | 10.47 | 91 |
| 0.75 | 10 | 90 | — | 13.7 | 6 | 67 | 3.07 | 27 |
| 1.5 | 10 | 90 | — | 19.2 | 4 | 61 | 3.28 | 28 |

[a] Reaction concentrations were: $3 \times 10^{-2}$ M TCPO, $3 \times 10^{-3}$ M BPEA and $7.5 \times 10^{-2}$ N $H_2O_2$ in 90% ethylbenzoate solvent mixtures as indicated.
[b] Maximum intensity at 1.0 cm. thickness.
[c] Light decay time from maximum to $\frac{1}{4}$ of maximum intensity.
[d] Time required for the emission of 75% of the total light.
[e] 0.1 M $H_2O_2$ was used.
[f] 2-octanol was used in the place of t-butanol.
[g] $[H_2O] = 0.28$ M, added with $H_2O_2$ sol.
[h] $[H_2O] = 0.28$ M, injected as pure $H_2O$.
[i] $[H_2O] = 0.14$ M, added with $H_2O_2$ sol.

TABLE XLVIII

THE EFFECT OF TRITON B ON THE TCPO CHEMILUMINESCENCE IN o-DICHLOROBENZENE-t-BUTANOL SOLUTION[a]

| Additive | Conc. ($10^2 \times M$) | I max[b] (Foot Lamberts) | $t\frac{1}{4}$[c] (min.) | $t\frac{3}{4}$[d] (min.) | Quantum Yield ($10^2 \times$ Einsteins Mole$^{-1}$) | Light Capacity (Lumen Hours Liter$^{-1}$) |
|---|---|---|---|---|---|---|
| Triton B | 0.01 | 13.13 | 10.7 | 128.2 | 5.5 | 48.3 |
| Triton B | 0.02 | 22.54 | 5.7 | 85.7 | 5.6 | 49.2 |

[a] Reaction concentrations were $3 \times 10^{-2}$ M TCPO, $3 \times 10^{-3}$ M BPEA and $7.5 \times 10^{-2}$ M $H_2O_2$ in o-dichlorobenzene-t-butanol (90–10% by volume) at 25° C.
[b] Maximum intensity at 1.0 cm. thickness.
[c] Light decay time from maximum to $\frac{1}{4}$ of maximum intensity.
[d] Time required for the emission of 75% of the total light.

TABLE XLIX

CO-SOLVENT EFFECTS ON 0.03 M TCPO REACTIONS IN ETHYL BENZOATE[a]

| Catalyst[b] ($10^2$ M) | Co-solvent[c] | Vol. % | $I_{max}$[d] (ft. lbt. cm$^{-1}$) | $t\frac{1}{4}$[e] (min.) | $t\frac{3}{4}$[f] (min.) | Q.T[g] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|---|---|
| None | — | Me. Pent. | 10 | 7.9 | 70 | 146 | 8.9 | 83 | 2.4 | 61 | 0 | 26 | 21 | 41 |
| None | — | Me. Pent. | 25 | 6.0 | 99 | 198 | 8.8 | 84 | 0.7 | 219 | 0.4 | 30 | 24 | 68 |
| Na Sal[h] | .125 | Me. Pent. | 25 | 49 | 3.7 | 28 | 6.9 | 64 | 6.7 | 33 | 0 | 54 | 35 | 53 |
| Na Sal[i] | .125 | Me. Pent. | 25 | 42 | 4.0 | 40 | 8.3 | 77 | 6.2 | 50 | 0 | 64 | 49 | 68 |
| Na Sal | .125 | 2-Oct. | 8 | 46 | 21 | 16 | 8.9 | 82 | 17.5 | 17 | 0 | 57 | 47 | 64 |
| Na Sal[h] | .150 | t-But. | 10 | 80 | 1.9 | 19 | 7.1 | 66 | 11.2 | 19 | 0 | 48 | 31 | 47 |
| Na Sal[h] | .150 | Me. Pent. | 10 | 88 | 1.5 | 15 | 6.6 | 61 | 13.8 | 15 | 0 | 52 | 32 | 46 |
| Na Sal[h] | .150 | 2-Et. Hex. | 10 | 85 | .9 | 23 | 7.2 | 67 | 9.3 | 24 | 0 | 52 | 35 | 52 |
| Na Sal[h] | .150 | Di-Me. Oct. | 25 | 81 | 1.0 | 24 | 6.3 | 58 | 6.5 | 26 | 0 | 45 | 26 | 45 |
| Na Sal | .30 | t-But. | 10 | 39 | 9.3 | 18 | 5.6 | 52 | 7.7 | 19 | 0 | 43 | 23 | 39 |
| Na Sal | .30 | Me. Pent. | 20 | 45 | 4.4 | 16 | 4.8 | 44 | 8.3 | 18 | 0 | 51 | 22 | 34 |
| BuA Sal | .05 | Me. Pent. | 12 | 44 | 6.3 | 32 | 8.8 | 76 | 7.5 | 35 | 0 | 52 | 40 | 60 |
| BuA Sal | .05 | Me. Pent. | 20 | 49 | 8.6 | 26 | 8.7 | 76 | 8.9 | 27 | 0 | 48 | 37 | 57 |
| BuA Sal | .05 | Me. Pent. | 25 | 49 | 14 | 25 | 9.0 | 84 | 9.9 | 26 | 0 | 47 | 39 | 63 |
| BuA Sal | .05 | Me. Pent. | 30 | 44 | 12 | 28 | 8.9 | 77 | 8.2 | 28 | 0 | 46 | 35 | 57 |

[a] Reactions of 0.03 M TCPO, 0.003 M BPEA, and 0.075 M $H_2O_2$ at 25° C.
[b] Na Sal: sodium salicylate; BuA Sal: tetrabutylammonium salicylate;
[c] Me. Pent.: 3-methyl-3-pentanol; t-But.: t-butanol; 2-Oct.: 2-octanol; Et. Hex.: 2-ethylhexanol; Di-Me. Oct.: 3,6-dimethyloctanol-3.
[d] Maximum intensity.
[e] Light decay time from maximum to $\frac{1}{4}$ of maximum intensity.
[f] Time required for the emission of 75% of the total light.
[g] Quantum yield based on TCPO.
[h] Na Sal. aND $H_2O_2$ were combined and stored briefly before use.
[i] Added sodium salicylate or tetrabutylammonium hydroxide near the end of the reaction did not increase the light yield.

The sodium salicylate catalyst stored in 3-methyl-3-pentanol solution slightly changed its catalytic effect upon storage.

The increasing concentration of 3-methyl-3-pentanol cosolvent slightly decreases the intensity and lifetime of the tetrabutylammonium salicylate catalyzed reaction, but leaves light capacity and curve shape efficiency unchanged.

EXAMPLE LI

The effect of hydrogen peroxide concentration on the uncatalyzed TCPO reaction is shown in Table L in ethyl benzoate 3-methyl-3-pentanol solution. An increase in hydrogen peroxide concentration increases the intensity and shortens the lifetime. The highest light capacity was obtained at the low 0.035 M hydrogen peroxide concentration. The curve shape efficiency increased with increasing hydrogen concentration to a maximum at 0.45 M peroxide.

EXAMPLE LII

The effect of tetrabutylammonium perchlorate (TBAP) alone and together with a base on the PCPO [bis(pentachlorophenyl)oxalate] reaction in ethyl benzoate-o-dichlorobenzene (50–50%) solution is shown in Table LI. The addition of TBAP increases the light capacity, intensity and curve shape efficiency very substantially. The addition of TBAP together with potassium pentachlorophenolate produces a light capacity and lifetime which is lower than those obtained with TBAP alone but is still substantially higher than those of the uncatalyzed reaction. The addition of acetanilide slightly increased the lifetime of the TBAP catalyzed reaction.

EXAMLE LIII

The effect of basic catalysts on the PCPO reaction in ethyl benzoate-o-dichlorobenzene solution is shown in Table LII. Both tetrabutylammonium and potassium phenolate basic salts increased the light capacity and intensity and decreased lifetime substantially. However, the tetrabutylammonium salt produced a significantly higher light capacity than potassium pentachlorophenolate. The addition of acetanilide increased the light capacity substantially and the lifetime slightly.

EXAMPLE LIV

The effect of triphenylphosphine oxide on the uncatalyzed PCPO reaction in ethylbenzoate-o-dichlorobenzene solution is shown in Table LIII. The addition of triphenylphoshine oxide substantially increased the light capacity and decreased the lifetime.

TABLE I

The Effect of Hydrogen Concentration on Uncatalyzed TCPO Chemiluminescence in Ethyl Benzoate-3-Methyl-3-Pentanol[a]

| Hydrogen Peroxide ($10^2$ M) | I max[b] (ft. lbt. cm$^{-1}$) | t ¼[c] (min.) | t ¾[d] (min.) | Q. Y.[e] ($10^2$ ein. mole$^{-1}$) | Lt. Cap. (lm. hr. l$^{-1}$) | $I_c$ (ft. lbt. cm$^{-1}$) | $T_c$ (min.) | $T_i$ (min.) | E (%) | $LC_c$ (lm. hr. l$^{-1}$) | $LC_t$ (lm. hr. l$^{-1}$) |
|---|---|---|---|---|---|---|---|---|---|---|---|
| 3.3 | 3.9 | 157 | 351 | 10.4 | 96 | 1.3 | 126 | 0 | 25 | 24 | 47 |
| 7.5 | 6.0 | 99 | 198 | 8.8 | 81 | 0.7 | 219 | 0.4 | 30 | 24 | 63 |
| 45.0 | 8.2 | 76 | 69 | 8.0 | 74 | 3.6 | 49 | 0.3 | 37 | 27 | 45 |
| 75.0 | 6.9 | 54 | 68 | 5.0 | 46 | 2.2 | 44 | 0.8 | 32 | 15 | 28 |

[a]Reactions of .03 M TCPO and .003 M BPEA in ethyl benzoate-3-methyl-3-pentanol (75-25% vol.) at 25° C.
[b]Maximum intensity.
[c]Light decay time from maximum to ¼ of maximum intensity.
[d]Time required for the emission of 75% of the total light.
[e]Quantum yield based on TCPO.

TABLE LI

THE EFFECT OF TBAP ON PCPO CHEMILUMINESCENCE IN ETHYL BENZOATE-o-DICHLOROBENZENE SOLUTION[a]

| Additive Type | Concentration ($10^2 \times$ M) | I max[b] (Foot Lamberts) | t ¼[c] (min.) | t ¾[d] (min.) | Quantum Yield ($10^2 \times$ Einsteins Mole$^{-1}$) | Light Capacity (Lumen Hours Liter$^{-1}$) |
|---|---|---|---|---|---|---|
| None | — | 0.21 | 216.3 | 484.9 | 2.6[e] | 6.7 |
| $(C_4H_9)_4NClO_4$ | 5.0 | 3.93 | 92.6 | 102.7 | 18.5 | 47.4 |
| { $(C_4H_9)_4NClO_4$  $KOC_6Cl_5$ } | 5.0  0.01 | 55.38 | 2.4 | 3.6 | 7.3 | 18.7 |
| { $(C_4H_9)_4NClO_4$  $CH_3CONHC_6H_5$ } | 5.0  0.5 | 3.32 | 106.7 | 130.9 | 18.2 | 46.7 |

[a]Concentrations were $1 \times 10^{-2}$ M bis(pentachlorophenyl)oxalate (PCPO), $1 \times 10^{-3}$ M 9,10-bis(phenylethynyl)anthracene (BPEA) and $2 \times 10^{-2}$ M $H_2O_2$ in ethylbenzoate-o-dichlorobenzene (50-50% by volume) at 25° C.
[b]Maximum intensity at 1.0 cm. thickness.
[c]Light decay time from maximum to ¼ of maximum intensity.
[d]Time required for the emission of 75% of the total light.
[e]A fraction larger than 15% of the total quantum yield was estimated on the basis of extrapolation.

TABLE LII

THE EFFECT OF BORIC SALT ON PCPO CHEMILUMINESCENCE IN ETHYL BENZOATE-o-DICHLOROBENZENE SOLUTION[a]

| Additive Type | Concentration ($10^2 \times$ M) | I max[b] (Foot Lamberts) | t ¼[c] (min.) | t ¾[d] (min.) | Quantum Yield ($10^2 \times$ Einsteins Mole$^{-1}$) | Light Capacity (Lumen Hours Liter$^{-1}$) |
|---|---|---|---|---|---|---|
| None | — | 0.21 | 216.3 | 484.9 | 2.6[e] | 6.7 |
| $KOC_6Cl_5$ | 0.01 | 63.68 | 2.5 | 2.4 | 7.8 | 20.0 |
| $(C_4H_9)_4NOC_6Cl_3$ | 0.01 | 66.45 | 2.8 | 3.1 | 9.4 | 24.0 |

TABLE LII-continued

THE EFFECT OF BORIC SALT ON PCPO CHEMILUMINESCENCE IN ETHYL BENZOATE-o-DICHLOROBENZENE SOLUTION[a]

| Additive Type | Concentration ($10^2 \times$ M) | I max[b] (Foot Lamberts) | $t\frac{1}{4}$[c] (min.) | $t\frac{3}{4}$[d] (min.) | Quantum Yield ($10^2 \times$ Einsteins Mole$^{-1}$) | Light Capacity (Lumen Hours Liter$^{-1}$) |
|---|---|---|---|---|---|---|
| $CH_3CONHC_6H_5$ | 0.50 | 0.40 | 340.0 | 609.5 | 7.7 | 19.8 |

[a]Concentrations were $1 \times 10^{-2}$ M bis(pentachlorophenyloxalate (PCPO), $1 \times 10^{-3}$ M 9,10-bis(phenylethynyl)anthracene (BPEA) and $2 \times 10^{-2}$ M $H_2O_2$ in ethylbenzoate-o-dichlorobenzene (50-50% by volume) at 25° C.
[b]Maximum intensity at 1.0 cm. thickness.
[c]Light decay time from maximum to ¼ of maximum intensity.
[d]Time required for the emission of 75% of the total light.
[e]A fraction larger than 15% of the total quantum yield was estimated on the basis of extrapolation.

TABLE LIII

THE EFFECTS OF TRIPHENYLPHOSPHINE OXIDE ON PCPO CHEMILUMINESCENCE IN ETHYL BENZOATE-o-DICHLOROBENZENE SOLUTION[a]

| Additive Type | Concentration ($10^2 \times$ M) | I max[b] (Foot Lamberts) | $t\frac{1}{4}$[c] (min.) | $t\frac{3}{4}$[d] (min.) | Quantum Yield ($10^2 \times$ Einsteins Mole$^{-1}$) | Light Capacity (Lumen Hours Liter$^{-1}$) |
|---|---|---|---|---|---|---|
| None | — | 0.21 | 216.3 | 484.9 | 1.6[e] | 6.7 |
| $(C_6H_5)_3PO$ | 5.0 | 1.76 | 191.4 | 291.3 | 19.8[e] | 50.7 |

[a]Concentrations were $1 \times 10^{-2}$ M bis(pentachlorophenyl)oxalate (PCPO), $1 \times 10^{-3}$ M (9,10-bis(phenylethynyl)anthracene (BPEA) and $2 \times 10^{-2}$ M $H_2O_2$ in ethylbenzoate-o-dichlorobenzene (50-50% by volume) at 25° C.
[b]Maximum intensity at 1.0 cm. thickness.
[c]Light decay time from maximum to ¼ of maximum intensity.
[d]Time required for the emission of 75% of the total light.
[e]A fraction larger than 15% of the total quantum yield was estimated on the basis of extrapolation.

EXAMPLE LV

The effects of selected catalyst on the PCPO reaction is compared in Table LIV. The addition of tetrabutylammonium perchlorate produces a substantially higher quantum yield than that of potassium pentachlorophenolate or acetanilide. Triphenylphosphine oxide also produced a high quantum yield.

EXAMPLE LVI

The effect of poorly soluble additives on the uncatalyzed PCPO reaction in ethyl benzoate-o-dichlorobenzene solution is examined by suspending the additive in the solution through vigorous stirring. The results are collected in Table LV. Although both dulcitol and mannose increased the light capacity, dulcitol is substantially more effective. The addition alkali metal salts substantially increased the quantum yield, curve shape efficiency (based on $t\frac{1}{4}:t\frac{3}{4}$ ratio) and decreased the lifetime. These salts are listed in the order of decreasing effectiveness, rubidium chloride, lithium chloride, potassium sulfate, sodium chloride, lithium sulfate. Other metal salts like zinc sulfate and aluminum sulfate quenched the light emission completely. The addition of sodium tetrahydroxysuccinate alone or with dulcitol produced a very fast light emission (short lifetimes) high quantum yield and excellent curve shape efficiency (based on the $t\frac{1}{4}:t\frac{3}{4}$ ratio).

EXAMPLE LVII

The performance characteristics and representative intensity data of the TCPO reaction in the presence of various catalysts in various solvents are collected in Table LVI. Table LVIa shows the chemiluminescence data and LVIb shows the reaction conditions. The data are listed in the order of decreasing characteristic intensity. Experiments which produced a light capacity of less than 20 lumen hours 1$^{-1}$ are eliminated as being obviously inferior.

All PCPO experiments are also excluded because the lower solubility of PCPO in most solvents leads to substantially lower light capacities than those available from the TCPO reaction at similar quantum yields.

The results in Table LVI indicate that the sodium salicylate catalyst in ethyl benzoate-2-octanol or in ethyl benzoate-3-methyl-3-pentanol solution produces a superior short lived (up to 20 minutes) chemiluminescent reaction. (See Expt. 2). The light intensity, light capacity and curve shape efficiency all are the highest in the presence of sodium salicylate catalyst. The addition of Dacta as cocatalyst produces a slight increase of intensity but this effect disappears after a few days storage at room temperature. (See Example XXXVI for details). Good alternate choices to sodium salicylate are catalysts such as sodium tetrahydroxysuccinate with mannose, a heterogeneous catalyst combination (Ext. 5) and tetrabutylammonium salicylate with tetrabutyl ammonium perchlorate (Expt. 6) or alone (Expt. 8).

The results in Table LVI further indicate that the tetrabutylammonium perchlorate catalyzed reaction in ethyl benzoate-3-methyl-3-pentanol solution produces a superior medium length (up to 2 hrs.) chemiluminescent emission (See Expt. 14, 27, 29, 37, 48, 75, 82).

Good alternate choices are tetrabutylammonium salicylate (Expt. 77, 70, 71, 51, 26, 24) and sodium salicylate (Expt. 60, 54, 43, 40, 36, 34, 33) catalysts. Tetrabutylammonium salicylate is an equally satisfactory catalyst in o-dichlorobenzene-3-methyl-3-pentanol solution (Expt. 51, 70, 71).

The results in Table LVI also indicate that for lifetime longer than 2 hrs., the triphenylphosphine oxide, acetanilide catalyzed reaction or the uncatalyzed reaction in ethyl benzoate-3-methyl-3-pentanol solution produce superior light emission (Expt. 96, 98, 99).

TABLE LIV

THE EFFECTS OF SELECTED ADDITIVES ON PCPO CHEMILUMINESCENCE IN ETHYL BENZOATE-o-DICHLOROBENZENE[a]

| Additive Type | Concentration ($10^2 \times$ M) | I max[b] (Foot Lamberts) | $t\frac{1}{4}$[c] (min.) | $t\frac{3}{4}$[d] (min.) | Quantum Yield ($10^2 \times$ Einsteins Mole$^{-1}$) | Light Capacity (Lumen Hours Liter$^{-1}$) |
|---|---|---|---|---|---|---|
| $(C_4H_9)_4NClO_4$ | 5.0 | 3.93 | 92.6 | 102.7 | 18.5 | 47.4 |
| $KOC_6Cl_5$ | 0.01 | 63.68 | 2.5 | 2.4 | 7.8 | 20.0 |
| $CH_3CONHC_6H_5$ | 0.50 | 0.40 | 340.0 | 609.5 | 7.7 | 19.8 |
| $(C_6H_5)_3PO$ | 5.0 | 1.76 | 191.4 | 291.3 | 19.8[e] | 50.7 |

[a] Concentrations were $1 \times 10^{-2}$ M bis(pentachlorophenyl)oxalate (PCPO), $1 \times 10^{-3}$ M 9,10-bis(phenylethynyl)-anthracene (BPEA) and $2 \times 10^{-2}$ M $H_2O_2$ in ethylbenzoate-o-dichlorobenzene (50–50% by volume) at 25° C.
[b] Maximum intensity at 1.0 cm. thickness.
[c] Light decay time from maximum to ¼ of maximum intensity.
[d] Time required for the emission of 75% of the total light.
[e] A fraction larger than 15% of the total quantum yield was estimated on the basis of extrapolation.

TABLE LV

THE EFFECT OF POORLY SOLUBLE ADDITIVES ON PCPO CHEMILUMINESCENCE IN ETHYL BENZOATE-o-DICHLOROBENZENE[a]

| Additive Type | mg./3 ml. of Reaction Mixture | I max[b] (Foot Lamberts) | $t\frac{1}{4}$[c] (min.) | $t\frac{3}{4}$[d] (min.) | Quantum Yield ($10^2 \times$ Einsteins Mole$^{-1}$) | Light Capacity (Lumen Hours Liter$^{-1}$) |
|---|---|---|---|---|---|---|
| None | — | 0.21 | 216.28 | 484.92 | 2.63[e] | 6.7 |
| Dulcitol | 27.3 mgs. | 1.25 | 160.00 | 283.80 | 11.74[e] | 30.1 |
| Mannose | 27.0 mgs. | 0.25 | 231.56 | 594.87 | 3.51[e] | 9.0 |
| RbCl | 18.1 mgs. | 10.09 | 26.38 | 18.30 | 12.45 | 31.9 |
| NaCl | 8.8 mgs. | 1.46 | 116.00 | 220.56 | 10.73[e] | 27.5 |
| LiCl | 6.4 mgs. | 18.01 | 12.41 | 16.08 | 10.91 | 28.0 |
| $K_2SO_4$ | 26.1 mgs. | 1.59 | 134.22 | 196.56 | 11.86 | 30.4 |
| $Li_2SO_4 \cdot H_2O$ | 19.2 mgs. | 0.51 | 306.18 | 306.18 | 8.72 | 22.4 |
| $ZnSO_4 \cdot 7H_2O$ | 43.1 mgs. | | | | No Chemiluminescence | |
| $Al_2(SO_4)_3 \cdot 18H_2O$ | 100.0 mgs. | | | | No Chemiluminescence | |
| $[C(OH)_2COONa]_2$ | 39.3 mgs. | 44.30 | 2.62 | 1.81 | 6.14 | 15.7 |
| $[C(OH)_2COONa]_2$ | 7.9 mgs. | 20.52 | 6.98 | 5.16 | 6.82 | 17.5 |
| $[C(OH)_2COONa]_2$ + Dulcitol | 39.3 mgs. + 27.3 mgs. | 43.33 | 2.70 | 1.85 | 6.16 | 15.8 |
| $[C(OH)_2COONa]_2$ + Dulcitol | 7.9 mgs. + 27.3 mgs. | 18.85 | 7.61 | 5.54 | 6.95 | 17.8 |
| $[C(OH)_2COONa]_2$ + Mannose | 7.9 mgs. + 27.0 mgs. | 19.52 | 7.05 | 4.98 | 7.00 | 18.0 |

[a] Concentrations were $1 \times 10^{-2}$ M bis(pentachlorophenyl)oxalate (PCPO), $1 \times 10^{-3}$ M 9,10-bis(phenylethynyl)anthracene (BPEA), and $2 \times 10^{-2}$ M $H_2O_2$ in ethylbenzoate-o-dichlorobenzene (50–50% by volume) at 25° C.
[b] Maximum intensity at 1.0 cm. thickness.
[c] Light decay time from maximum to ¼ of maximum intensity.
[d] Time required for the emission of 75% of the total light.
[e] A fraction larger than 15% of the total quantum yield was computed on the basis of extrapolation.

TABLE LVIa

INTENSITY LIFETIME PERFORMANCE SUMMARY OF TCPO CHEMILUMINESCENCE

| No. | $I_c$ (ft. lbt. cm$^{-1}$) | $T_c$ (min.) | $T_{ind}$ (min.) | E (%) | $LC_c$ (lm. hr. l$^{-1}$) | $LC_t$ (lm. hr. l$^{-1}$) | 10 | 20 | 30 | 60 | 120 | 240 | 720 |
|---|---|---|---|---|---|---|---|---|---|---|---|---|---|
| 1 | 19.3 | 10 | 0 | 55 | 30 | 41 | 19.3 | — | — | — | — | — | — |
| 2 | 17.5 | 17 | 0 | 57 | 47 | 64 | 22.5 | 13.7 | 1.5 | — | — | — | — |
| 3 | 15.1 | 20 | 0 | 59 | 47 | 62 | 18.2 | 14.9 | 3.9 | — | — | — | — |
| 4 | 13.8 | 15 | 0 | 52 | 32 | 46 | 17.6 | 8.4 | 0.5 | — | — | — | — |
| 5 | 13.3 | 27 | 0 | 63 | 54 | 65 | 15.5 | 15.3 | 11.4 | — | — | — | — |
| 6 | 11.5 | 14 | 0 | 47 | 25 | 40 | 14.6 | 6.2 | — | — | — | — | — |
| 7 | 11.2 | 19 | 0 | 48 | 31 | 47 | 15.4 | 10.4 | 4.1 | — | — | — | — |
| 8 | 11.0 | 15 | 0 | 46 | 26 | 41 | 14.4 | 7.3 | 1.8 | — | — | — | — |
| 9 | 10.9 | 21 | 0 | 50 | 36 | 57 | 15.8 | 11.4 | | — | — | — | — |
| 10 | 10.7 | 13 | 0 | 45 | 22 | 36 | 13.2 | 5.7 | 1.4 | — | — | — | — |
| 11 | 10.2 | 17 | 0 | 56 | 28 | 37 | 12.5 | 8.4 | 1.7 | — | — | — | — |
| 12 | 9.9 | 26 | 0 | 47 | 39 | 63 | 15.0 | 12.0 | 8.2 | .2 | — | — | — |
| 13 | 9.7 | 18 | 0 | 48 | 28 | 44 | 13.0 | 8.8 | 3.1 | — | — | — | — |
| 14 | 9.6 | 46 | 0 | 56 | 70 | 93 | 15.0 | 12.8 | 12.1 | 6.3 | — | — | — |
| 15 | 9.5 | 12 | 0 | 32 | 17 | 40 | 11.3 | 4.7 | 1.6 | — | — | — | — |
| 16 | 9.1 | 8.9 | 0 | 30 | 12 | 25 | 8.1 | 3.2 | 1.5 | — | — | — | — |
| 17 | 9.0 | 16 | 0 | 35 | 22 | 38 | 13.1 | 6.8 | 3.9 | .8 | — | — | — |
| 18 | 8.9 | 27 | 0 | 48 | 37 | 57 | 13.6 | 11.0 | 7.8 | — | — | — | — |
| 19 | 8.6 | 9.6 | 0 | 31 | 12 | 25 | 8.2 | 3.1 | 1.7 | — | — | — | — |
| 20 | 8.5 | 23 | 0 | 48 | 30 | 50 | 12.5 | 9.5 | 5.2 | — | — | — | — |
| 21 | 8.3 | 18 | 0 | 51 | 22 | 34 | 10.8 | 7.0 | 1.6 | — | — | — | — |

Characteristic Performance Values; Intensities (ft. lbt. cm$^{-1}$) at Selected Time (minutes)

TABLE LVIa-continued
INTENSITY LIFETIME PERFORMANCE SUMMARY OF TCPO CHEMILUMINESCENCE

| No. | $I_c$ (ft. lbt. cm$^{-1}$) | $T_c$ (min.) | $T_{ind}$ (min.) | E (%) | $LC_c$ (lm. hr. l$^{-1}$) | $LC_t$ (lm. hr. l$^{-1}$) | 10 | 20 | 30 | 60 | 120 | 240 | 360 |
|---|---|---|---|---|---|---|---|---|---|---|---|---|---|
| 22 | 8.3 | 22 | 0 | 37 | 28 | 54 | 14.3 | 8.9 | 5.8 | — | — | — | — |
| 23 | 8.2 | 28 | 0 | 46 | 35 | 57 | 13.1 | 10.5 | 7.6 | 1.0 | — | — | — |
| 24 | 8.1 | 27 | 0 | 50 | 35 | 56 | 12.3 | 9.9 | 7.2 | — | — | — | — |
| 25 | 7.7 | 19 | 0 | 43 | 23 | 39 | 10.9 | 7.4 | 2.9 | — | — | — | — |
| 26 | 7.5 | 35 | 0 | 52 | 40 | 60 | 11.3 | 9.7 | 8.5 | — | — | — | — |
| 27 | 7.5 | 50 | 3.76 | 57 | 58 | 76 | 10.7 | 10.3 | 9.6 | 5.8 | — | — | — |
| 28 | 7.4 | 20 | 0 | 45 | 23 | 39 | 10.7 | 7.4 | 3.2 | — | — | — | — |
| 29 | 7.4 | 48 | 1.32 | 49 | 56 | 82 | 13.2 | 11.3 | 9.9 | 5.5 | — | — | — |
| 30 | 7.2 | 19 | 0 | 44 | 22 | 35 | 10.6 | 6.9 | 3.5 | — | — | — | — |
| 31 | 7.1 | 33 | 0 | 54 | 35 | 45 | 8.9 | 8.7 | 7.8 | 1.6 | — | — | — |
| 32 | 7.1 | 38 | 0 | 50 | 42 | 71 | 12.7 | 9.8 | 8.3 | — | — | — | — |
| 33 | 6.8 | 22 | 0 | 34 | 23 | 47 | 12.0 | 7.4 | 4.7 | 1.3 | — | — | — |
| 34 | 6.7 | 33 | 0 | 54 | 35 | 53 | 9.6 | 8.2 | 7.4 | — | — | — | — |
| 35 | 6.3 | 36 | 0 | 47 | 34 | 55 | 10.1 | 8.4 | 7.2 | 1.4 | — | — | — |
| 36 | 6.2 | 50 | 0 | 64 | 49 | 68 | 9.2 | 7.6 | 7.1 | 2.6 | — | — | — |
| 37 | 6.2 | 73 | 4.32 | 61 | 71 | 86 | 8.7 | 8.4 | 7.4 | 7.6 | 1.3 | — | — |
| 38 | 6.1 | 12 | 0 | 30 | 11 | 24 | 7.4 | 3.3 | 1.4 | — | — | — | — |
| 39 | 5.9 | 34 | 0 | 41 | 31 | 56 | 10.9 | 8.1 | 6.6 | 1.5 | — | — | — |
| 40 | 5.9 | 49 | 0 | 63 | 45 | 64 | 8.9 | 7.5 | 6.9 | 2.2 | — | — | — |
| 41 | 5.8 | 46 | 0 | 59 | 42 | 62 | 9.2 | 7.4 | 6.8 | 1.2 | — | — | — |
| 42 | 5.6 | 51 | 0 | 56 | 43 | 66 | 8.7 | 7.3 | 6.9 | 3.5 | — | — | — |
| 43 | 5.5 | 43 | 0 | 54 | 37 | 57 | 9.3 | 7.5 | 6.7 | 1.7 | — | — | — |
| 44 | 5.5 | 52 | 0 | 48 | 44 | 78 | 11.7 | 8.7 | 7.4 | 4.3 | — | — | — |
| 45 | 5.4 | 22 | 0 | 24 | 16 | 37 | 10.5 | 5.9 | 3.8 | 1.4 | .8 | — | — |
| 46 | 5.4 | 33 | 0 | 42 | 25 | 42 | 8.7 | 7.0 | 5.8 | 1.6 | — | — | — |
| 47 | 5.3 | 40 | 2.05 | 33 | 30 | 52 | 11.7 | 9.0 | 6.8 | 3.2 | .7 | .4 | — |
| 48 | 5.3 | 79 | 4.72 | 59 | 65 | 81 | 7.7 | 7.6 | 6.6 | 6.8 | 1.8 | — | — |
| 49 | 5.0 | 49 | 0 | 36 | 36 | 56 | 8.8 | 8.0 | 7.0 | 4.0 | 1.3 | — | — |
| 50 | 4.8 | 73 | 0 | 70 | 56 | 77 | 7.8 | 6.2 | 5.7 | 5.7 | — | — | — |
| 51 | 4.7 | 19 | 0 | 37 | 14 | 29 | 7.2 | 4.4 | 2.0 | — | — | — | — |
| 52 | 4.7 | 35 | 0 | 45 | 25 | 40 | 8.0 | 6.5 | 5.3 | 1.7 | — | — | — |
| 53 | 4.9 | 28 | 0 | 23 | 18 | 44 | 11.5 | 6.8 | 4.7 | 1.8 | — | — | — |
| 54 | 4.6 | 62 | 0 | 64 | 46 | 65 | 7.3 | 5.9 | 5.6 | 4.5 | — | — | — |
| 55 | 4.3 | 39 | 0 | 44 | 26 | 42 | 8.1 | 6.8 | 5.4 | 2.3 | .2 | — | — |
| 56 | 4.2 | 47 | 0 | 38 | 27 | 49 | 9.4 | 6.4 | 5.4 | 2.8 | — | — | — |
| 57 | 4.0 | 57 | 0 | 47 | 36 | 64 | 8.3 | 6.3 | 5.4 | 3.8 | — | — | — |
| 58 | 4.0 | 67 | 0 | 45 | 40 | 61 | 6.8 | 5.7 | 5.3 | 4.4 | 1.2 | — | — |
| 59 | 3.9 | 55 | 0 | 41 | 34 | 67 | 9.3 | 6.6 | 5.5 | 3.5 | — | — | — |
| 60 | 3.9 | 56 | 0 | 45 | 34 | 61 | 9.4 | 7.1 | 5.8 | 3.6 | — | — | — |
| 61 | 3.9 | 57 | 0 | 35 | 33 | 61 | 9.3 | 7.7 | 6.4 | 3.7 | 1.2 | — | — |
| 62 | 3.9 | 65 | 0 | 37 | 36 | 60 | 7.6 | 6.6 | 6.0 | 4.2 | 1.5 | — | — |
| 63 | 3.6 | 40 | 0 | 36 | 22 | 43 | 8.1 | 5.9 | 4.6 | 1.9 | .5 | — | — |
| 64 | N.C. | N.C. | 0 | N.C. | N.C. | N.C. | 8.1 | 5.4 | 4.2 | 2.3 | — | — | — |
| 65 | 3.6 | 41 | 0 | 33 | 22 | 37 | 7.2 | 5.7 | 4.6 | 2.2 | .7 | — | — |
| 66 | 3.6 | 49 | 0.32 | 37 | 27 | 45 | 7.6 | 6.5 | 5.4 | 2.8 | .9 | — | — |
| 67 | 3.6 | 59 | 0 | 34 | 32 | 60 | 8.9 | 6.7 | 5.6 | 3.6 | 1.2 | — | — |
| 68 | 3.6 | 76 | 0 | 39 | 41 | 80 | 9.4 | 7.0 | 6.0 | 4.3 | 1.4 | — | — |
| 69 | 3.6 | 88 | 0 | 46 | 47 | 66 | 5.6 | 4.8 | 4.8 | 4.6 | 2.2 | (.4) | — |
| 70 | 3.4 | 44 | 0 | 34 | 24 | 53 | 8.9 | 6.0 | 4.6 | 2.2 | — | — | — |
| 71 | 3.3 | 43 | 0 | 33 | 22 | 50 | 8.5 | 5.7 | 4.3 | 2.0 | — | — | — |
| 72 | N.C. | N.C. | N.C. | N.C. | N.C. | N.C. | 3.3 | 3.5 | 3.8 | 3.1 | 2.0 | 0.6 | — |
| 73 | N.C. | N.C. | N.C. | N.C. | N.C. | N.C. | 3.1 | 3.4 | 3.4 | 4.0 | 4.6 | — | — |
| 74 | 3.1 | 78 | 0 | 44 | 37 | 57 | 6.7 | 5.4 | 5.1 | 3.9 | 1.6 | (.2) | — |
| 75 | 2.9 | 78 | 0 | 31 | 35 | 78 | 12.3 | 8.4 | 6.3 | 3.8 | 1.8 | (.3) | — |
| 76 | 2.9 | 83 | 0 | 42 | 37 | 63 | 6.0 | 6.4 | 5.6 | 3.8 | 1.8 | — | — |
| 77 | 2.8 | 96 | 0 | 29 | 39 | 90 | 11.5 | 8.1 | 6.5 | 4.1 | 2.2 | — | — |
| 78 | 2.7 | 71 | 0 | 34 | 29 | 62 | 8.8 | 6.5 | 5.1 | 3.1 | 1.3 | — | — |

| | Characteristic Performance Values | | | | | | Intensities (ft. lbt. cm$^{-1}$) at Selected Time (minutes) | | | | | | |
|---|---|---|---|---|---|---|---|---|---|---|---|---|---|
| No. | $I_c$ (ft. lbt. cm$^{-1}$) | $T_c$ (min.) | $T_{ind}$ (min.) | E (%) | $LC_c$ (lm. hr. l$^{-1}$) | $LC_t$ (lm. hr. l$^{-1}$) | 10 | 20 | 30 | 60 | 120 | 240 | 360 |
| 79 | 2.7 | 74 | 0 | 43 | 31 | 50 | 5.6 | 4.4 | 4.0 | 3.2 | 1.1 | — | — |
| 80 | 2.7 | 112 | 0.35 | 49 | 48 | 92 | 12.5 | 10.0 | 6.7 | 3.4 | 2.0 | — | — |
| 81 | 2.6 | 38 | 0 | 22 | 12 | 32 | 7.3 | 4.2 | 3.1 | 1.4 | — | — | — |
| 82 | 2.5 | 123 | 0 | 41 | 48 | 98 | 10.9 | 8.0 | 6.4 | 4.2 | 2.5 | — | — |
| 83 | 2.4 | 61 | 0 | 26 | 21 | 41 | 7.3 | 5.2 | 4.1 | 2.4 | 1.1 | .4 | — |
| 84 | 2.4 | 63 | 0 | 28 | 23 | 49 | 8.3 | 5.8 | 4.6 | 2.6 | 1.1 | .4 | — |
| 85 | 2.4 | 126 | 0 | 39 | 47 | 105 | 12.4 | 8.4 | 6.6 | 4.1 | 2.5 | — | — |
| 86 | 2.2 | 51 | 0 | 30 | 14 | 32 | 5.6 | 3.5 | 2.9 | 1.7 | .8 | — | — |
| 87 | 2.1 | 84 | 0 | 32 | 23 | 45 | 5.9 | 4.2 | 3.6 | 2.6 | 1.4 | — | — |
| 88 | 2.0 | 121 | 0.01 | 39 | 38 | 89 | 13.5 | 8.9 | 6.1 | 3.1 | 2.0 | — | — |
| 89 | 1.9 | 72 | 0 | 28 | 20 | 38 | 5.7 | 4.4 | 3.6 | 2.3 | 1.1 | .4 | .2 |
| 90 | 1.9 | 90 | 0 | 27 | 25 | 48 | 6.3 | 5.1 | 4.2 | 2.6 | 1.3 | .6 | (.3) |
| 91 | 1.9 | 92 | 0 | 46 | 28 | 54 | 5.3 | 3.5 | 2.9 | 2.4 | — | — | — |
| 92 | 1.7 | 116 | 7.03 | 37 | 31 | 49 | 2.1 | 3.3 | 3.7 | 3.0 | 1.8 | .7 | .3 |
| 93 | 1.6 | 101 | 1.02 | 27 | 24 | 47 | 4.8 | 5.4 | 4.6 | 2.5 | 1.3 | .6 | (.3) |
| 94 | 1.5 | 101 | 0 | 41 | 18 | 42 | 7.4 | 4.8 | 3.3 | (1.8) | — | — | — |
| 95 | 1.3 | 126 | 0 | 25 | 24 | 46 | 3.7 | 3.9 | 3.5 | 2.3 | 1.3 | .6 | — |
| 96 | 1.2 | 153 | 0 | 27 | 27 | 70 | 7.6 | 5.8 | 4.6 | 2.7 | 1.5 | .6 | — |
| 97 | 1.1 | 76 | 0.04 | 32 | 13 | 21 | 2.4 | 2.3 | 2.0 | 1.4 | 7 | .2 | .1 |

TABLE LVIa-continued

INTENSITY LIFETIME PERFORMANCE SUMMARY OF TCPO CHEMILUMINESCENCE

| 98 | 0.9 | 162 | 0 | 26 | 22 | 55 | 5.1 | 4.7 | 3.9 | 2.3 | 1.2 | .6 | .4 |
| 99 | 0.7 | 219 | 0.4 | 30 | 24 | 63 | 5.5 | 4.2 | 3.4 | 2.2 | 1.3 | .6 | — |

TABLE LVIb

INTENSITY LIFETIME PERFORMANCE SUMMARY OF TCPO CHEMILUMINESCENCE

| No. | Q.Y. ($10^2$ ein. mole$^{-1}$) | L.C.(lm. hr. l$^{-1}$) | Catalyst[bc] ($10^2$ M) | Solvents[d] (% by volume) | [TCPO] (M × $10^2$) | [$H_2O_2$] (M × $10^2$) | [BPEA] (M × $10^3$) |
|---|---|---|---|---|---|---|---|
| 1 | 5.86 | 94 | 0.15 NA SAL, estd. BACTA | EB(90)-3-M-3-P(10) | 3.0 | 7.5 | 3.0 |
| 2 | 8.86 | 82 | 0.125 NA SAL | EB(92)-2-Oct(8) | 3.0 | 7.5 | 3.0 |
| 3 | 8.52 | 79 | 0.125 NA SAL | EB(92)-2-Oct (8) | 3.0 | 7.5 | 3.0 |
| 4 | 6.58 | 61 | 0.150 NA SAL | EB(90)-3-M-3-P(10) | 3.0 | 7.5 | 2.8 |
| 5 | 9.25 | 86 | 39.3 mgs. NA THS 10.8 mgs. Mannose | EB(92)-2-Oct(8) | 3.0 | 7.5 | 3.0 |
| 6 | 5.70 | 53 | .075 TBAS, 5.0 TBAP | EB(75)-3-M-3-P(25) | 3.0 | 7.5 | 3.0 |
| 7 | 7.10 | 66 | 0.150 NA SAL | EB(90)-t-BuOH(10) | 3.0 | 7.5 | 2.8 |
| 8 | 6.01 | 96 | 0.100 TBAS | EB(75)-3-M-3-P(25) | 3.0 | 7.5 | 3.0 |
| 9 | 7.71 | 72 | 0.10 TEAB | EB(75)-3-M-3-P(25) | 3.0 | 7.5 | 3.0 |
| 10 | 5.33 | 49 | .125 NA SAL, 5.0 TBAP | EB(75)-3-M-3-P(25) | 3.0 | 7.5 | 3.0 |
| 11 | 5.35 | 50 | 0.100 TBAS | EB(75)-3-M-3-P(25) | 3.0 | 7.5 | 3.0 |
| 12 | 9.04 | 84 | 0.05 TBAS | EB(75)-3-M-3-P(25) | 3.0 | 7.5 | 3.0 |
| 13 | 6.26 | 58 | .125 NA SAL, 1.0 TBAP | EB(75)-3-M-3-P(25) | 3.0 | 7.5 | 3.0 |
| 14 | 11.24 | 125 | 5.0 TBAP | EB(90)-3-M-3-P(10) | 3.6 | 7.5 | 3.0 |
| 15 | 6.01 | 54 | 0.30 NA SAL, 3.0 SA | EB(80)-3-M-3-P(20) | 3.0 | 7.5 | 2.0 |
| 16 | 4.46 | 40 | .183 BTMAH, .40 TCBA | EB(90)-t-BuOH(10) | 3.0 | 15.0 | 2.0 |
| 17 | 6.87 | 62 | .25 BTMAH, .283 $H_3PO_4$ | EB(90)-t-BuOH(10) | 3.0 | 15.0 | 2.0 |
| 18 | 8.75 | 76 | 0.05 TBAS | EB(80)-3-M-3-P(20) | 2.8 | 7.0 | 2.8 |
| 19 | 4.34 | 39 | .183 BTMAH | EB(90)-t-BuOH(10) | 3.0 | 15.0 | 2.0 |
| 20 | 6.82 | 63 | 0.075 TBAS, 5.0 $\phi_3$PO | EB(75)-3-M-3-P(25) | 3.0 | 7.5 | 3.0 |
| 21 | 4.85 | 44 | 0.30 NA SAL | EB(80)-3-M-3-P(20) | 3.0 | 7.5 | 2.0 |
| 22 | 8.16 | 76 | 0.125 NA SAL | EB(75)-3-M-3-P(25) | 3.0 | 24.0 | 3.0 |
| 23 | 8.88 | 77 | 0.05 TBAS | EB(70)-3-M-3-P(30) | 2.8 | 7.0 | 2.8 |
| 24 | 7.25 | 69 | 0.075 TBAS | EB(75)-3-M-3-P(25) | 3.0 | 7.5 | 3.0 |
| 25 | 5.62 | 52 | 0.30 NA SAL | EB(90)-t-BuOH(10) | 3.0 | 7.5 | 3.0 |
| 26 | 8.83 | 76 | 0.05 TBAS | EB(88)-3-M-3-P(12) | 2.8 | 7.0 | 2.8 |
| 27 | 11.13 | 103 | 10.0 TBAP | EB(75)-3-M-3-P(25) | 3.0 | 7.5 | 3.0 |
| 28 | 5.50 | 51 | 0.40 NA SAL | EB(90)-t-BuOH(3)-1,2-Prdiol(7) | 3.0 | 10.0 | 3.0 |
| 29 | 12.11 | 112 | 5.0 TBAP | EB(75)-3-M-3-P(25) | 3.0 | 7.5 | 3.0 |
| 30 | 5.31 | 49 | 0.10 TBAS, 1.0 SA | EB(75)-3-M-3-P(25) | 3.0 | 7.5 | 3.0 |
| 31 | 6.99 | 65 | 0.125 NA SAL | EB(75)-3-M-3-P(25) | 3.0 | 3.3 | 3.0 |
| 32 | 9.00 | 84 | 0.075 TEAB | EB(75)-3-M-3-P(25) | 3.0 | 7.5 | 3.0 |
| 33 | 7.32 | 68 | 0.125 NA SAL | EB(75)-3-M-3-P(25) | 3.0 | 45.0 | 3.0 |
| 34 | 6.89 | 64 | 0.125 NA SAL | EB(75)-3-M-3-P(25) | 3.0 | 7.5 | 3.0 |
| 35 | 7.75 | 72 | 0.15 NA SAL, 14.0 $H_2O$ | EB(90)-t-BuOH(10) | 3.0 | 7.5 | 3.0 |
| 36 | 8.30 | 77 | 0.125 NA SAL | EB(75)-3-M-3-P(25) | 3.0 | 7.5 | 3.0 |
| 37 | 12.51 | 116 | 5.0 TBAP, 0.5 ACAH | EB(75)-3-M-3-P(25) | 3.0 | 7.5 | 3.0 |
| 38 | 4.05 | 37 | .183 BTMAH, .20 TCBA | EB(90)-t-BuOH(10) | 3.0 | 15.0 | 2.0 |
| 39 | 7.94 | 74 | 0.15 BTMATCB | EB(90)-t-BuOH(10) | 3.0 | 7.5 | 3.0 |
| 40 | 7.78 | 72 | 0.125 NA SAL | EB(75)-3-H-3-P(25) | 3.0 | 7.5 | 3.0 |
| 41 | 7.66 | 71 | 0.125 Rb SAL, 5.0 $\phi_3$PO | EB(75)-3-M-3-P(25) | 3.0 | 7.5 | 3.0 |
| 42 | 8.42 | 78 | 0.125 NA SAL, 0.1 SA | EB(75)-3-M-3-P(25) | 3.0 | 7.5 | 3.0 |
| 43 | 7.59 | 69 | 0.10 NA SAL | EB(80)-3-M-3-P(20) | 3.0 | 7.5 | 2.0 |
| 44 | 9.97 | 93 | 0.05 TEAB | EB(75)-3-M-3-P(25) | 3.0 | 7.5 | 3.0 |
| 45 | 7.25 | 65 | .073 BTMAH, .40 TCBA | EB(90)-t-BuOH(10) | 3.0 | 15.0 | 2.0 |
| 46 | 6.44 | 60 | 0.15 NA SAL, 28.0 $H_2O$ | EB(90)-t-BuOH(10) | 3.0 | 7.5 | 3.0 |
| 47 | 10.06 | 91 | .167 BTMAH, .283 $H_3PO_4$ | EB(90)-t-BuOH(10) | 3.0 | 15.0 | 2.0 |
| 48 | 11.82 | 110 | 5.0 TBAP, 1.0 ACAN | EB(75)-3-M-3-P(25) | 3.0 | 7.5 | 3.0 |
| 49 | 10.67 | 99 | 5.0 TBAP, .08 SA, .005 TBAH | EB(92)-2-Oct(8) | 3.0 | 7.5 | 3.0 |
| 50 | 8.70 | 81 | 0.125 NA SAL | EB(75)-3-M-3-P(25) | 3.0 | 7.5 | 3.0 |
| 51 | 4.00 | 37 | 0.25 TBAS | 0-DCB(75)-3-M-3-P(25) | 3.0 | 7.5 | 3.0 |
| 52 | 6.03 | 56 | .10 TBAS, 2.50 SA | EB(75)-3-M-3-P(25) | 3.0 | 7.5 | 3.0 |

TABLE LVIb-continued
INTENSITY LIFETIME PERFORMANCE SUMMARY OF TCPO CHEMILUMINESCENCE

| No. | Q. Y. ($10^2$ ein. $mole^{-1}$) | L.C. (lm. hr. $l^{-1}$) | Catalyst[b,c] ($10^2$ M) | Solvents[d] (% by volume) | [TCPO] (M × $10^2$) | [H$_2$O$_2$] (M × $10^2$) | [BPEA] (M × $10^3$) |
|---|---|---|---|---|---|---|---|
| 53 | 8.69 | 78 | .073 BTMAH | EB(90)-t-BuOH(10) | 3.0 | 15.0 | 2.0 |
| 54 | 7.68 | 71 | 0.125 NA SAL | EB(75)-3-M-3-P(25) | 3.0 | 7.5 | 3.0 |
| 55 | 6.55 | 61 | .10 TBAS, 5.00 SA | EB(75)-3-M-3-P(25) | 3.0 | 7.5 | 3.0 |
| 56 | 7.66 | 71 | 0.15 BTMATCP | EB(90)-t-BuOH(10) | 3.0 | 7.5 | 3.0 |
| 57 | 8.37 | 78 | 0.125 NA SAL, 0.50 SA | EB(75)-3-M-3-P(25) | 3.0 | 7.5 | 3.0 |
| 58 | 9.61 | 89 | 5.0 TBAP, .08 SA, .01 TBAH, 19.3 mgs. Me$_4$NBF$_4$ | EB(92)-2-Oct(8) | 3.0 | 7.5 | 3.0 |
| 59 | 8.83 | 82 | 0.125 NA SAL, 1.00 SA | EB(75)-3-M-3-P(25) | 3.0 | 7.5 | 3.0 |
| 60 | 8.35 | 75 | .050 NA SAL | EB(80)-3-M-3-P(20) | 3.0 | 7.5 | 2.0 |
| 61 | 10.16 | 94 | 9.0 TBAP, .08 SA, .01 TBAH | EB(92)-2-Oct(8) | 3.0 | 7.5 | 3.0 |
| 62 | 10.68 | 99 | 9.0 TBAP, .08 SA, .01 TBAH | EB(92)-2-Oct(8) | 3.0 | 7.5 | 3.0 |
| 63 | 6.64 | 60 | .17 TBAH, .30 TA | EB(90)-t-BuOH(10) | 3.0 | 15.0 | 2.0 |
| 64 | 7.76 | 70 | 0.17 TBAH, 1.50 TA | EB(90)-t-BuOH(10) | 3.0 | 15.0 | 2.0 |
| 65 | 7.11 | 66 | 9.0 TBAP, .08 SA, .01 TBAH | EB(92)-2-Oct(8) | 3.0 | 3.7 | 3.0 |
| 66 | 7.98 | 74 | — | EB(75)-3-M-3-P(25) | 3.0 | 45.0 | 3.0 |
| 67 | 10.11 | 94 | 5.0 TBAP, .08 SA, .01 TBAH, 26.3 mgs. Me$_4$NPF$_6$ | EB(92)-2-Oct(8), | 3.0 | 7.5 | 3.0 |
| 68 | 11.54 | 107 | 1.0 TBAP, .08 SA, .01 TBAH | EB(92)-2-Oct(8) | 3.0 | 7.5 | 3.0 |
| 69 | 10.91 | 101 | 9.0 TBAP, .08 SA, .01 TBAH | EB(92)-2-Oct(8) | 3.0 | 10.0 | 3.0 |
| 70 | 7.63 | 69 | 0.10 TBAS | o-DCB(75)-3-M-3-P(25) | 3.0 | 7.5 | 3.0 |
| 71 | 7.30 | 66 | 0.10 TBAS | o-DCB(75)-3-M-3-P(25) | 3.0 | 7.5 | 3.0 |
| 72 | 11.67 | 108 | .2.0 mgs. KOOCH | EB(92)-2-Oct(8) | 3.0 | 7.5 | 3.0 |
| 73 | 10.64 | 99 | 17.3 mgs. KOOCH | EB(92)-2-Oct(8) | 3.0 | 7.5 | 3.0 |
| 74 | 9.06 | 84 | 9.0 TBAP, .08 SA, .01 TBAH, 19.3 mgs. Me$_4$NBF$_4$ | EB(92)-2-Oct(8) | 3.0 | 7.5 | 3.0 |
| 75 | 12.00 | 111 | 0.3 TBAP | EB(75)-3-M-3-P(25) | 3.0 | 7.5 | 3.0 |
| 76 | 9.47 | 88 | 0.125 NA SAL, 5.0 SA | EB(75)-3-M-3-P(25) | 3.0 | 7.5 | 3.0 |
| 77 | 14.40 | 134 | 0.01 TBAS | EB(75)-3-M-3-P(25) | 3.0 | 7.5 | 3.0 |
| 78 | 9.63 | 87 | 0.05 NA SAL,0.50 SA | EB(80)-3-M-3-P(20) | 3.0 | 7.5 | 2.0 |
| 79 | 7.65 | 71 | 8.0 TBAP, .08 SA, .02 TBAH | EB(92)-2-Oct(8) | 3.0 | 7.5 | 3.0 |
| 80 | 10.50 | 97 | 25.3 mgs. CsCl | EB(75)-3-M-3-P(25) | 3.0 | 7.5 | 3.0 |
| 81 | 5.85 | 54 | 0.028 TBAH, 0.4 SA | EB(92)-2-Oct(8) | 3.0 | 7.5 | 3.0 |
| 82 | 12.53 | 116 | 0.80 TBAP | EB(75)-3-M-3-P(25) | 3.0 | 7.5 | 3.0 |
| 83 | 8.93 | 83 | — | EB(90)-3-M-3-P(10) | 3.0 | 7.5 | 3.0 |
| 84 | 7.53 | 84 | — | EB(90)-3-M-3-P(10) | 3.0 | 7.5 | 3.0 |
| 85 | 13.19 | 122 | 1.0 TBAP | EB(75)-3-M-3-P(10) | 3.0 | 7.5 | 3.0 |
| 86 | 5.16 | 48 | 0.45 K TCBA | EB(90)-t-BuOH(10) | 3.0 | 7.5 | 3.0 |
| 87 | 7.52 | 70 | 0.30 K TCBA | EB(90)-t-BuOH(10) | 3.0 | 7.5 | 3.0 |
| 88 | 10.54 | 98 | 18.1 mgs. RbCl | EB(75)-3-M-3-P(25) | 3.0 | 7.5 | 3.0 |
| 89 | 7.97 | 74 | Satd. DACTA | EB(90)-3-M-3-P(25) | 3.0 | 7.5 | 3.0 |
| 90 | 9.72 | 90 | 0.10 ACAN | EB(75)-3-M-3-P(25) | 3.0 | 7.5 | 3.0 |
| 91 | 7.03 | 61 | 0.51 Rb SAL | EB(70)-3-M-3-P(30) | 2.8 | 7.0 | 2.8 |
| 92 | 9.06 | 84 | 0.50 ACAN | EB(75)-3-M-3-P(25) | 3.0 | 7.5 | 3.0 |
| 93 | 9.45 | 88 | 0.10 SA | EB(75)-3-M-3-P(25) | 3.0 | 7.5 | 3.0 |
| 94 | 4.85 | 45 | 0.81 SA, .055 TBAH | EB(92)-2-Oct(8) | 3.0 | 7.5 | 3.0 |
| 95 | 10.35 | 96 | — | EB(75)-3-M-3-P(25) | 3.0 | 3.3 | 3.0 |
| 96 | 10.86 | 101 | 5.0 φ$_3$PO | EB(75)-3-M-3-P(25) | 3.0 | 7.5 | 3.0 |
| 97 | 13.04 | 40 | — | EB(90)-3-M-3-P(10) | 1.0 | 7.5 | 3.0 |
| 98 | 9.16 | 85 | 1.0 ACAN | EB(75)-3-M-3-P(25) | 3.0 | 7.5 | 3.0 |
| 99 | 8.8 | 81 | — | EB(75)-3-M-3-P(25) | 3.0 | 7.5 | 3.0 |

[b]NA SAL: Sodium salicylate. DACTA: 1,2-Diaminocyclohexanetetraacetic acid. TBAS: Tetrabutylammonium salicylate. TBAP: Tetrabutylammonium perchlorate. SA: Salicylic acid.BTMAH: Benzyltrimethylammonium hydroxide. NA THS: Sodium tetrahydroxysuccinate. TEAB: Tetraethylammonium benzoate. φ$_3$PO: Triphenylphosphine oxide. TCBA: 2,3,6-Trichlorobenzoic acid. TBAH: Tetrabutylammonium hydroxide. TA: Tartaric acid. Rb: Rubidium. K: Potassium. ACAN: Acetanilide. BTMATCP: Benzyltrimethylammonium 2,3,6-trichlorobenzoate.

[c]EB: Ethyl benzoate. 3-M-3-P: 3-Methyl-3-pentanol. 2-Oct.: 2-Octanol. t-BuOH: t-Butyl alcohol. o-DCB: o-Dichlorobenzene.

EXAMPLE LVIII

The exceptionally high performance TCPO chemiluminescent systems are listed and compared in Table LVII. The experiment number given refers to Table LVI.

EXAMLE LVIX

An oxalate component was prepared by dissolving 0.004 moles of TCPO and 0.0004 moles of BPEA in 75 ml. of ethyl benzoate. A peroxide component was prepared by dissolving 0.03 moles of hydrogen peroxide in 25 ml. of dimethyl phthalate. These two components were admixed with a catalyst component comprising 0.00001 moles of tetrabutylammonium salicylate. Light was obtained which provided an intensity greater than 4 foot lamberts cm$^{-1}$, during 30 minutes.

EXAMPLE LX

The experiment of Example LVIX was repeated except that the catalyst component comprised a solution of 0.00001 moles of tetrabutylammonium salicylate in dimethyl phthalate. Again light in excess of 4 foot lamberts cm$^{-1}$ was generated during 30 minutes.

0.01 M hydrogen peroxide in a tertiary alcohol solvent and a catalyst in the concentration range from $10^{-4}$ to $10^{-2}$ M selected from the group consisting of sodium salicylate and tetrabutylammonium salicylate.

2. The composition defined by claim 1 wherein said tertiary alcohol is 3-methyl-3-pentanol.

3. The composition defined by claim 1 wherein said tertiary alcohol is 3,6-dimethyloctanol-3.

4. The composition defined by claim 1 wherein said tertiary alcohol is tert-butyl alcohol.

5. The composition defined by claim 1 wherein said catalyst is sodium salicylate.

TABLE LVII

| Exp.[b] No. | Catalyst | $I_c$[c] | $T_c$[d] | $L_c$[e] | L[f] | Q[g] | $I_{max}$[h] | Time[i] | Intensity[j] vs. Time | | | | | |
|---|---|---|---|---|---|---|---|---|---|---|---|---|---|---|
| | | | | | | | | | 5 | 10 | 20 | 30 | 60 | 120 |
| 4 | Sodium Salicylate[k] (0.00150 M) | 14 | 15 | 52 | 61 | 6.6 | 78 | | 18 | 18 | 8 | 0.3 | low | |
| 9 | Tetraethylammonium Benzoate(0.001 M) | 11 | 21 | 36 | 72 | 7.7 | 46 | | 19 | 16 | 11 | 4.8 | low | |
| 12 | Tetrabutylammonium Salicylate(0.0005 M) | 9.9 | 26 | 39 | 84 | 9.0 | 49 | | 18 | 15 | 12 | 8.2 | 0.2 | low |
| 14 | Tetrabutylammonium[k,r] Perchlorate(0.05 M) | 9.6 | 46 | 70 | 125 | 11.2 | 17 | | 16 | 15 | 13 | 12 | 6 | low |
| 39 | Benzyltrimethylammonium 2,3,6-Trichlorobenzoate (0.0015 M[q]) | 5.9 | 34 | 31 | 74 | 8.0 | 38 | | 15 | 11 | 8.1 | 6.6 | 1.5 | |
| 40 | Sodium Salicylate | 5.9 | 49 | 45 | 72 | 7.8 | 44 | | 11 | 9.0 | 7.5 | 6.9 | 2.2 | low |
| 54 | (0.00125 M) | 4.6 | 62 | 46 | 71 | 7.7 | 36 | | 10 | 7.3 | 5.9 | 5.6 | 4.5 | low |
| 42 | Sodium Salicylate (0.00125 M) and Salicylic Acid (0.05 M) | 5.6 | 51 | 43 | 78 | 8.4 | 42 | | 12 | 8.7 | 7.5 | 6.9 | 3.5 | |
| 55 | Tetrabutylammonium Salicylate (0.001 M) and Salicylic Acid (0.05 M) | 4.3 | 39 | 26 | 61 | 6.6 | 8.5 | | 9.1 | 8.1 | 6.8 | 5.4 | 2.3 | 0.2 |
| 70 | Tetrabutylammonium[p] Salicylate (0.001 M) | 3.4 | 44 | 24 | 69 | 7.6 | 44 | | 13 | 8.9 | 6.0 | 4.6 | 2.2 | — |
| 76 | Sodium Salicylate (0.00125 M) and Salicylic Acid (0.05 M) | 2.9 | 83 | 37 | 88 | 9.5 | 7.4 | | 6.3 | 6.3 | 6.4 | 5.6 | 3.8 | 1.8 |
| 77 | Tetrabutylammonium Salicylate (0.0001 M) | 2.8 | 96 | 39 | 134 | 14.4 | 22 | | 16 | 12 | 8.1 | 6.5 | 4.1 | 2.2 |
| 82 | Tetrabutylammonium Perchlorate (0.008 M) | 2.5 | 123 | 48 | 116 | 12.5 | 12 | | 12 | 11 | 8.0 | 6.4 | 4.2 | 2.3 |
| 99 | None | 0.7 | 219 | 24 | 81 | 8.8 | 60 | | 5.8 | 5.5 | 4.2 | 3.4 | 2.2 | 1.3 |

[a]Reactions of 0.030 M bis(2,4,6-trichlorophenyl)oxalate(TCPO),0.003 M-9,10-bis(phenylethynyl)anthracene(BPEA) and 0.075 M H$_2$O$_2$ in 75 vol. % ethyl benzoate-25 vol. % 3-methyl-3-pentanol (except where noted) at 25° C.
[b]Numbers from Table
[c]Characteristic intensity(foot lamberts cm$^{-1}$).
[d]Characteristic lifetime(minutes).
[e]Characteristic light capacity(lumen hours liter$^{-1}$).
[f]Total light capacity (lumen hours liter$^{-1}$).
[g]Quantum yield (10$^2$ einsteine mole$^{-1}$ based on TCPO).
[h]Maximum intensity(foot lamberts cm$^{-1}$).
[i]Reaction time in minutes.
[j]Foot lamberts cm$^{-1}$.
[k]90% ethyl benzolate-10% 3-methyl-3-pentanol.
p75% o-dichlorobenzene-25% 3-methyl-3-pentanol.
q90% ethyl benzoate-10% t-butyl alcohol.
r(TCPO) was 0.036 M.

We claim:
1. A composition, useful as a component for a chemical light device, said composition comprising at least

6. The composition defined by claim 1 wherein said catalyst is tetrabutylammonium salicylate.

* * * * *

UNITED STATES PATENT AND TRADEMARK OFFICE
CERTIFICATE OF CORRECTION

PATENT NO. : 4,313,843

DATED : February 2, 1982

INVENTOR(S) : Laszlo J. Bollyky and Michael M. Rauhut

It is certified that error appears in the above-identified patent and that said Letters Patent is hereby corrected as shown below:

In Column 1, insert the following statement as the second paragraph of the Specification:

--The invention herein described was made in the course of or under a contract (Contract No. N60921-67-C-0214) or subcontract thereunder, (or grant) with the Department of the Navy.--

Signed and Sealed this

Eleventh Day of September, 1990

Attest:

HARRY F. MANBECK, JR.

*Attesting Officer*     *Commissioner of Patents and Trademarks*